US009101839B2

(12) United States Patent
Abe

(10) Patent No.: US 9,101,839 B2
(45) Date of Patent: Aug. 11, 2015

(54) COMPUTER-READABLE STORAGE MEDIUM HAVING STORED THEREIN GAME PROGRAM, GAME APPARATUS, GAME SYSTEM, AND GAME PROCESSING METHOD

(75) Inventor: Goro Abe, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 100 days.

(21) Appl. No.: 13/364,630

(22) Filed: Feb. 2, 2012

(65) Prior Publication Data

US 2012/0309512 A1 Dec. 6, 2012

(30) Foreign Application Priority Data

Jun. 3, 2011 (JP) ................................. 2011-125649

(51) Int. Cl.
*A63F 13/26* (2014.01)
*A63F 13/814* (2014.01)
*A63F 13/211* (2014.01)
*A63F 13/5255* (2014.01)
*A63F 13/40* (2014.01)

(52) U.S. Cl.
CPC .............. *A63F 13/26* (2014.09); *A63F 13/211* (2014.09); *A63F 13/5255* (2014.09); *A63F 13/814* (2014.09); *A63F 13/10* (2013.01)

(58) Field of Classification Search
CPC .................... A63F 2300/301; A63F 2300/105; A63F 2300/6676; A63F 2009/241; A63F 13/26; A63F 13/5255; A63F 13/211; A63F 13/814; A63F 2300/8047
USPC ........................................................ 463/30
See application file for complete search history.

(56) References Cited

U.S. PATENT DOCUMENTS

| 6,425,822 | B1 * | 7/2002 | Hayashida et al. ................ 463/7 |
| 6,607,446 | B1 * | 8/2003 | Shimomura et al. ............. 463/43 |
| 6,743,104 | B1 | 6/2004 | Ota et al. |
| 6,821,204 | B2 | 11/2004 | Aonuma et al. |
| 6,878,065 | B2 | 4/2005 | Yamamoto et al. |
| 6,923,722 | B2 * | 8/2005 | Yamada et al. .................. 463/30 |
| 6,966,837 | B1 * | 11/2005 | Best ............................... 463/33 |
| 6,979,265 | B2 | 12/2005 | Suzuki |

(Continued)

FOREIGN PATENT DOCUMENTS

| EP | 1 685 883 A1 | 8/2006 |
| JP | 2004-329744 | 11/2004 |

OTHER PUBLICATIONS

European Search Report (8 pgs.) issued in corresponding European Application No. 12154020.7.

(Continued)

*Primary Examiner* — Bach Hoang
*Assistant Examiner* — Anh Vo V Nguyen
(74) *Attorney, Agent, or Firm* — Nixon & Vanderhye P.C.

(57) ABSTRACT

The game apparatus displays on a television a scene in which a pirate shoots an arrow at a first timing. Next, the game apparatus determines, at a second timing which is a timing after a predetermined time period has elapsed from the first timing, whether the attitude of a terminal device is an attitude in accordance with an instruction issued by the pirate when the pirate shot the arrow at the first timing. When the attitude of the terminal device is the attitude in accordance with the instruction issued by the pirate, the game apparatus displays a scene in which the arrow has reached the screen of the terminal device.

33 Claims, 22 Drawing Sheets

(56) References Cited

U.S. PATENT DOCUMENTS

| | | | |
|---|---|---|---|
| 7,170,508 | B2 | 1/2007 | Ohno et al. |
| 7,229,349 | B2 | 6/2007 | Yamada |
| 7,326,117 | B1* | 2/2008 | Best .............................. 463/32 |
| 7,467,998 | B2 | 12/2008 | Yamada et al. |
| 7,628,697 | B2 | 12/2009 | Tanaka |
| 7,786,997 | B2 | 8/2010 | Yoshino et al. |
| 8,230,610 | B2* | 7/2012 | Jaiswal et al. ............. 33/366.11 |
| 8,360,880 | B2 | 1/2013 | Abe |
| 8,462,109 | B2* | 6/2013 | Nasiri et al. .................. 345/158 |
| 2002/0002411 | A1* | 1/2002 | Higurashi et al. ............. 700/91 |
| 2002/0165028 | A1 | 11/2002 | Miyamoto et al. |
| 2003/0216176 | A1* | 11/2003 | Shimizu et al. ................. 463/31 |
| 2003/0216179 | A1 | 11/2003 | Suzuki et al. |
| 2004/0040434 | A1* | 3/2004 | Kondo et al. .................. 84/604 |
| 2004/0092309 | A1 | 5/2004 | Suzuki |
| 2004/0224760 | A1 | 11/2004 | Miyamoto et al. |
| 2004/0229687 | A1 | 11/2004 | Miyamoto et al. |
| 2005/0096134 | A1 | 5/2005 | Lippincott |
| 2005/0119053 | A1* | 6/2005 | Suzuki et al. .................. 463/42 |
| 2006/0094502 | A1 | 5/2006 | Katayama et al. |
| 2007/0015577 | A1* | 1/2007 | Hsu ................................ 463/37 |
| 2008/0268943 | A1* | 10/2008 | Jacob ............................. 463/23 |
| 2008/0274804 | A1* | 11/2008 | Harrison et al. ................ 463/29 |
| 2008/0318681 | A1* | 12/2008 | Rofougaran et al. ........... 463/39 |
| 2009/0069096 | A1* | 3/2009 | Nishimoto ...................... 463/43 |
| 2009/0227373 | A1* | 9/2009 | Yamamoto ...................... 463/38 |
| 2009/0312102 | A1 | 12/2009 | Oberg et al. |
| 2010/0151948 | A1* | 6/2010 | Vance et al. .................... 463/43 |
| 2010/0265932 | A1 | 10/2010 | Inoue et al. |
| 2010/0279770 | A1* | 11/2010 | Ikeda .............................. 463/32 |
| 2011/0105226 | A1* | 5/2011 | Perlman .......................... 463/30 |
| 2012/0014558 | A1* | 1/2012 | Stafford et al. ............... 382/103 |
| 2012/0079080 | A1* | 3/2012 | Pishevar ....................... 709/220 |
| 2012/0086630 | A1* | 4/2012 | Zhu et al. ...................... 345/156 |
| 2013/0106846 | A1 | 5/2013 | Abe |

OTHER PUBLICATIONS

Official Guidebook of "Rhythm Tengoku" of Nintendo Co., Ltd., first edition, Nov. 1, 2006, published by Shogakukan, and a partial English Translation.

Office Action mailed Apr. 21, 2014 in related U.S. Appl. No. 13/711,977 (7 pages).

European Search Report dated Oct. 10, 2014 in European Application No. 12154019.9 (9 pages).

Devin Conners, "Nintendo 3DS, Futuristic Handheld, Retro Battery", Mar. 21, 2011, XP055143141, http://www.tomsguide.com/print/Nintendo-3DS-Review-Parallax-3D-Display-Gaming,reviews-1638.html (10 pages).

Devin Connors, "Nintendo 3DS, Futuristic Handheld, Retro Battery", Mar. 21, 2011, XP055143141, http://www.tomsguide.com/print/Nintentdo-3DS-Review-Parallax -3D-Display-Gaming,reviews-1638.html (10 pages).

* cited by examiner

F I G. 7
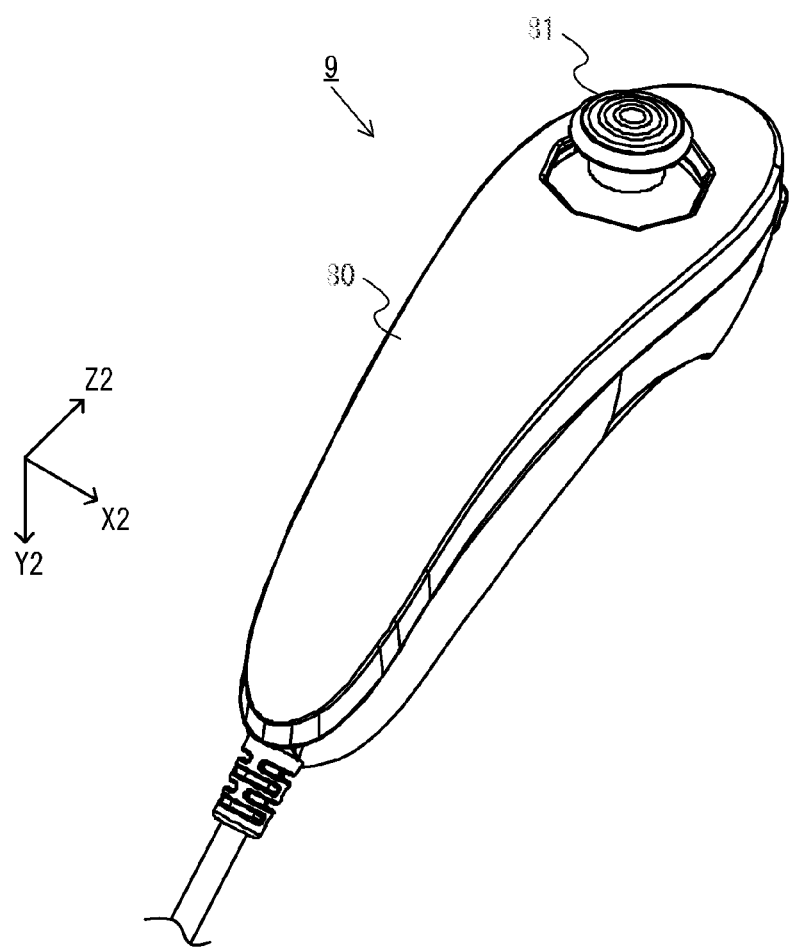

F I G. 9
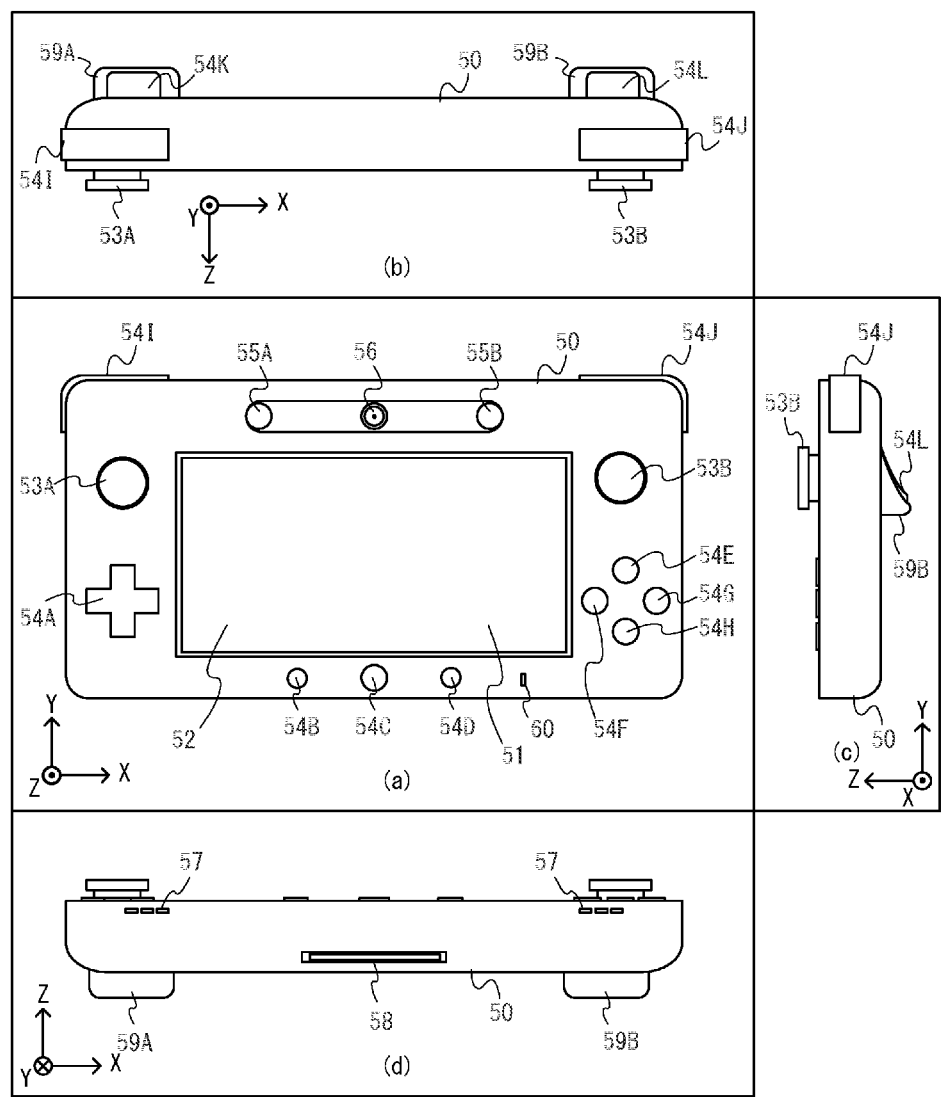

F I G. 1 1
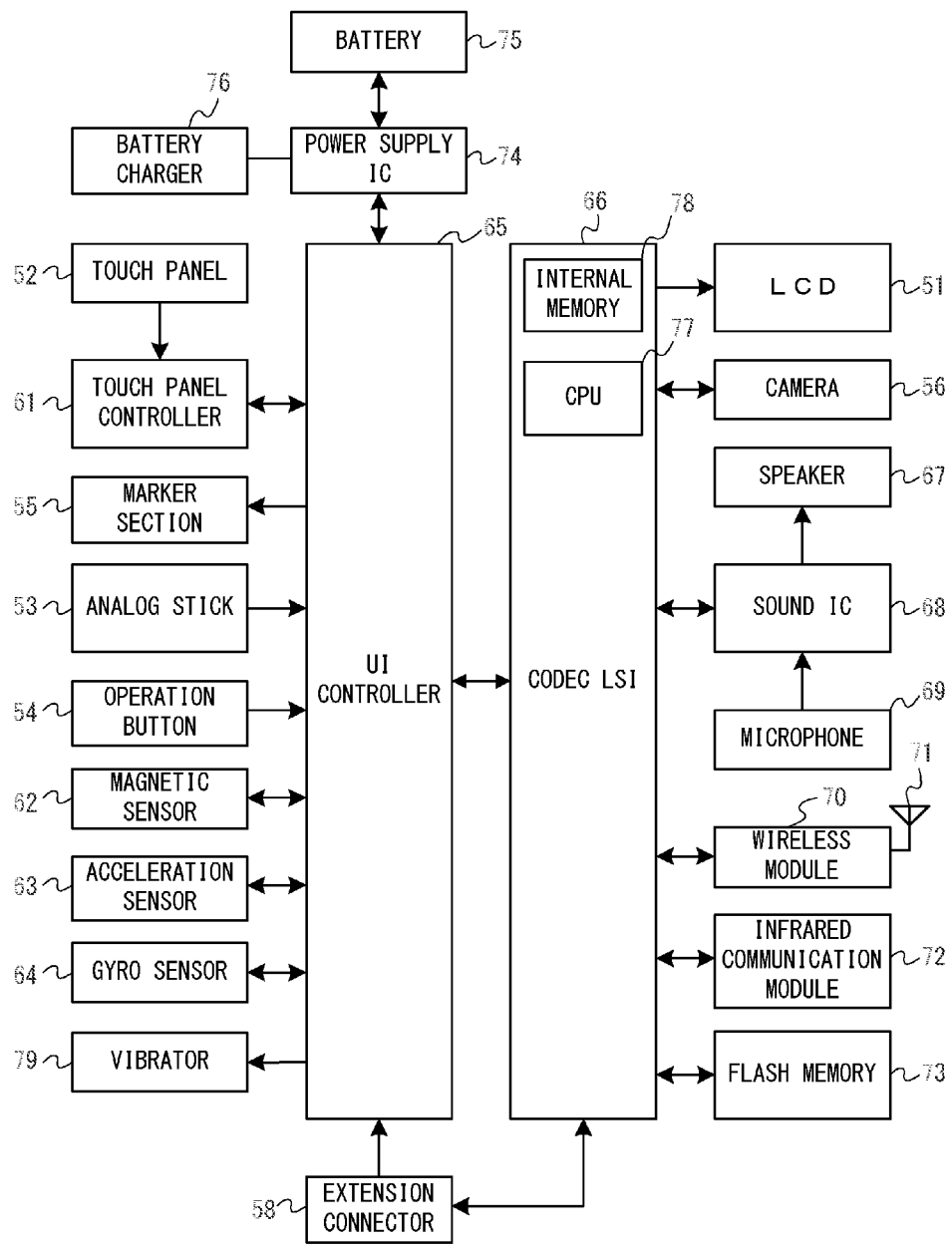

F I G. 1 4
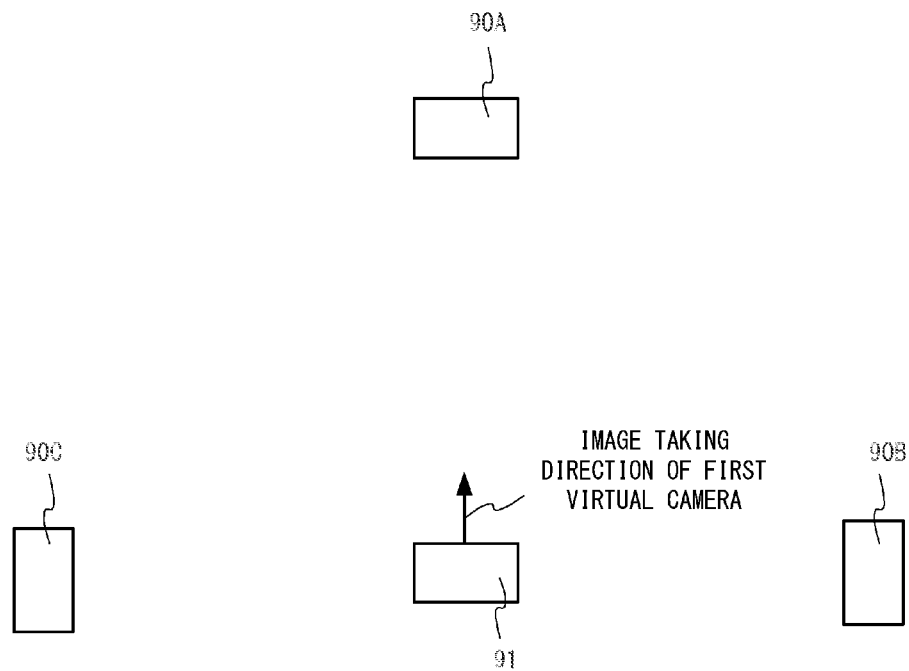

F I G. 2 0
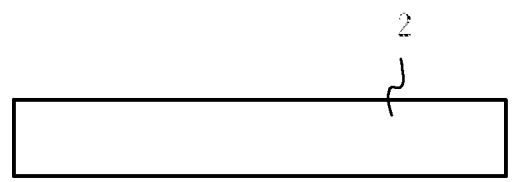
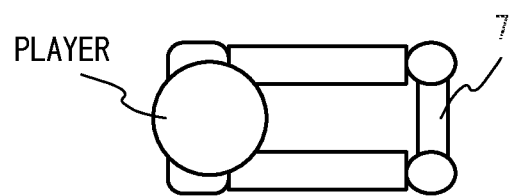

F I G. 2 4
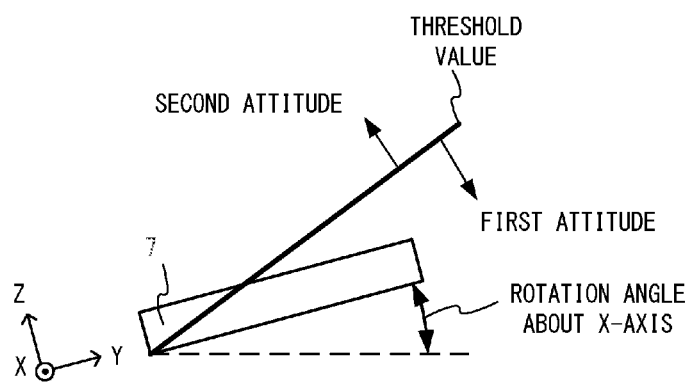
F I G. 2 5
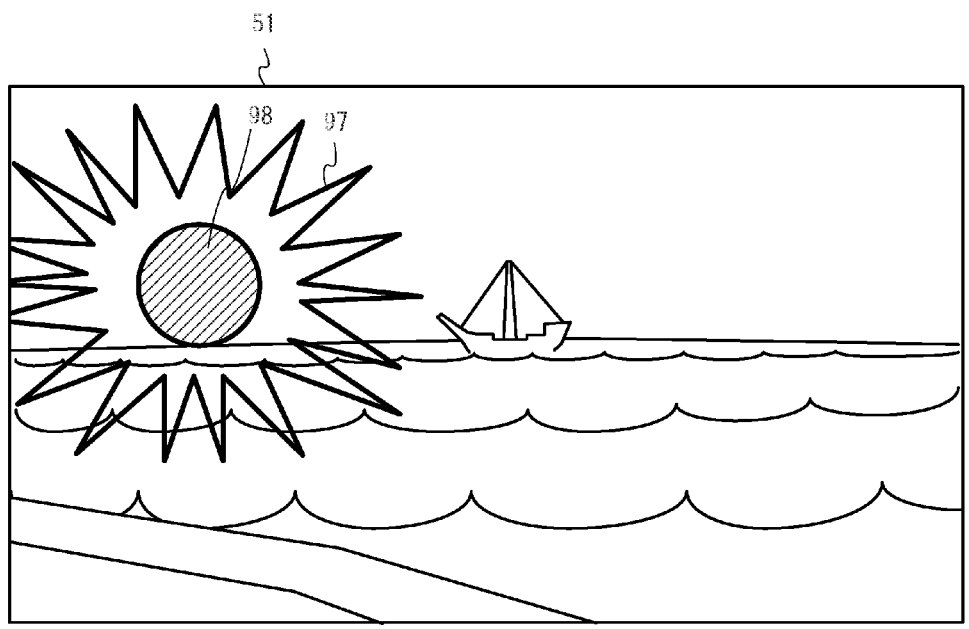

F I G. 2 6
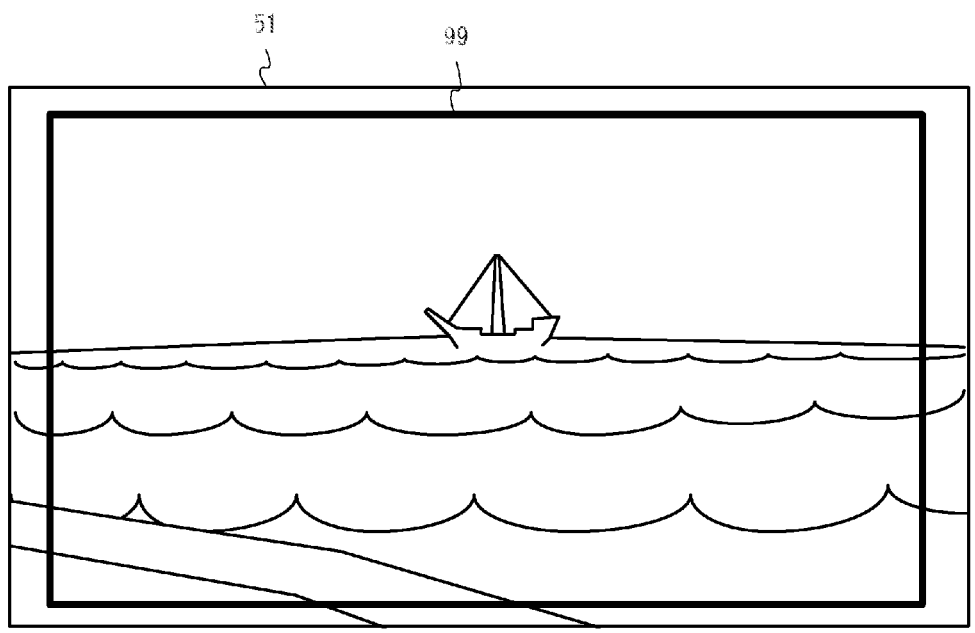

COMPUTER-READABLE STORAGE MEDIUM HAVING STORED THEREIN GAME PROGRAM, GAME APPARATUS, GAME SYSTEM, AND GAME PROCESSING METHOD

CROSS REFERENCE TO RELATED APPLICATION

The disclosure of Japanese Patent Application No. 2011-125649, filed on Jun. 3, 2011, is incorporated herein by reference.

FIELD

The technology disclosed herein relates to a game program, a game apparatus, a game system, and a game processing method which perform a game using a plurality of display devices.

BACKGROUND AND SUMMARY

There have been games in which a user presses a button corresponding to a screen display, to the rhythms of BGM. For example, in a conventional game, a game is advanced by a player pressing a button at timings indicated by a character and the like displayed on the screen.

However, in such a conventional game, an operation is performed at a timing, based on a display presented within a limited range of one screen, and thus, the user does not feel the broadness of the space.

Therefore, an object of the exemplary embodiment is to provide a game program, a game apparatus, a game system, and a game processing method that each allows the user to feel the broadness of the space, by use of a plurality of display devices.

In order to solve the above problem, the exemplary embodiment has employed the following configurations.

The exemplary embodiment is directed to a game program performed by a computer of a game apparatus that causes a first display device to display an image. The game program causes the computer to perform issuing a predetermined instruction to a user in the first display device at a first timing; receiving an input by the user outputted from an input device; performing a predetermined game process, based on one of a state of an input to the input device at a second timing which is a timing after a predetermined time period has elapsed from the first timing, and a difference between a timing of an input to the input device and the second timing; and presenting a result of the game process on a second display device.

The state of the input to the input device may be, for example, a state of an operation performed onto the input device (for example, the state of the attitude of the input device, the state of a button operation, and the like) or a state based on an action of the user himself or herself. The game apparatus may be an information processing apparatus for various purposes, such as a personal computer.

According to the above configuration, a predetermined instruction can be issued in the first display device at the first timing, and for example, a game process can be performed based on the state of an input to the input device at the second timing, and a result of the game process can be presented on the second display device. Further, the game process can be performed based on a difference between the second timing and the timing of an input, and a result of the game process can be presented on the second display device. Accordingly, the user can feel as if he or she is playing the game in a space including the plurality of display devices, and can feel the broadness of the space.

In another configuration, the predetermined game process may be performed, based on the state of the input at the second timing.

In another configuration, the second display device may be a portable display device integrated with the input device.

According to the above configuration, it is possible to play the game using the portable display device in which the input device and the display device are integrated.

In another configuration, the input device may output attitude data in accordance with its own attitude. An attitude of the portable display device is received based on the attitude data. The predetermined game process is performed, based on the attitude of the portable display device at the second timing.

According to the above configuration, it is possible to perform the game process based on the attitude of the portable display device.

In another configuration, the computer may further be caused to perform determining whether the attitude of the portable display device is an attitude in accordance with the predetermined instruction. A game process in accordance with a result of the determination at the second timing is performed.

According to the above configuration, it is possible to make a result of the game process different, depending on whether the attitude of the portable display device at the second timing is the attitude in accordance with the predetermined instruction issued at the first timing.

In another configuration, an attitude of a virtual camera in a virtual space may be set in accordance with the attitude of the portable display device, and an image of the virtual space may be taken by the virtual camera, and thereby a second image in accordance with the attitude of the portable display device may be displayed on the portable display device.

According to the above configuration, it is possible to change the image displayed on the portable display device, in accordance with the attitude of the portable display device.

In another configuration, the computer may further be caused to perform reproducing predetermined music. In this case, the first timing and the second timing are set, synchronized with the rhythm of the predetermined music.

According to the above configuration, the first timing and the second timing are set in accordance with the rhythm of predetermined music. Thus, the user can enjoy the rhythm game.

In another configuration, the first timing and the second timing may be set at timings when the predetermined music is reproduced.

According to the above configuration, it is possible to set the first timing and the second timing in accordance with the timings of the reproduction of the predetermined music.

In another configuration, a predetermined sound may be outputted at the first timing from a sound outputting unit provided in the first display device. A predetermined sound is outputted at the second timing from a sound outputting unit provided in the second display device.

According to the above configuration, it is possible to output a predetermined sound from the first display device at the first timing and to output a predetermined sound from the second display device at the second timing In another configuration, notification in accordance with a result of the determination obtained during a time period from the first timing to the second timing may be performed on the portable display device.

According to the above configuration, it is possible to notify the user, during the time period from the first timing to the second timing, whether the current attitude is the attitude in accordance with the predetermined instruction.

In another configuration, the program may further cause the computer to perform an evaluation of the input by the user, in accordance with a result of the determination at the second timing.

According to the above configuration, it is possible to evaluate the input inputted by the user.

In another configuration, the computer may further be caused to perform determining whether the portable display device is moving at the second timing. A result of a game process performed in accordance with a result of the determination whether the portable display device is moving is presented on the portable display device at the second timing.

According to the above configuration, it is possible to make a result of the game process different, depending on whether the portable display device is moving at the second timing.

In another configuration, a scene in which a predetermined object is started to be moved as the predetermined instruction may be displayed on the first display device. A scene in which the predetermined object has reached the second display device as the result of the game process is displayed on the second display device.

According to the above configuration, it is possible to display on the first display device a scene in which the predetermined object is started to be moved at the first timing, and to display on the second display device a scene in which the predetermined object has reached the second display device at the second timing. This allows the user to feel as if the predetermined object moves between the first display device and the second display device, and thus, it is possible to give the user an impression as if he or she is playing the game in a space which extends between the first display device and the second display device.

In another configuration, image data indicating the result of the game process may be outputted to the portable display device. The portable display device includes: an image data obtaining unit that obtains the image data outputted from the game apparatus; and a display unit that displays the result of the game process indicated by the image data obtained by the image data obtaining unit.

According to the above configuration, by outputting an image from the game apparatus to the portable display device, it is possible to display a result of the game process on the portable display device.

In another configuration, the computer may further be caused to perform generating compressed image data which is obtained by compressing the image data. The compressed image data is outputted to the portable display device. The portable display device further includes an image decompression unit that decompresses the compressed image data and obtains the image data. The display unit displays the result of the game process indicated by the image data decompressed by the image decompression unit.

According to the above configuration, the image data indicating the game process is compressed and outputted from the information processing apparatus to the portable display device. Therefore, even when the image has a large data amount, it is possible to transmit the image from the game apparatus to the portable display device in a short period of time.

It should be noted that the exemplary embodiment may be a game apparatus that realizes the above features. In another exemplary embodiment, the game system may be structured by a plurality of components that realize the above features and mutually operate with each other. The game system may be structured by one or a plurality of apparatuses. Another exemplary embodiment may be a game processing method.

According to the exemplary embodiment, it is possible to provide a game program, a game apparatus, a game system, and a game processing method which each allows the user to feel the broadness of the space by using a plurality of display devices.

These and other features, aspects and advantages of certain exemplary embodiments will become more apparent from the following detailed description when taken in conjunction with the accompanying drawings.

BRIEF DESCRIPTION OF THE DRAWINGS

FIG. 7 is a perspective view showing a non-limiting exemplary external structure of a sub-controller 9;

FIG. 9 shows a non-limiting exemplary external structure of a terminal device 7;

FIG. 11 is a block diagram showing a non-limiting exemplary internal structure of the terminal device 7;

FIG. 14 shows a non-limiting example of positional relationship between objects arranged in a virtual space of the game;

FIG. 20 is a view of a non-limiting example of the player turning to the right relative to the television 2 in response to an instruction from the game apparatus 3, viewed from above in the real space.

FIG. 24 is a side view of a non-limiting example of the terminal device 7 rotating a predetermined angle about an X-axis;

FIG. 25 shows a non-limiting example of an image displayed on the LCD 51 of the terminal device 7 at a second timing t2 when the terminal device 7 is moving; and FIG. 26 is a non-limiting example of a lock-on frame 99 displayed on the LCD 51 of the terminal device 7.

DETAILED DESCRIPTION OF NON-LIMITING EXAMPLE EMBODIMENTS

[1. Overall Configuration of Game System]

Figure 1:
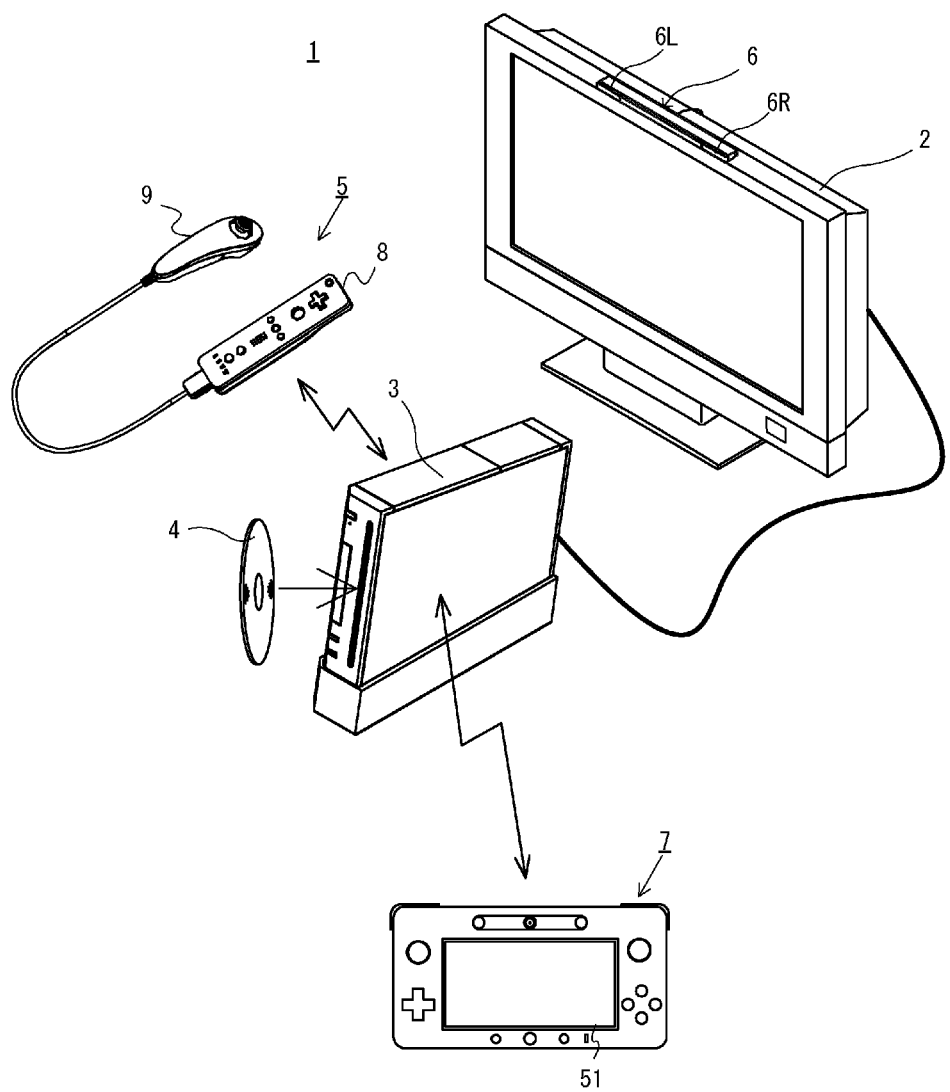
FIG. 1 is an external view showing a non-limiting example of a game system 1.

Hereinafter, a game system 1 according to an exemplary embodiment will be described with reference to the drawings. FIG. 1 is an external view showing a non-limiting example of a game system 1. As shown in FIG. 1, the game system 1 includes a stationary display device (hereinafter, referred to as a "television") 2 typified by, for example, a television receiver, a stationary game apparatus 3, an optical disc 4, a controller 5, a marker device 6, and a terminal device 7. In the game system 1, the game apparatus 3 executes a game process based on a game operation using the controller 5, and the television 2 and/or the terminal device 7 display a game image obtained in the game process.

Into the game apparatus 3, the optical disc 4 which is an exemplary information storage medium which is exchangeably used for the game apparatus 3 is detachably inserted. An information processing program (typically, a game program) to be executed by the game apparatus 3 is stored in the optical disc 4. An insertion operating for the optical disc 4 is formed on the front surface of the game apparatus 3. The game apparatus 3 loads and executes the information processing program stored in the optical disc 4 having been inserted through the insertion opening, thereby executing the game process.

The television 2 is connected to the game apparatus 3 through a connection cord. The television 2 displays a game image obtained in the game process executed by the game apparatus 3. The television 2 includes a speaker 2a (FIG. 2), and the speaker 2a outputs game sound obtained as a result of the game process. In another exemplary embodiment, the game apparatus 3 may be integrated with a stationary display device. Further, the game apparatus 3 and the television 2 may wirelessly communicate with each other.

The marker device 6 is provided in the vicinity (above a screen in FIG. 1) of a screen of the television 2. As will be described below in detail, a user (a player) is allowed to perform a game operation of moving the controller 5, and the marker device 6 is used for causing the game apparatus 3 to calculate, for example, a movement, a position, and an attitude of the controller 5. The marker device 6 includes two markers, that is, a marker 6R and a marker 6L, on both ends thereof. Specifically, the marker 6R (and the marker 6L) is implemented as at least one infrared light emitting diode (LED), and emits infrared light forward from the television 2. The marker device 6 is wire-connected (or may be wirelessly connected) to the game apparatus 3, and the game apparatus 3 is able to control whether each infrared LED of the marker device 6 is to be lit up. The marker device 6 is portable, and a user is allowed to set the marker device 6 at a desired position. In FIG. 1, an exemplary manner is shown in which the marker device 6 is set on the television 2. However, the marker device 6 may be set at any position and may face in any direction.

The controller 5 provides the game apparatus 3 with operation data based on an operation performed on the controller 5. In the exemplary embodiment described herein, the controller 5 includes a main controller 8 and a sub-controller 9, and the sub-controller 9 is detachably mounted to the main controller 8. The controller 5 and the game apparatus 3 are able to wirelessly communicate with each other. In the exemplary embodiment described herein, for example, the Bluetooth (registered trademark) technology is used for the wireless communication between the controller 5 and the game apparatus 3. In another exemplary embodiment, the controller 5 and the game apparatus 3 may be wire-connected to each other. Further, although, in FIG. 1, the number of the controllers 5 included in the game system 1 is one, the game system 1 may include a plurality of the controllers 5. Namely, the game apparatus 3 can communicate with a plurality of controllers, and multiple persons are allowed to play a game by simultaneously using a predetermined number of controllers. A specific structure of the controller 5 will be described below in detail.

The terminal device 7 approximately has such a size as to be held by a user, and the user is allowed to use the terminal device 7 by holding and moving the terminal device 7 with his/her hand, or positioning the terminal device 7 at any desired position. The terminal device 7 includes a liquid crystal display (LCD) 51 operating as display means, and input means (such as a touch panel 52 and a gyro sensor 64 as described below). The structure of the terminal device 7 will be described below in detail. The terminal device 7 and the game apparatus 3 can wirelessly communicate with each other (or wired communication may be used therebetween). The terminal device 7 receivers, from the game apparatus 3, data of an image (for example, a game image) generated by the game apparatus 3, and displays the image on the LCD 51. Although, in the exemplary embodiment described herein, an LCD is used as a display device, the terminal device 7 may have any other display device such as a display device using, for example, electro luminescence (EL). Further, the terminal device 7 transmits, to the game apparatus 3, operation data based on an operation performed on the terminal device 7.

[2. Internal Structure of Game Apparatus 3]

Figure 2:
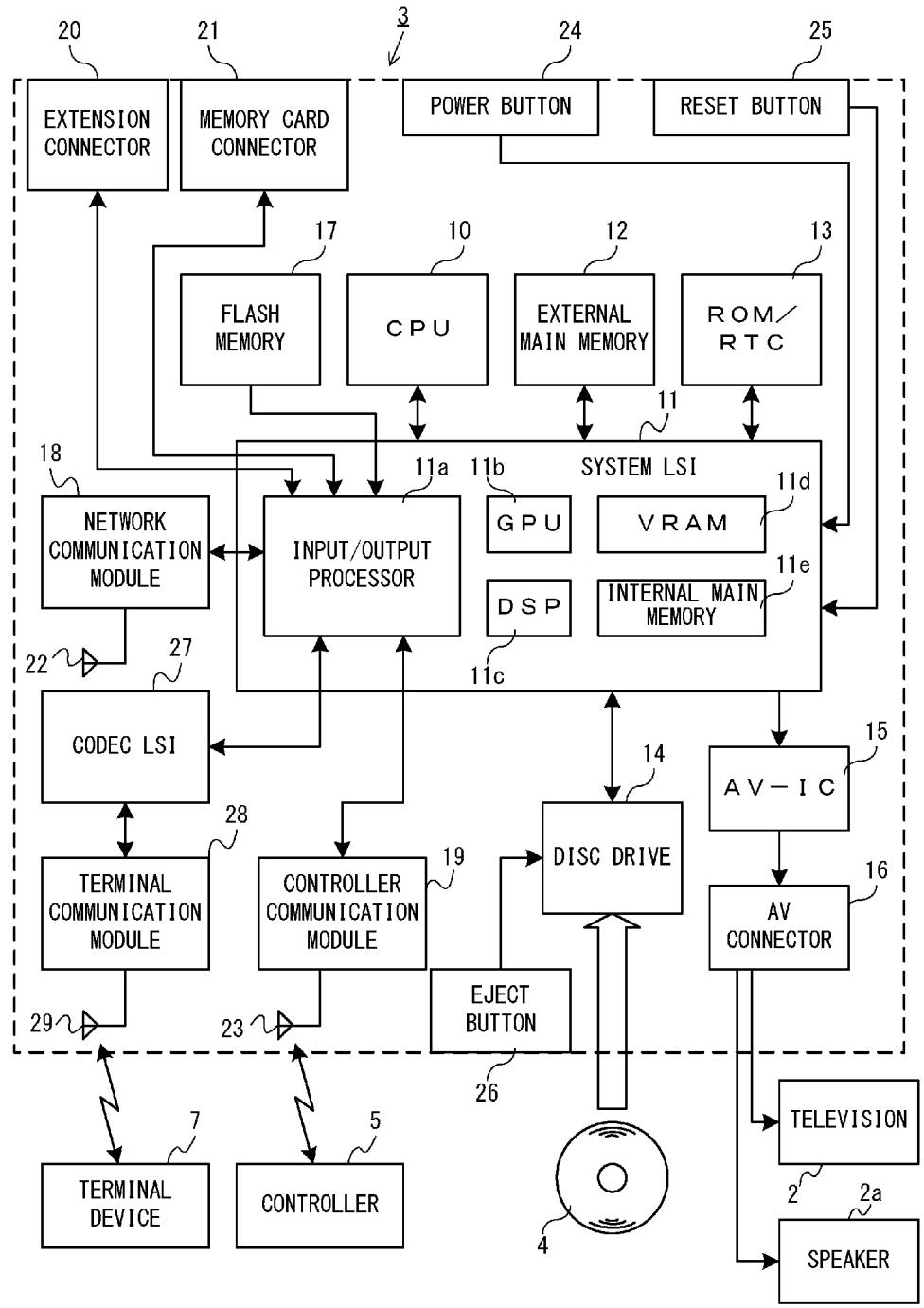
FIG. 2 is a block diagram showing a non-limiting exemplary internal structure of a game apparatus 3.

Next, with reference to FIG. 2, a non-limiting exemplary internal structure of the game apparatus 3 will be described. FIG. 2 is a block diagram showing a non-limiting exemplary internal structure of the game apparatus 3. The game apparatus 3 includes: a central processing unit (CPU) 10; a system LSI 11; an external main memory 12; a ROM/RTC 13; a disk drive 14; an AV-IC 15, and the like.

The CPU 10, serving as a game processor, executes a game program stored in the optical disc 4 to perform a game process. The CPU 10 is connected to the system LSI 11. In addition to the CPU 10, the external main memory 12, the ROM/RTC 13, the disk drive 14, and the AV-IC 15 are also connected to the system LSI 11. The system LSI 11 performs processing such as control of data transmission among respective components connected thereto, generation of an image to be displayed, and acquisition of data from an external apparatus. An internal configuration of the system LSI 11 will be described below. The external main memory 12, which is of a volatile type, stores programs, such as a game program loaded from the optical disc 4 or a flash memory 17, and various data. The external main memory 12 is used as a work area and a buffer area for the CPU 10. The ROM/RTC 13 includes a ROM (so-called a boot ROM) storing a program for starting up the game apparatus 3, and a clock circuit (real time clock: RTC) for counting time. The disk drive 14 reads, from the optical disc 4, program data, texture data and the like, and writes the read data into an internal main memory 11e described below, or the external main memory 12.

An input/output processor (I/O processor) 11a, a graphics processor unit (GPU) 11b, a digital signal processor (DSP) 11c, a VRAM (video RAM) 11d, and the internal main memory 11e, are included in the system LSI 11. These components 11a to 11e are connected to each other via an internal bus, which is not shown.

The GPU 11b, which is a part of rendering means, generates an image according to a graphics command (rendering command) from the CPU 10. The VRAM 11d stores data (such as polygon data and texture data) to be used by GPU 11b for executing the graphics command. When an image is generated, the GPU 11b generates image data by using the data stored in the VRAM 11d. In the exemplary embodiment described herein, the game apparatus 3 generates both a game image to be displayed by the television 2, and a game image to be displayed by the terminal device 7. Hereinafter, the game image to be displayed by the television 2 may be referred to as a "television game image", and the game image to be displayed by the terminal device 7 may be referred to as a "terminal game image".

The DSP 11c functions as an audio processor, and generates sound data by using sound data and sound waveform (tone quality) data stored in the internal main memory 11e and/or the external main memory 12. In the exemplary embodiment described herein, as game sounds, both a game sound outputted from the speaker of the television 2, and a game sound outputted by a speaker of the terminal device 7 are generated, similarly to the game images. Hereinafter, the game sound outputted by the television 2 may be referred to as a "television game sound", and the game sound outputted by the terminal device 7 may be referred to as a "terminal game sound".

Data of the image and the sound to be outputted by the television 2, among the images and the sounds generated by the game apparatus 3 as described above, is read by the AV-IC 15. The AV-IC 15 outputs the read data of image to the television 2 via an AV connector 16, and also outputs the read data of sound to the speaker 2a included in the television 2. Thus, the image is displayed by the television 2, and the sound is outputted from the speaker 2a.

On the other hand, data of the image and the sound to be outputted by the terminal device 7, among the images and the sounds generated by the game apparatus 3, is transmitted to the terminal device 7 by the input/output processor 11a, and/or the like. The transmission of the data to the terminal device 7 by the input/output processor 11a, and/or the like will be described below.

The input/output processor 11a executes data reception and transmission among the components connected thereto and data downloading from an external apparatus. The input/output processor 11a is connected to the flash memory 17, a network communication module 18, a controller communication module 19, an extension connector 20, a memory card connector 21, and a codec LSI 27. To the network communication module 18, an antenna 22 is connected. To the controller communication module 19, an antenna 23 is connected. The codec LSI 27 is connected to a terminal communication module 28, and an antenna 29 is connected to the terminal communication module 28.

The game apparatus 3 is connected to a network such as the Internet, so that the game apparatus 3 can communicate with an external information processing apparatus (for example, other game apparatuses, various servers, or various information processing apparatuses). Namely, the input/output processor 11a is connected to a network such as the Internet via the network communication module 18 and the antenna 22, to be able to communicate with the external information processing apparatus connected to the network. The input/output processor 11a accesses the flash memory 17 at regular intervals to detect for presence of data to be transmitted to the network. When the data to be transmitted is detected, the data is transmitted to the network via the network communication module 18 and the antenna 22. Further, the input/output processor 11a receives, via the network, the antenna 22 and the network communication module 18, data transmitted from the external information processing apparatus or data downloaded from a download server, and stores the received data in the flash memory 17. The CPU 10 executes the game program to read the data stored in the flash memory 17, thereby using the read data on the game program. The flash memory 17 may store not only the data transmitted and received between the game apparatus 3 and the external information processing apparatus, but also saved data (result data or intermediate step data of the game) of a game played with the game apparatus 3. Further, a game program may be stored in the flash memory 17.

Further, the game apparatus 3 is able to receive the operation data transmitted from the controller 5. Namely, the input/output processor 11a receives, via the antenna 23 and the controller communication module 19, the operation data transmitted from the controller 5, and (temporarily) stores the operation data in a buffer area of the internal main memory 11e or the external main memory 12.

Further, the game apparatus 3 is able to transmit to the terminal device 7 and receive from the terminal device 7 data of the image, the sound, and the like. When the game image (terminal game image) is transmitted to the terminal device 7, the input/output processor 11a outputs, to the codec LSI 27, data of the game image generated in the GPU 11b. The codec LSI 27 subjects, to a predetermined compression process, the image data outputted by the input/output processor 11a. The terminal communication module 28 wirelessly communicates with the terminal device 7. Therefore, the image data compressed by the codec LSI 27 is transmitted to the terminal device 7 via the antenna 29 by the terminal communication module 28. In the exemplary embodiment described herein, the image data transmitted from the game apparatus 3 to the terminal device 7 is used for a game. Therefore, if transmission of an image to be displayed in the game is delayed, operability in the game is adversely affected. Therefore, it is preferable that delay of the transmission of the image data from the game apparatus 3 to the terminal device 7 occurs as little as possible. Therefore, in the exemplary embodiment described herein, the codec LSI 27 compresses the image data by using a highly efficient compression technique in compliance with, for example, H.264 standard. It is to be noted that other compression techniques may be used, or uncompressed image data may be transmitted when a communication speed is sufficient. Further, the terminal communication module 28 is a communication module approved by, for example, Wi-Fi, and may perform wireless communication with the terminal device 7 at a high speed by using the MIMO (multiple input multiple output) techniques adopted in, for example, the IEEE 802.11n standard. Further, another communication mode may be used.

Further, the game apparatus 3 transmits, to the terminal device 7, the sound data as well as the image data. Namely, the input/output processor 11a outputs the sound data generated by the DSP 11c, through the codec LSI 27, to the terminal communication module 28. The codec LSI 27 subjects the sound data to a compression process, similarly to the image data. Although the compression mode for the sound data may be any mode, a mode in which the compression rate is high and deterioration of sound is reduced is preferably used. Further, in another exemplary embodiment, sound data, which is not subjected to the compression process, may be transmitted. The terminal communication module 28 transmits the compressed image data and the compressed sound data, via the antenna 29, to the terminal device 7.

Furthermore, the game apparatus 3 transmits, according to need, various control data as well as the image data and the sound data described above, to the terminal device 7. The control data represents control instructions for components included in the terminal device 7, and represents, for example, an instruction for controlling lighting of a marker section (a marker section 55 shown in FIG. 10), and an instruction for controlling imaging of a camera (a camera 56 shown in FIG. 10). The input/output processor 11a transmits the control data to the terminal device 7 according to an instruction from the CPU 10. Although the codec LSI 27 does not subject the control data to a compression process in the exemplary embodiment described herein, the compression process may be performed in another exemplary embodiment. The data transmitted from the game apparatus 3 to the terminal device 7 as described above may be encrypted according to need, or may not be encrypted.

Further, the game apparatus 3 is able to receive various data from the terminal device 7. In the exemplary embodiment described herein, the terminal device 7 transmits the operation data, the image data, and the sound data, which will be described below in detail. The data transmitted from the terminal device 7 is received by the terminal communication module 28 via the antenna 29. In the exemplary embodiment described herein, the image data and sound data transmitted from the terminal device 7 are subjected to the compression process which is similar to that for the image data and sound data transmitted from the game apparatus 3 to the terminal device 7. Therefore, the received image data and sound data are transferred from the terminal communication module 28 to the codec LSI 27, and the codec LSI 27 subjects the image data and sound data to a decompression process, and outputs, to the input/output processor 11a, the image data and sound data having been subjected to the decompression process. On the other hand, since the operation data transmitted from the terminal device 7 has an amount of data which is less than an amount of data of an image and a sound, the operation data may not be subjected to the compression process. Further, encryption may be performed according to need, or may not be performed. Therefore, the operation data is received by the terminal communication module 28, and is thereafter outputted via the codec LSI 27 to the input/output processor 11a. The input/output processor 11a (temporarily) stores the data received from the terminal device 7 in a buffer area of the internal main memory 11e or the external main memory 12.

Further, the game apparatus 3 is able to connect with another device and/or an external storage medium. Namely, to the input/output processor 11a, the extension connector 20 and the memory card connector 21 are connected. The extension connector 20 is a connector, such as a USB or an SCSI, for interface. The extension connector 20 can be connected to a medium such as an external storage medium or a peripheral device such as another controller, or allows communication with a network by connecting with a connector for wired communication instead of using the network communication module 18. The memory card connector 21 is a connector for connecting with an external storage medium such as a memory card. For example, the input/output processor 11a accesses the external storage medium via the extension connector 20 or the memory card connector 21, to store data in the external storage medium or read data from the external storage medium.

The game apparatus 3 has a power button 24, a reset button 25, and an ejection button 26. The power button 24 and the reset button 25 are connected to the system LSI 11. When the power button 24 is pressed so as to be ON, power is supplied to the respective components of the game apparatus 3 from an external power supply via an AC adapter which is not shown. When the reset button 25 is pressed, the system LSI 11 restarts a boot program for the game apparatus 3. The ejection button 26 is connected to the disk drive 14. When the ejection button 26 is pressed, the optical disc 4 is ejected from the disk drive 14.

In another exemplary embodiment, some of the components included in the game apparatus 3 may be implemented as an extension device which is separated from the game apparatus 3. In this case, for example, the extension device may be connected to the game apparatus 3 via the extension connector 20. Specifically, the extension device includes the components such as the codec LSI 27, the terminal communication module 28, and the antenna 29, and the extension device may be detachably connected to the extension connector 20. Thus, when the extension device is connected to a game apparatus which does not include the components described above, the game apparatus can be structured so as to be communicable with the terminal device 7.

[3. Structure of Controller 5]

Figure 3:
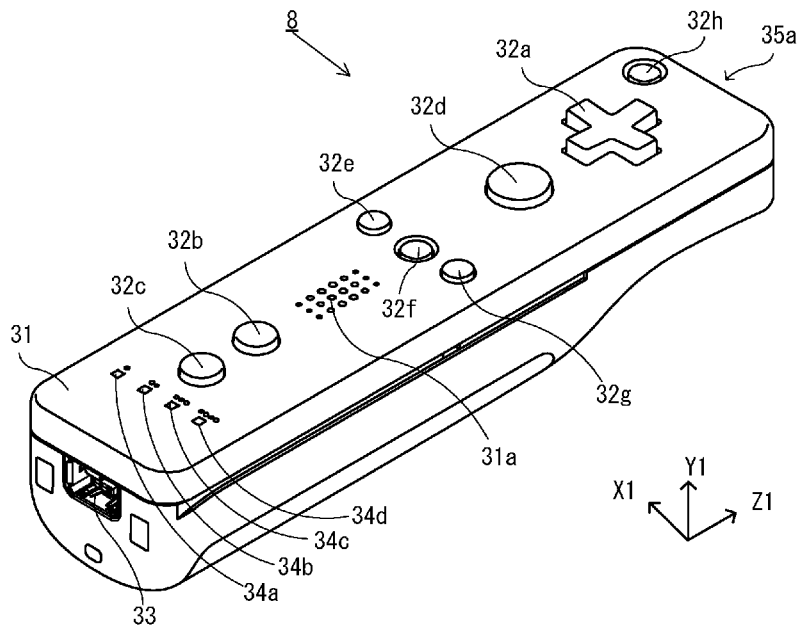
FIG. 3 is a perspective view showing a non-limiting exemplary external structure of a main controller 8.
Figure 4:
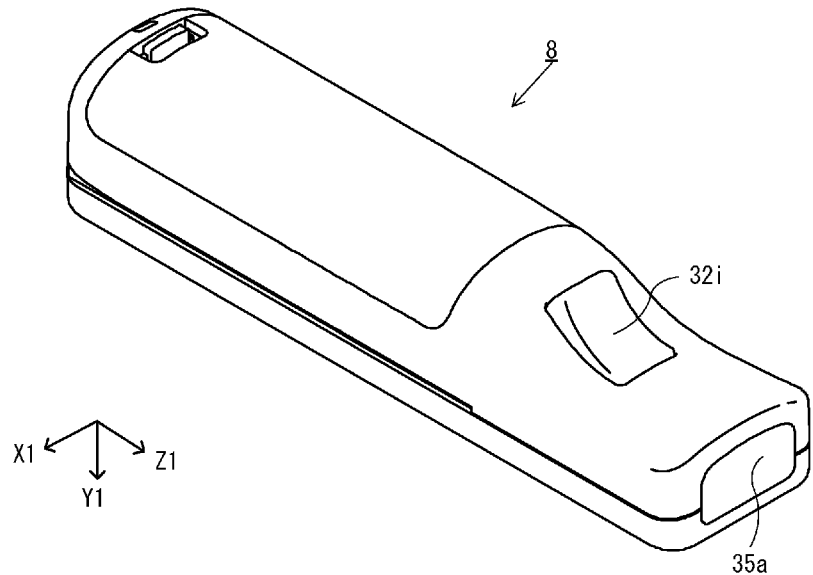
FIG. 4 is a perspective view showing a non-limiting exemplary external structure of the main controller 8.

Next, with reference to FIG. 3 to FIG. 7, the controller 5 will be described. As described above, the controller 5 includes the main controller 8 and the sub-controller 9. FIG. 3 and FIG. 4 are perspective views each showing a non-limiting exemplary external structure of the main controller 8. FIG. 3 is a perspective view showing a non-limiting example of the main controller 8 as viewed from the top rear side thereof. FIG. 4 is a perspective view showing a non-limiting example of the main controller 8 as viewed from the bottom front side thereof.

As shown in FIGS. 3 and 4, the main controller 8 includes a housing 31 formed by, for example, plastic molding. The housing 31 has a substantially parallelepiped shape extending in a longitudinal direction from front to rear (the Z1 axis direction shown in FIG. 3). The overall size of the housing 31 is small enough to be held by one hand of an adult or even a child. A user is allowed to perform a game operation by pressing buttons provided on the main controller 8 and moving the main controller 8 to change a position and an attitude (tilt) thereof.

The housing 31 include a plurality of operation buttons. As shown in FIG. 3, on the top surface of the housing 31, a cross button 32a, a first button 32b, a second button 32c, an A button 32d, a minus button 32e, a home button 32f, a plus button 32g, and a power button 32h are provided. In the specification described herein, the top surface of the housing 31 on which the buttons 32a to 32h are provided may be referred to as a "button surface". On the other hand, on a bottom surface of the housing 31, a recessed portion is formed, as shown in FIG. 4. On a slope surface on the rear side of the recessed portion, a B button 32i is provided. The operation buttons 32a to 32i are assigned functions in accordance with an information processing program executed by the game apparatus 3 according to need. Further, the power button 32h is used for remotely powering the game apparatus 3 body on or off. The home button 32f and the power button 32h each have a top surface thereof buried in the top surface of the housing 31. Thus, a user is prevented from inadvertently pressing the home button 32f or the power button 32h.

On the rear surface of the housing 31, a connector 33 is provided. The connector 33 is used for connecting another device (such as the sub-controller 9 or another sensor unit) to the main controller 8. Further, to the right and the left of the connector 33 on the rear surface of the housing 31, engagement holes 33a for preventing removal of the other device from being facilitated are provided.

On the rear side of the top surface of the housing 31, a plurality (four in FIG. 3) of LEDs 34a to 34d are provided. The controller 5 (the main controller 8) is assigned a controller type (number) so as to be distinguishable from the other controllers. For example, the LEDs 34a to 34d are used for informing a user of the controller type which is currently set to controller 5 that he or she is using, or of a remaining battery power of the controller 5. Specifically, when a game operation is performed by using the controller 5, one of the plurality of LEDs 34a to 34d is lit up according to the controller type.

Further, the main controller 8 includes an imaging information calculation section 35 (FIG. 6), and has, on the front surface of the housing 31, a light incident surface 35a of the imaging information calculation section 35, as shown in FIG. 4. The light incident surface 35a is formed of a material which allows at least infrared light from the markers 6R and 6L to pass therethrough.

A sound hole 31a for outputting sound to the outside from a speaker 47 (FIG. 5) included in the main controller 8 is formed between the first button 32b and the home button 32f on the top surface of the housing 31.

Figure 5:
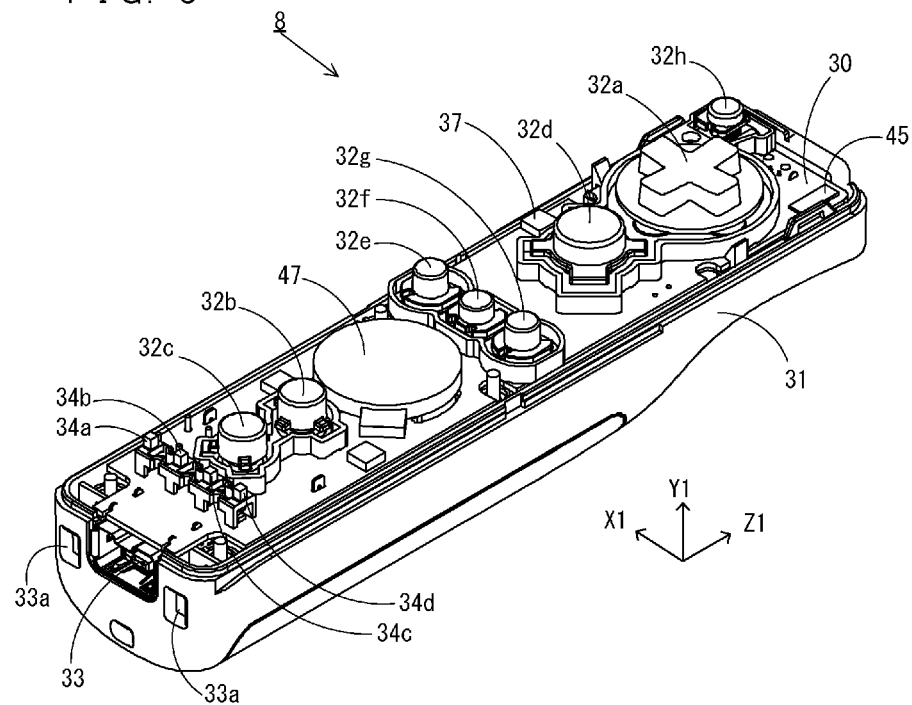
FIG. 5 shows a non-limiting exemplary internal structure of the main controller 8.
Figure 6:
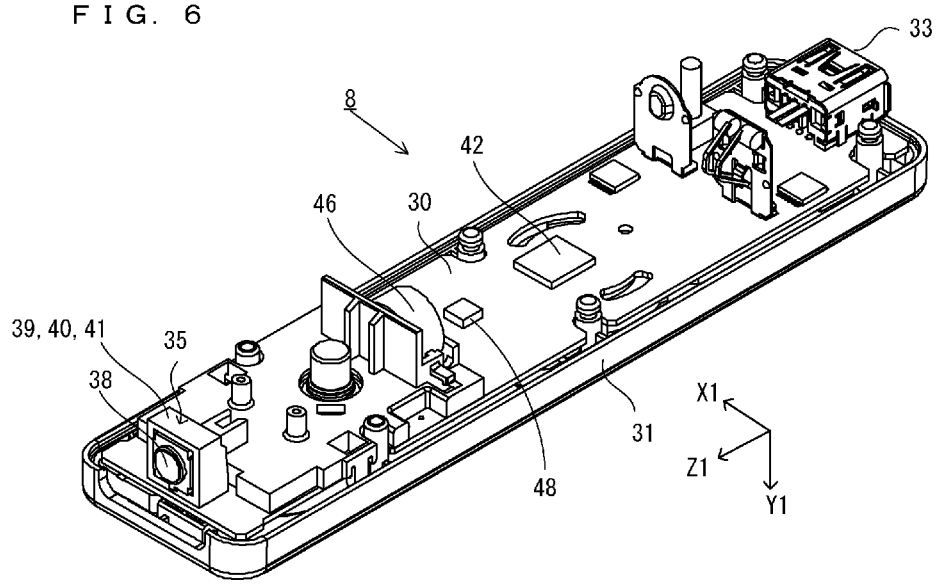
FIG. 6 shows a non-limiting exemplary internal structure of the main controller 8.

Next, with reference to FIGS. 5 and 6, an internal structure of the main controller 8 will be described. FIG. 5 and FIG. 6 show a non-limiting exemplary internal structure of the main controller 8. FIG. 5 is a perspective view showing a non-limiting exemplary state where an upper casing (a part of the housing 31) of the main controller 8 is removed. FIG. 6 is a perspective view showing a non-limiting exemplary state where a lower casing (a part of the housing 31) of the main controller 8 is removed. FIG. 6 is a perspective view showing a non-limiting exemplary reverse side of a substrate 30 shown in FIG. 5.

As shown in FIG. 5, the substrate 30 is fixed inside the housing 31. On a top main surface of the substrate 30, the operation buttons 32a to 32h, the LEDs 34a to 34d, an acceleration sensor 37, an antenna 45, the speaker 47, and the like are provided. These components are connected to a microcomputer 42 (see FIG. 6) via lines (not shown) formed on the substrate 30 and the like. In the exemplary embodiment described herein, the acceleration sensor 37 is positioned so as to be deviated from the center of the main controller 8 in the X1 axis direction. Thus, a movement of the main controller 8 is easily calculated when the main controller 8 is rotated about the Z1 axis. Further, the acceleration sensor 37 is positioned in front of the longitudinal (the Z1 axis direction) center of the main controller 8. Further, the wireless module 44 (FIG. 6) and the antenna 45 allow the controller 5 (the main controller 8) to act as a wireless controller.

On the other hand, as shown in FIG. 6, at the front edge of the bottom main surface of the substrate 30, the imaging information calculation section 35 is provided. The imaging information calculation section 35 includes an infrared filter 38, a lens 39, an image pickup element 40, and an image processing circuit 41 located in order, respectively, from the front of the main controller 8 on the bottom main surface of the substrate 30.

Further, on the bottom main surface of the substrate 30, the microcomputer 42 and the vibrator 46 are provided. The vibrator 46 is, for example, a vibration motor or a solenoid, and is connected to the microcomputer 42 via the lines formed on the substrate 30 and the like. The main controller 8 is vibrated by an actuation of the vibrator 46 according to an instruction from the microcomputer 42. Thus, the vibration is conveyed to a user's hand holding the main controller 8. Thus, a so-called vibration-feedback game is realized. In the exemplary embodiment described herein, the vibrator 46 is positioned slightly in front of the longitudinal center of the housing 31. Namely, the vibrator 46 is positioned near the end portion of the main controller 8 so as to be deviated from the longitudinal center thereof, and therefore a vibration of the entirety of the main controller 8 is enhanced by the vibration of the vibrator 46. Further, the connector 33 is mounted to the rear edge on the bottom main surface of the substrate 30. In addition to the components shown in FIG. 5 and FIG. 6, the main controller 8 includes a quartz oscillator for generating a reference clock for the microcomputer 42, an amplifier for outputting a sound signal to the speaker 47, and the like.

FIG. 7 is a perspective view showing a non-limiting exemplary external structure of the sub-controller 9. The sub-controller 9 includes a housing 80 formed by, for example, plastic molding. The overall size of the housing 80 is small enough to be held by one hand of an adult or even a child, similarly to the main controller 8. A player is allowed to perform a game operation also with the sub-controller 9 by operating buttons and a stick, and changing a position and an attitude of the controller itself.

As shown in FIG. 7, an analog joystick 81 is provided on the front edge side (on the Z2-axis positive direction side) of the top surface (on the Y2-axis negative direction side) of the housing 80. Further, a front edge surface is formed on the front edge of the housing 80 so as to be slightly sloped backward, which is not shown. On the front edge surface, a C button and a Z button are provided so as to be aligned in the upward/downward direction (in the Y2-axis direction shown in FIG. 7). The analog joystick 81 and the respective buttons (the C button and the Z button) are assigned functions in accordance with a game program executed by the game apparatus 3 according to need. The analog joystick 81 and the respective buttons may be collectively referred to as an "operation section 82 (see FIG. 8)".

The sub-controller 9 includes an acceleration sensor (an acceleration sensor 83 shown in FIG. 8) inside the housing 80, although it is not shown in FIG. 7. In the exemplary embodiment described herein, the acceleration sensor 83 is implemented as the same acceleration sensor as the acceleration sensor 37 of the main controller 8. However, the acceleration sensor 83 may not be implemented as the same acceleration sensor as the acceleration sensor 37. For example, the acceleration sensor 83 may be an acceleration sensor operable to detect an acceleration for a predetermined one axis or predetermined two axes.

Further, as shown in FIG. 7, one end of a cable is connected to the rear end of the housing 80. The other end of the cable is connected to a connector (a connector 84 shown in FIG. 8), although it is not shown in FIG. 7. The connector is able to connect with the connector 33 of the main controller 8. Namely, the main controller 8 and the sub-controller 9 are connected to each other by connecting between the connector 33 and the connector 84.

It is to be noted that the shape of each of the main controller 8 and the sub-controller 9, the shapes of the operation buttons, the number of the acceleration sensors and the number of the vibrators, the setting positions of the acceleration sensors and the vibrators, and the like, which are as described above with reference to FIG. 3 to FIG. 7, are merely examples.

The other shapes, numbers, and setting positions may be used. Further, in the exemplary embodiment described herein, an imaging direction of the imaging means of the main controller 8 is the Z1 axis positive direction. However, the imaging direction may be any direction. Namely, the position (the light incident surface 35*a* of the imaging information calculation section 35) of the imaging information calculation section 35 of the controller 5 may not be the front surface of the housing 31. The imaging information calculation section 35 may be provided on any other surface on which light from the outside of the housing 31 can be incident.

Figure 8:
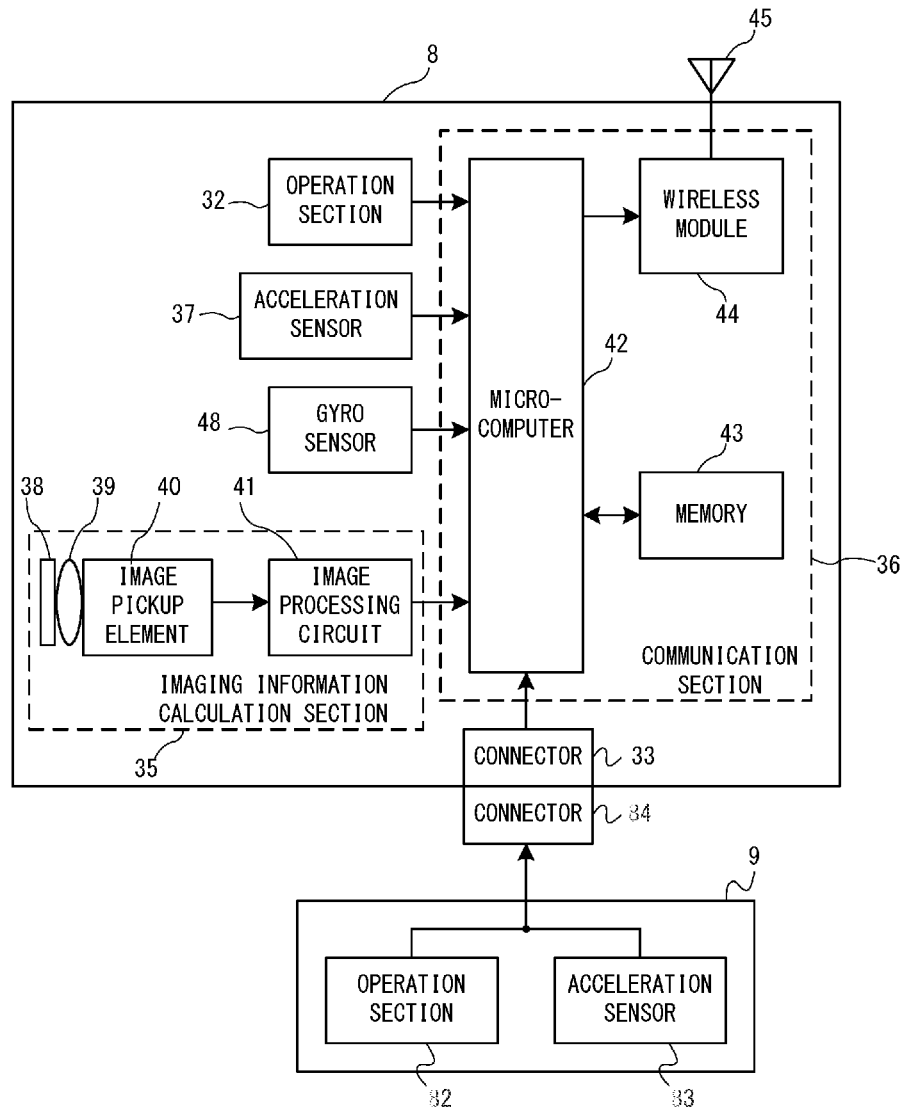
FIG. 8 is a block diagram showing a non-limiting exemplary structure of a controller 5.

FIG. 8 is a block diagram showing a non-limiting exemplary structure of the controller 5. As shown in FIG. 8, the main controller 8 includes the operation section 32 (the operation buttons 32*a* to 32*i*), the imaging information calculation section 35, a communication section 36, the acceleration sensor 37, and the gyro sensor 48. Further, the sub-controller 9 includes the operation section 82 and the acceleration sensor 83. The controller 5 transmits data representing contents of an operation performed on the controller 5, as operation data, to the game apparatus 3. In the following description, the operation data transmitted by the controller 5 may be referred to as "controller operation data", and the operation data transmitted by the terminal device 7 may be referred to as "terminal operation data."

The operation section 32 includes the operation buttons 32*a* to 32*i* described above, and outputs, to the microcomputer 42 of the communication section 36, operation button data representing an input state (whether or not each of the operation buttons 32*a* to 32*i* has been pressed) of each of the operation buttons 32*a* to 32*i*.

The imaging information calculation section 35 is a system for analyzing data of an image taken by the imaging means, identifying an area thereof having a high brightness, and calculating the position of the center of gravity, the size, and the like of the area. The imaging information calculation section 35 has, for example, a maximum sampling period of about 200 frames/sec., and therefore can trace and analyze even a relatively fast motion of the controller 5.

The imaging information calculation section 35 includes the infrared filter 38, the lens 39, the image pickup element 40, and the image processing circuit 41. The infrared filter 38 allows only infrared light to pass therethrough, among light incident on the front surface of the controller 5. The lens 39 collects the infrared light which has passed through the infrared filter 38, and outputs the infrared light to the image pickup element 40. The image pickup element 40 is a solid-state image pick-up device such as, for example, a CMOS sensor or a CCD sensor. The image pickup element 40 receives the infrared light collected by the lens 39, and outputs an image signal. The marker section 55 of the terminal device 7 and the marker device 6, which are imaging subjects the images of which are taken, are formed of markers for outputting infrared light. Accordingly, when the infrared filter 38 is provided, the image pickup element 40 receives only the infrared light which has passed through the infrared filter 38, and generates image data, so that images of the imaging subjects (the marker section 55 and/or the maker device 6) can be accurately taken. Hereinafter, the image taken by the image pickup element 40 is referred to as a taken image. The image data generated by the image pickup element 40 is processed by the image processing circuit 41. The image processing circuit 41 calculates a position of the imaging subject in the taken image. The image processing circuit 41 outputs data of a coordinate representing the calculated position, to the microcomputer 42 of the communication section 36. The data representing the coordinate is transmitted as the operation data to the game apparatus 3 by the microcomputer 42. Hereinafter, the coordinate is referred to as a "marker coordinate". The marker coordinate represents various values so as to correspond to an attitude (tilt angle) and/or a position of the controller 5. Therefore, the game apparatus 3 is able to calculate the attitude and/or the position of the controller 5 by using the marker coordinate.

In another exemplary embodiment, the controller 5 may not include the image processing circuit 41. The taken image itself may be transmitted from the controller 5 to the game apparatus 3. In this case, the game apparatus 3 includes a circuit or a program having a function equivalent to the function of the image processing circuit 41, thereby calculating the marker coordinate.

The acceleration sensor 37 detects an acceleration (including the gravitational acceleration) of the controller 5, that is, a force (including the gravitational force) applied to the controller 5. The acceleration sensor 37 detects a value of an acceleration (linear acceleration) in the straight line direction along the sensing axis direction, among accelerations applied to a detection section of the acceleration sensor 37. For example, a multi-axes acceleration sensor having two or more axes detects accelerations of components along the axes, respectively, as an acceleration applied to the detection section of the acceleration sensor. It is to be noted that the acceleration sensor 37 is an electrostatic capacitance type MEMS (micro electro mechanical system) acceleration sensor. However, another type of acceleration sensor may be used.

In the exemplary embodiment described herein, the acceleration sensor 37 detects linear accelerations in three axial directions, that is, the up/down direction (the Y1 axis direction shown in FIG. 3) of the controller 5, the left/right direction (the X1 axis direction shown in FIG. 3) of the controller 5, and the forward/backward direction (the Z1 axis direction shown in FIG. 3) of the controller 5. The acceleration sensor 37 detects an acceleration in the straight line direction along each axis. Therefore, an output of the acceleration sensor 37 represents a value of the linear acceleration for each of the three axes. Namely, the detected acceleration is represented as a three-dimensional vector in an X1Y1Z1 coordinate system (a controller coordinate system) defined relative to the controller 5.

Data (acceleration data) representing an acceleration detected by the acceleration sensor 37 is outputted to the communication section 36. The acceleration detected by the acceleration sensor 37 is changed so as to correspond to an attitude (tilt angle) and a movement of the controller 5. Therefore, an attitude and a movement of the controller 5 can be calculated by using the acceleration data obtained by the game apparatus 3. In the exemplary embodiment described herein, the game apparatus 3 calculates an attitude, a tilt angle, and the like of the controller 5 based on the obtained acceleration data.

When a computer such as a processor (for example, the CPU 10) of the game apparatus 3 or a processor (for example, the microcomputer 42) of the controller 5 performs processing based on a signal of an acceleration outputted from the acceleration sensor 37 (and an acceleration sensor 63 described below), additional information relating to the controller 5 can be inferred or calculated (determined), as one skilled in the art will readily understand from the description herein. For example, a case where it is anticipated that the computer will perform processing on the assumption that the controller 5 having the acceleration sensor 37 mounted thereto is in a static state (that is, a case where it is anticipated that the computer will perform processing on the assumption that an acceleration detected by the acceleration sensor will include only the gravitational acceleration) will be described. When the controller 5 is actually in the static state, it is possible to determine whether or not the controller 5 tilts relative to the gravity direction and to also determine a degree of the tilt, based on the acceleration having been detected. Specifically, when a state where 1 G (gravitational acceleration) is applied to a detection axis of the acceleration sensor 37 in the vertically downward direction represents a reference, it is possible to determine whether or not the controller 5 tilts relative to the reference, based on whether 1 G (gravitational acceleration) is applied, and to determine a degree of tilt of the controller 5 relative to the reference, based on the magnitude of the detected acceleration. Further, in the case of the multi-axes acceleration sensor 37, when a signal of an acceleration of each axis is further subjected to processing, a degree to the tilt of the controller 5 relative to the gravity direction can be determined with enhanced accuracy. In this case, the processor may calculate a tilt angle of the controller 5 based on an output from the acceleration sensor 37, or may calculate a direction in which the controller 5 tilts without calculating the tilt angle. Thus, when the acceleration sensor 37 is used in combination with the processor, a tilt angle or an attitude of the controller 5 can be determined On the other hand, in a case where it is anticipated that the controller 5 will be in a dynamic state (a state in which the controller 5 is being moved), the acceleration sensor 37 detects an acceleration based on a movement of the controller 5, in addition to the gravitational acceleration. Therefore, when the gravitational acceleration component is eliminated from the detected acceleration through a predetermined process, it is possible to determine a direction in which the controller 5 moves. Further, when it is anticipated that the controller 5 will be in the dynamic state, an acceleration component based on the movement of the acceleration sensor is eliminated from the detected acceleration through a predetermined process, whereby it is possible to determine the tilt of the controller 5 relative to the gravity direction. In another exemplary embodiment, the acceleration sensor 37 may include an embedded processor or another type of dedicated processor for performing a predetermined process of the acceleration signal detected by embedded acceleration detection means before the acceleration signal is outputted to the microcomputer 42. When, for example, the acceleration sensor 37 is used for detecting a static acceleration (for example, gravitational acceleration), the embedded or dedicated processor could convert the acceleration signal to a tilt angle (or another preferable parameter).

The gyro sensor 48 detects angular velocities around three axes (in the exemplary embodiment described herein, the X1, Y1, and Z1 axes). In the description herein, a direction of rotation around the X1 axis is referred to as a pitch direction, a direction of rotation around the Y1 axis is referred to as a yaw direction, and a direction of rotation around the Z1 axis is referred to as a roll direction. The gyro sensor 48 may detect angular velocities around the three axes, and the number of the gyro sensors to be used, and a manner in which the gyro sensors to be used are combined may be determined as desired. For example, the gyro sensor 48 may be a three-axes gyro sensor, or may be a gyro sensor obtained by combining a two-axes gyro sensor and a one axis gyro sensor with each other so as to detect angular velocities around the three axes. Data representing the angular velocity detected by the gyro sensor 48 is outputted to the communication section 36. Further, the gyro sensor 48 may detect an angular velocity around one axis or two axes.

Further, the operation section 82 of the sub-controller 9 includes the analog joystick 81, the C button, and the Z button as described above. The operation section 82 outputs stick data (referred to as sub-stick data) representing a direction in which the analog joystick 81 is tilted and an amount of the tilt of the analog joystick 81, and operation button data (referred to as sub-operation button data) representing an input state (whether or not each button is pressed) of each button, via the connector 84, to the main controller 8.

Further, the acceleration sensor 83 of the sub-controller 9, which is similar to the acceleration sensor 37 of the main controller 8, detects an acceleration (including the gravitational acceleration) of the sub-controller 9, that is, a force (including the gravitational force) applied to the sub-controller 9. The acceleration sensor 83 detects values of accelerations (linear accelerations) in the straight line directions along predetermined three-axial directions, among accelerations applied to a detection section of the acceleration sensor 83. Data (referred to as sub-acceleration data) representing the detected acceleration is outputted via the connector 84 to the main controller 8.

As described above, the sub-controller 9 outputs, to the main controller 8, sub-controller data including the sub-stick data, the sub-operation button data, and the sub-acceleration data described above.

The communication section 36 of the main controller 8 includes the microcomputer 42, a memory 43, a wireless module 44, and the antenna 45. The microcomputer 42 controls the wireless module 44 for wirelessly transmitting data obtained by the microcomputer 42 to the game apparatus 3, while using the memory 43 as a storage area in order to perform processing.

The sub-controller data transmitted from the sub-controller 9 is inputted to the microcomputer 42, and temporarily stored in the memory 43. Further, data (referred to as main controller data) outputted to the microcomputer 42 from the operation section 32, the imaging information calculation section 35, the acceleration sensor 37, and the gyro sensor 48 is temporarily stored in the memory 43. The main controller data and the sub-controller data are transmitted as the operation data (controller operation data) to the game apparatus 3. Specifically, the microcomputer 42 outputs, to the wireless module 44, the operation data stored in the memory 43 at a time at which the data is to be transmitted to the controller communication module 19 of the game apparatus 3. The wireless module 44 uses, for example, the Bluetooth (registered trademark) technology to modulate the operation data onto a carrier wave of a predetermined frequency, and emits the low power radio wave signal from the antenna 45. Namely, the operation data is modulated into the low power radio wave signal by the wireless module 44, and transmitted from the controller 5. The low power radio wave signal is received by the controller communication module 19 on the game apparatus 3 side. The game apparatus 3 demodulates or decodes the received low power radio wave signal to obtain the operation data. The CPU 10 of the game apparatus 3 uses the operation data received from the controller 5 to perform a game process. The wireless transmission from the communication section 36 to the controller communication module 19 is sequentially performed at predetermined time intervals. Since the game process is generally performed at a cycle of 1/60 sec. (as one frame time), data preferably needs to be transmitted at a cycle of 1/60 sec. or a shorter cycle. For example, the communication section 36 of the controller 5 outputs the operation data to the controller communication module 19 of the game apparatus 3 every 1/200 seconds.

As described above, the main controller 8 is able to transmit the marker coordinate data, the acceleration data, the angular velocity data, and the operation button data as the operation data representing an operation performed on the main controller 8. The sub-controller 9 is able to transmit the acceleration data, the sub-stick data, and the operation button data as the operation data representing an operation performed on the sub-controller 9. Further, the game apparatus 3 executes the game process by using the operation data as a game input. Therefore, by using the controller 5, a user is allowed to perform a game operation of moving the controller 5 itself in addition to a conventional game operation of pressing each operation button. For example, a user is allowed to perform, for example, operations of tilting the main controller 8 and/or the sub-controller 9 at desired attitudes, an operation of indicating a desired position on the screen by using the main controller 8, and operations of moving the main controller 8 and/or the sub-controller 9.

Further, although, in the exemplary embodiment described herein, the controller 5 does not have display means for displaying a game image, the controller 5 may have display means for displaying, for example, an image indicative of a remaining battery power.

[4. Structure of Terminal Device 7]

Figure 10:
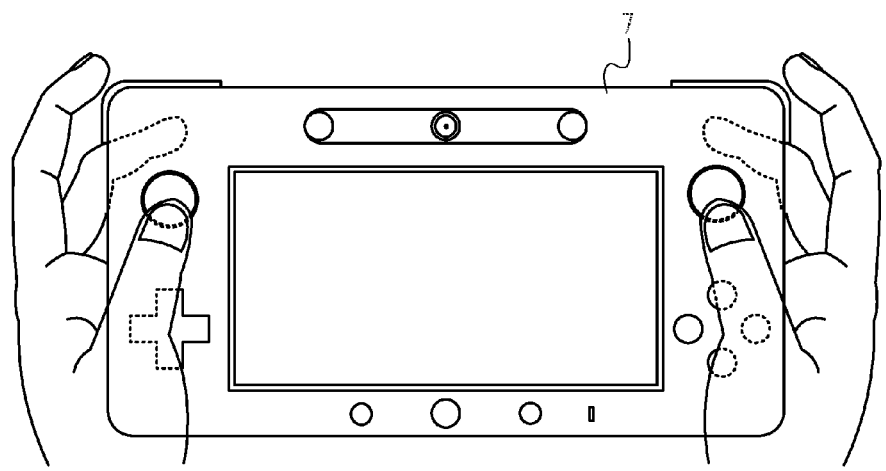
FIG. 10 shows a non-limiting exemplary state in which a user holds the terminal device 7.

Next, a structure of the terminal device 7 will be described with reference to FIGS. 9 to 11. FIG. 9 shows a non-limiting exemplary external structure of the terminal device 7. (a) of FIG. 9 is a front view showing a non-limiting example of the terminal device 7, (b) of FIG. 9 is a top view thereof, (c) of FIG. 9 is a right side view thereof, and (d) of FIG. 9 is a bottom view thereof. FIG. 10 shows a non-limiting exemplary state in which a user holds the terminal device 7.

As shown in FIG. 9, the terminal device 7 includes a housing 50 which approximately has a horizontally long plate-like rectangular shape. The housing 50 is small enough to be held by a user. Therefore, the user is allowed to hold and move the terminal device 7, and change the location of the terminal device 7.

The terminal device 7 includes an LCD 51 on a front surface of the housing 50. The LCD 51 is provided near the center of the front surface of the housing 50. Therefore, as shown in FIG. 10, by holding the housing 50 at portions to the right and the left of the LCD 51, a user is allowed to hold and move the terminal device while viewing a screen of the LCD 51. FIG. 10 shows an exemplary case in which a user holds the terminal device 7 horizontally (with the longer sides of the terminal device 7 being oriented horizontally) by holding the housing 50 at portions to the right and the left of the LCD 51. However, the user may hold the terminal device 7 vertically (with the longer sides of the terminal device 7 being oriented vertically).

As shown in (a) of FIG. 9, the terminal device 7 includes, as operation means, a touch panel 52 on the screen of the LCD 51. In the exemplary embodiment described herein, the touch panel 52 is, but is not limited to, a resistive film type touch panel. However, a touch panel of any type, such as electrostatic capacitance type touch panel, may be used. The touch panel 52 may be of single touch type or multiple touch type. In the exemplary embodiment described herein, the touch panel 52 has the same resolution (detection accuracy) as that of the LCD 51. However, the resolution of the touch panel 52 and the resolution of the LCD 51 need not be the same. Although an input onto the touch panel 52 is usually performed by using a touch pen, a finger of a user, in addition to the touch pen, may be used for performing an input onto the touch panel 52. The housing 50 may have an opening for accommodating the touch pen used for performing an operation on the touch panel 52. Thus, since the terminal device 7 has the touch panel 52, a user is allowed to operate the touch panel 52 while moving the terminal device 7. That is, the user is allowed to directly (by using the touch panel 52) perform an input onto the screen of the LCD 51 while moving the screen of the LCD 51.

As shown in FIG. 9, the terminal device 7 has, as operation means, two analog sticks 53A and 53B, and a plurality of buttons 54A to 54L. The analog sticks 53A and 53B are each a device for designating a direction. The analog sticks 53A and 53B are each configured such that a stick part operated by a finger of the user is slidable (or tiltable) in any direction (at any angle in any direction such as the upward, the downward, the rightward, the leftward, or the diagonal direction) relative to the front surface of the housing 50. The left analog stick 53A is provided to the left of the screen of the LCD 51, and the right analog stick 53B is provided to the right of the screen of the LCD 51. Therefore, the user is allowed to perform an input for designating a direction by using the analog stick with either the left hand or the right hand. Further, as shown in FIG. 10, the analog sticks 53A and 53B are positioned so as to be operated by the user holding the right and left portions of the terminal device 7. Therefore, the user is allowed to easily operate the analog sticks 53A and 53B also when the user holds and moves the terminal device 7.

The buttons 54A to 54L are each operation means for performing a predetermined input. As described below, the buttons 54A to 54L are positioned so as to be operated by the user holding the right and left portions of the terminal device 7 (see FIG. 10). Accordingly, the user is allowed to easily operate the operation means when the user holds and moves the terminal device 7.

As shown in (a) of FIG. 9, among the operation buttons 54A to 54L, the cross button (direction input button) 54A and the buttons 54B to 54H are provided on the front surface of the housing 50. Namely, the buttons 54A to 54H are positioned so as to be operated by a thumb of the user (see FIG. 10).

The cross button 54A is provided to the left of the LCD 51 below the left analog stick 53A. That is, the cross button 54A is positioned so as to be operated by the left hand of the user. The cross button 54A is cross-shaped, and is capable of designating an upward, a downward, a leftward, or a rightward direction. The buttons 54B to 54D are provided below the LCD 51. The three buttons 54B to 54D are positioned so as to be operated by the right and left hands of the user. The four buttons 54E to 54H are provided to the right of the LCD 51 below the right analog stick 53B. Namely the four buttons 54E to 54H are positioned so as to be operated by the right hand of the user. Further, the four buttons 54E, 54H, 54F, and 54G are positioned upward, downward, leftward, and rightward, respectively, (with respect to a center position of the four buttons). Accordingly, the terminal device 7 may cause the four buttons 54E to 54H to function as buttons which allow the user to designate an upward, a downward, a leftward, or a rightward direction.

As shown in (a), (b), and (c) of FIG. 9, a first L button 54I and a first R button 54J are provided on diagonally upper portions (an upper left portion and an upper right portion) of the housing 50. Specifically, the first L button 54I is provided on the left end of the upper side surface of the plate-shaped housing 50 so as to protrude from the upper and left side surfaces. The first R button 54J is provided on the right end of the upper side surface of the housing 50 so as to protrude from the upper and right side surfaces. In this way, the first L button 54I is positioned so as to be operated by the index finger of the left hand of the user, and the first R button 54J is positioned so as to be operated by the index finger of the right hand of the user (see FIG. 10).

As shown in (b) and (c) of FIG. 9, leg parts 59A and 59B are provided so as to protrude from a rear surface (i.e., a surface reverse of the front surface on which the LCD 51 is provided) of the plate-shaped housing 50, and a second L button 54K and a second R button 54L are provided on the leg parts 59A and 59B, respectively. Specifically, the second L button 54K is provided at a slightly upper position on the left side (the left side as viewed from the front surface side) of the rear surface of the housing 50, and the second R button 54L is provided at a slightly upper position on the right side (the right side as viewed from the front surface side) of the rear surface of the housing 50. In other words, the second L button 54K is provided at a position substantially opposite to the position of the left analog stick 53A provided on the front surface, and the second R button 54L is provided at a position substantially opposite to the position of the right analog stick 53B provided on the front surface. Thus, the second L button 54K is positioned so as to be operated by the middle finger of the left hand of the user, and the second R button 54L is positioned so as to be operated by the middle finger of the right hand of the user (see FIG. 10). Further, as shown in (c) of FIG. 9, the leg parts 59A and 59B each have a surface facing diagonally upward, and the second L button 54K and the second R button 54L are provided on the diagonally upward facing surfaces of the leg parts 59A and 59B, respectively. Thus, the second L button 54K and the second R button 54L each have a button surface facing diagonally upward. Since it is supposed that the middle fingers of the user move vertically when the user holds the terminal device 7, the upward facing button surfaces allow the user to easily press the second L button 54K and the second R button 54L. Further, the leg parts provided on the rear surface of the housing 50 allow the user to easily hold the housing 50. Moreover, the buttons provided on the leg parts allow the user to easily perform operation while holding the housing 50.

In the terminal device 7 shown in FIG. 9, the second L button 54K and the second R button 54L are provided on the rear surface of the housing 50. Therefore, if the terminal device 7 is placed with the screen of the LCD 51 (the front surface of the housing 50) facing upward, the screen of the LCD 51 may not be perfectly horizontal. Accordingly, in another exemplary embodiment, three or more leg parts may be provided on the rear surface of the housing 50. In this case, if the terminal device 7 is placed on a floor with the screen of the LCD 51 facing upward, the three or more leg parts contact with the floor (or another horizontal surface). Thus, the terminal device 7 can be placed with the screen of the LCD 51 being horizontal. Such a horizontal placement of the terminal device 7 may be achieved by additionally providing detachable leg parts.

The respective buttons 54A to 54L are assigned functions, according to need, in accordance with a game program. For example, the cross button 54A and the buttons 54E to 54H may be used for direction designation operation, selection operation, and the like, and the buttons 54B to 54D may be used for determination operation, cancellation operation, and the like.

The terminal device 7 includes a power button (not shown) for turning on/off the power of the terminal device 7. The terminal device 7 may include a button for turning on/off screen display of the LCD 51, a button for performing connection setting (pairing) for connecting with the game apparatus 3, and a button for adjusting a sound volume of loudspeakers (loudspeakers 67 shown in FIG. 11).

As shown in (a) of FIG. 9, the terminal device 7 includes a marker section (a marker section 55 shown in FIG. 11) having a marker 55A and a marker 55B, on the front surface of the housing 50. The marker section 55 may be provided at any position. In the exemplary embodiment described herein, the marker section 55 is provided above the LCD 51. The markers 55A and 55B are each implemented as one or more infrared LEDs, like the markers 6L and 6R of the marker device 6. The marker section 55 is used, like the marker device 6, for causing the game apparatus 3 to calculate, for example, a movement of the controller 5 (the main controller 8). The game apparatus 3 is capable of controlling the infrared LEDs of the marker section 55 to be on or off The terminal device 7 includes a camera 56 as imaging means. The camera 56 includes an image pickup element (e.g., a CCD image sensor or a CMOS image sensor) having a predetermined resolution, and a lens. As shown in FIG. 9, in the exemplary embodiment describe herein, the camera 56 is provided on the front surface of the housing 50. Accordingly, the camera 56 is capable of taking an image of the face of the user holding the terminal device 7. For example, the camera 56 is capable of taking an image of the user playing a game while viewing the LCD 51. In another exemplary embodiment, one or more camera may be included in the terminal device 7.

The terminal device 7 has a microphone (a microphone 69 shown in FIG. 11) as sound input means. A microphone hole 60 is provided in the front surface of the housing 50. The microphone 69 is embedded in the housing 50 at a position inside the microphone hole 60. The microphone detects for sound, such as user's voice, around the terminal device 7. In another exemplary embodiment, one or more microphone may be included in the terminal device 7.

The terminal device 7 has loudspeakers (loudspeakers 67 shown in FIG. 11) as sound output means. As shown in (d) of FIG. 9, loudspeaker holes 57 are provided in the lower side surface of the housing 50. Sound is outputted through the speaker holes 57 from the loudspeakers 67. In the exemplary embodiment described herein, the terminal device 7 has two loudspeakers, and the speaker holes 57 are provided at positions corresponding to a left loudspeaker and a right loudspeaker, respectively. The number of loudspeakers included in the terminal device 7 may be any number, and additional loudspeakers, in addition to the two loudspeakers, may be provided in the terminal device 7.

The terminal device 7 includes an extension connector 58 for connecting another device to the terminal device 7. In the exemplary embodiment described herein, as shown in (d) of FIG. 9, the extension connector 58 is provided in the lower side surface of the housing 50. Any device may be connected to the extension connector 58. For example, a controller (a gun-shaped controller or the like) used for a specific game or an input device such as a keyboard may be connected to the extension connector 58. If another device need not be connected, the extension connector 58 need not be provided.

In the terminal device 7 shown in FIG. 9, the shapes of the operation buttons and the housing 50, the number of the respective components, and the positions in which the components are provided, are merely examples. The shapes, numbers, and positions may be different from those described above.

Next, an internal structure of the terminal device 7 will be described with reference to FIG. 11. FIG. 11 is a block diagram showing a non-limiting exemplary internal structure of the terminal device 7. As shown in FIG. 11, the terminal device 7 includes, in addition to the components shown in FIG. 9, a touch panel controller 61, a magnetic sensor 62, the acceleration sensor 63, the gyro sensor 64, a user interface controller (UI controller) 65, a codec LSI 66, the loudspeakers 67, a sound IC 68, the microphone 69, a wireless module 70, an antenna 71, an infrared communication module 72, a flash memory 73, a power supply IC 74, a battery 75, and a vibrator 79. These electronic components are mounted on an electronic circuit board and accommodated in the housing 50.

The UI controller 65 is a circuit for controlling data input to various input sections and data output from various output sections. The UI controller 65 is connected to the touch panel controller 61, the analog stick 53(the analog sticks 53A and 53B), the operation button 54 (the operation buttons 54A to 54L), the marker section 55, the magnetic sensor 62, the acceleration sensor 63, the gyro sensor 64, and the vibrator 79. Further, the UI controller 65 is connected to the codec LSI 66 and the extension connector 58. The power supply IC 74 is connected to the UI controller 65, so that power is supplied to the respective components through the UI controller 65. The internal battery 75 is connected to the power supply IC 74, so that power is supplied from the internal battery 75. Further, a battery charger 76 or a cable, which is supplied with power from an external power supply, may be connected to the power supply IC 74 via a connector or the like. In this case, the terminal device 7 can be supplied with power and charged from the external power supply by using the battery charger 76 or the cable. Charging of the terminal device 7 may be performed by setting the terminal device 7 on a cradle (not shown) having a charging function.

The touch panel controller 61 is a circuit which is connected to the touch panel 52, and controls the touch panel 52. The touch panel controller 61 generates a predetermined form of touch position data, based on a signal from the touch panel 52, and outputs the touch position data to the UI controller 65. The touch position data represents a coordinate of a position (the position may be a plurality of positions when the touch panel 52 is a multiple touch type one) at which an input is performed on an input surface of the touch panel 52. The touch panel controller 61 reads a signal from the touch panel 52 and generates the touch position data every predetermined period of time. Further, various control instructions for the touch panel 52 are output from the UI controller 65 to the touch panel controller 61.

The analog stick 53 outputs, to the UI controller 65, stick data representing a direction in which the stick part operated by a finger of the user slides (or tilts), and an amount of the sliding (tilting). The operation button 54 outputs, to the UI controller 65, operation button data representing an input state of each of the operation buttons 54A to 54L (whether or not each of the operation buttons is pressed).

The magnetic sensor 62 detects the magnitude and direction of a magnetic field to detect an orientation. Orientation data representing the detected orientation is outputted to the UI controller 65. The UI controller 65 outputs, to the magnetic sensor 62, a control instruction for the magnetic sensor 62. Examples of the magnetic sensor 62 include: sensors using, for example, an MI (Magnetic Impedance) device, a fluxgate sensor, a hall device, a GMR (Giant Magneto Resistance) device, a TMR (Tunneling Magneto Resistance) device, and an AMR (Anisotropic Magneto Resistance) device. However, any sensor may be adopted as long as the sensor can detect an orientation. Strictly speaking, the obtained orientation data does not represent an orientation in a place where a magnetic field in addition to the geomagnetism is generated. Even in such a case, it is possible to calculate a change in the attitude of the terminal device 7 because the orientation data changes when the terminal device 7 moves.

The acceleration sensor 63 is provided inside the housing 50. The acceleration sensor 63 detects the magnitudes of linear accelerations along three axial directions (XYZ axial directions shown in (a) of FIG. 9), respectively. Specifically, the long side direction of the housing 50 is defined as the Z-axial direction, the short side direction of the housing 50 is defined as the X-axial direction, and the direction orthogonal to the front surface of the housing 50 is defined as the Y-axial direction, and the acceleration sensor 63 detects the magnitudes of the linear accelerations in the respective axial directions. Acceleration data representing the detected accelerations is outputted to the UI controller 65. The UI controller 65 outputs, to the acceleration sensor 63, a control instruction for the acceleration sensor 63. In the exemplary embodiment described herein, the acceleration sensor 63 is, for example, an electrostatic capacitance type MEMS acceleration sensor. However, in another exemplary embodiment, another type of acceleration sensor may be used. Further, the acceleration sensor 63 may be an acceleration sensor for detecting the magnitude of acceleration in one axial direction or two axial directions.

The gyro sensor 64 is provided inside the housing 50. The gyro sensor 64 detects angular velocities around the three axes of the above-described X-axis, Y-axis, and Z-axis, respectively. Angular velocity data representing the detected angular velocities is outputted to the UI controller 65. The UI controller 65 outputs, to the gyro sensor 64, a control instruction for the gyro sensor 64. Any number and any combination of gyro sensors may be used as long as the angular velocities around three axes are detected. The gyro sensor 64 may include a two-axes gyro sensor and a one-axis gyro sensor, like the gyro sensor 48. Alternatively, the gyro sensor 64 may be a gyro sensor for detecting an angular velocity around one axis or two axes.

The vibrator 79 is, for example, a vibration motor or a solenoid. The vibrator 79 is connected to the UI controller 65. The terminal device 7 is vibrated by actuating the vibrator 79 according to an instruction from the UI controller 65. The vibration is conveyed to the user's hand holding the terminal device 7. Thus, a so-called vibration-feedback game is realized.

The UI controller 65 outputs, to the codec LSI 66, the operation data (the terminal operation data) including the touch position data, the stick data, the operation button data, the orientation data, the acceleration data, and the angular velocity data, which have been received from the respective components. If another device is connected to the terminal device 7 through the extension connector 58, data representing operation on the other device may be also included in the operation data.

The codec LSI 66 is a circuit for subjecting data to be transmitted to the game apparatus 3 to a compression process, and subjecting data transmitted from the game apparatus 3 to a decompression process. The LCD 51, the camera 56, the sound IC 68, the wireless module 70, the flash memory 73, and the infrared communication module 72 are connected to the codec LSI 66. The codec LSI 66 includes a CPU 77 and an internal memory 78. Although the terminal device 7 is configured not to perform a game process, the terminal device 7 needs to execute at least a program for managing the terminal device 7 and a program for communication. A program stored in the flash memory 73 is loaded into the internal memory 78 and executed by the CPU 77 when the terminal device 7 is powered on, thereby starting up the terminal device 7. A part of the area of the internal memory 78 is used as a VRAM for the LCD 51.

The camera 56 takes an image in accordance with an instruction from the game apparatus 3, and outputs data of the taken image to the codec LSI 66. The codec LSI 66 outputs, to the camera 56, a control instruction for the camera 56, such as an instruction to take an image. The camera 56 is also capable of taking a moving picture. That is, the camera 56 is capable of repeatedly performing image taking, and repeatedly outputting image data to the codec LSI 66.

The sound IC 68 is connected to the loudspeakers 67 and the microphone 69. The sound IC 68 is a circuit for controlling input of sound data from the microphone 69 to the codec LSI 66 and output of sound data to the loudspeakers 67 from the codec LSI 66. Specifically, when the sound IC 68 receives sound data from the codec LSI 66, the sound IC 68 performs D/A conversion on the sound data, and outputs a resultant sound signal to the loudspeakers 67 to cause the loudspeakers 67 to output sound. The microphone 69 detects sound (such as user's voice) propagated to the terminal device 7, and outputs a sound signal representing the sound to the sound IC 68. The sound IC 68 performs A/D conversion on the sound signal from the microphone 69, and outputs a predetermined form of sound data to the codec LSI 66.

The codec LSI 66 transmits the image data from the camera 56, the sound data from the microphone 69, and the operation data from the UI controller 65, as the terminal operation data, to the game apparatus 3 through the wireless module 70. In the exemplary embodiment described herein, the codec LSI 66 subjects the image data and the sound data to a compression process similar to that performed by the codec LSI 27. The compressed image data and sound data, and the terminal operation data are outputted to the wireless module 70 as transmission data. The antenna 71 is connected to the wireless module 70, and the wireless module 70 transmits the transmission data to the game apparatus 3 through the antenna 71. The wireless module 70 has the same function as the terminal communication module 28 of the game apparatus 3. That is, the wireless module 70 has a function of connecting to a wireless LAN by a method based on, for example, the IEEE802.11n standard. The transmitted data may be encrypted according to need, or may not be encrypted.

As described above, the transmission data transmitted from the terminal device 7 to the game apparatus 3 includes the operation data (the terminal operation data), the image data, and the sound data. If another device is connected to the terminal device 7 through the extension connector 58, data received from the other device may be also included in the transmission data. The infrared communication module 72 performs infrared communication with another device based on, for example, the IRDA standard. The codec LSI 66 may include, in the transmission data, data received by the infrared communication, and transmit the transmission data to the game apparatus 3, according to need.

As described above, the compressed image data and sound data are transmitted from the game apparatus 3 to the terminal device 7. These data are received by the codec LSI 66 through the antenna 71 and the wireless module 70. The codec LSI 66 decompresses the received image data and sound data. The decompressed image data is outputted to the LCD 51, and an image is displayed on the LCD 51. On the other hand, the decompressed sound data is outputted to the sound IC 68, and the sound IC 68 outputs sound through the loudspeakers 67.

When control data is included in the data received from the game apparatus 3, the codec LSI 66 and the UI controller 65 issue control instructions for the respective components, according to the control data. As described above, the control data represents control instructions for the respective components (in the exemplary embodiment described herein, the camera 56, the touch panel controller 61, the marker section 55, the sensors 62 to 64, the infrared communication module 72, and the vibrator 79) included in the terminal device 7. In the exemplary embodiment describe herein, the control instructions represented by the control data are considered to be instructions to start and halt (stop) the operations of the above-mentioned components. That is, some components which are not used for a game may be halted to reduce power consumption. In this case, data from the halted components are not included in the transmission data transmitted from the terminal device 7 to the game apparatus 3. Since the marker section 55 is implemented as infrared LEDs, the marker section 55 is controlled by simply turning on/off the supply of power thereto.

As described above, the terminal device 7 includes the operation means such as the touch panel 52, the analog stick 53, and the operation button 54. In another exemplary embodiment, however, the terminal device 7 may include other operation means instead of or in addition to these operation means.

The terminal device 7 includes the magnetic sensor 62, the acceleration sensor 63, and the gyro sensor 64 as sensors for calculating the movement (including the position and the attitude, or a change in the position and the attitude) of the terminal device 7. In another exemplary embodiment, however, the terminal device 7 may include one or two of these sensors. In still another exemplary embodiment, the terminal device 7 may include other sensors instead of or in addition to these sensors.

The terminal device 7 includes the camera 56 and the microphone 69. In another exemplary embodiment, however, the terminal device 7 may not include the camera 56 and the microphone 69, or may include either of the cameral 56 and the microphone 69.

The terminal device 7 includes the marker section 55 as a component for calculating the positional relation between the terminal device 7 and the main controller 8 (such as the position and/or the attitude of the terminal device 7 as viewed from the main controller 8). In another exemplary embodiment, however, the terminal device 7 may not include the marker section 55. In still another exemplary embodiment, the terminal device 7 may include other means as a component for calculating the above-mentioned positional relation. For example, in another exemplary embodiment, the main controller 8 may include a marker section, and the terminal device 7 may include an image pickup element. In this case, the marker device 6 may include an image pickup element instead of an infrared LED.

[5. Outline of Game Processing]

Figure 12A:
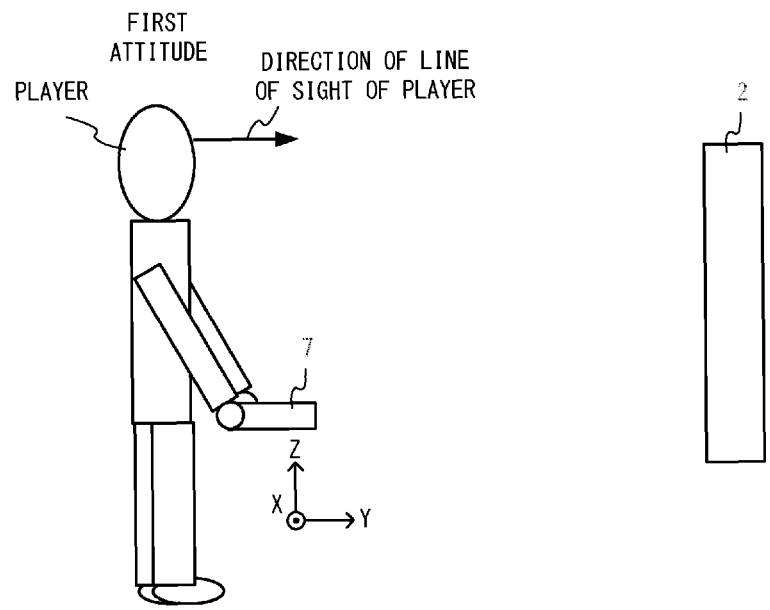
FIG. 12A shows a non-limiting example of a basic posture of a player when playing the game, in which posture the player holds the terminal device 7 in a first attitude.
Figure 12B:
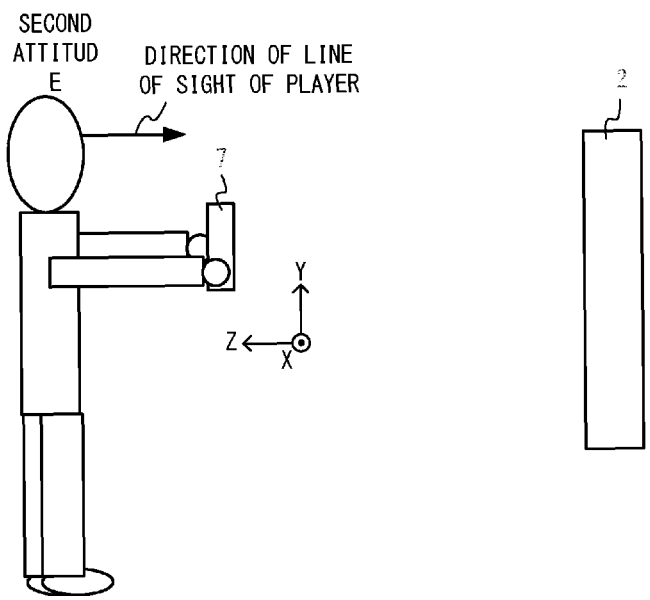
FIG. 12B shows a non-limiting example of a basic posture of a player when playing the game, in which posture the player holds the terminal device 7 in a second attitude.
Figure 13A:
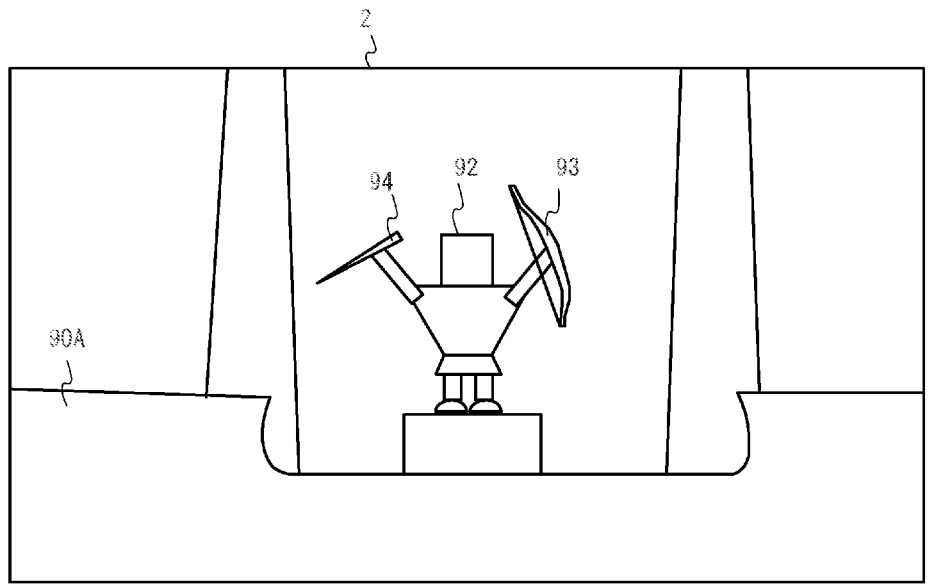
FIG. 13A shows a non-limiting example of a television game image displayed on a television 2 when the terminal device 7 is held in the first attitude.
Figure 13B:
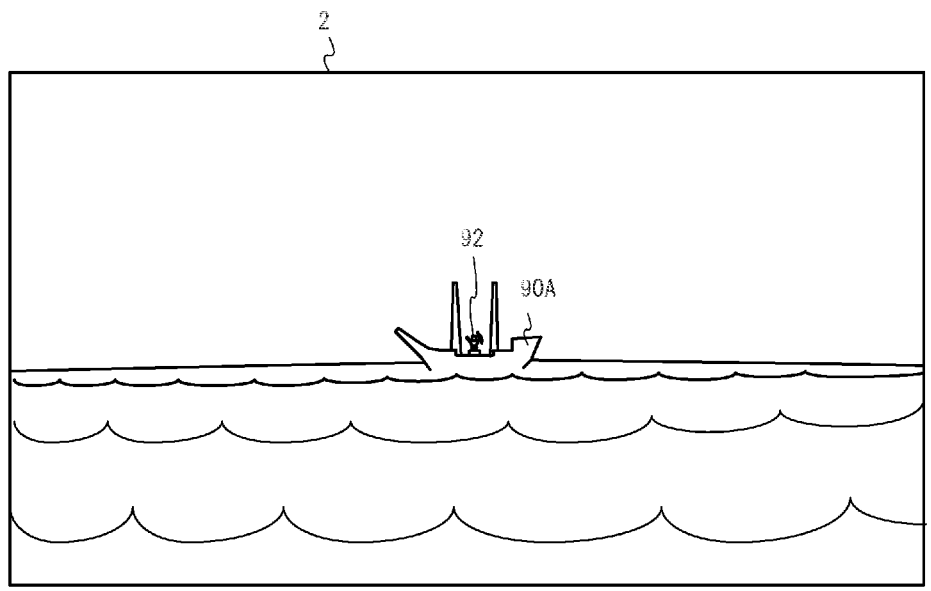
FIG. 13B shows a non-limiting example of a television game image displayed on the television 2 when the terminal device 7 is held in the second attitude.

Next, description will be given of the outline of game processing performed in the game system 1 of the exemplary embodiment. A game described in the exemplary embodiment is a rhythm game in which a player operates the terminal device 7, to the rhythm. The player holds the terminal device 7 and plays the game by changing the attitude of the terminal device 7 while looking at a game image displayed on the television 2 (television game image) and a game image displayed on the terminal device 7 (terminal game image). FIG. 12A shows a basic posture of a player when playing the game, in which posture the player holds the terminal device 7 in a first attitude. FIG. 12B shows a basic posture of a player when playing the game, in which posture the player holds the terminal device 7 in a second attitude. FIG. 13A shows an example of a television game image displayed on a television 2 when the terminal device 7 is held in the first attitude. FIG. 13B shows an example of a television game image displayed on the television 2 when the terminal device 7 is held in the second attitude. FIG. 14 shows positional relationship between objects arranged in a virtual space of the game.

As shown in FIG. 12A and FIG. 12B, the player basically faces the screen of the television 2 (hereinafter, "to face the screen of the television 2" may be referred to simply as "to face the television 2"), and plays the game while looking at the television 2 and the LCD 51 of the terminal device 7. Specifically, when the player holds the terminal device 7 in the first attitude, the player plays the game, looking at an image displayed on the screen of the television 2 (television game image). When the player holds the terminal device 7 in the second attitude, the player plays the game, looking at an image displayed on the LCD 51 of the terminal device 7 (terminal game image). As shown in FIG. 12A, the first attitude is an attitude in which the surface on which the LCD 51 of the terminal device 7 is provided is directed vertically upward (an attitude in which the Z-axis negative direction coincides with the direction of gravity) and in which the screen of the LCD 51 of the terminal device 7 is perpendicular to the direction of gravity. As shown in FIG. 12B, the second attitude is an attitude of the terminal device 7 in which the player holds the terminal device 7 with both hands, with his or her arms extended straight forward and in which the screen of the LCD 51 of the terminal device 7 is parallel to the direction of gravity.

As shown in FIG. 13A and FIG. 13B, a pirate ship 90A, a pirate 92, a bow 93, and an arrow 94 are displayed on the television 2. When the player holds the terminal device 7 in the first attitude, the pirate 92 is displayed in a zoomed-in manner. On the other hand, when the player holds the terminal device 7 in the second attitude, the pirate 92 is displayed in a zoomed-out manner. In this game, as shown in FIG. 14, the viewpoint of the player (the position of a first virtual camera) is set at a ship 91 in the virtual space, the pirate ship 90A is arranged to the front of the ship 91, a pirate ship 90B is arranged to the right of the ship 91, and a pirate ship 90C is arranged to the left of the ship 91. That is, in the exemplary embodiment, a game is performed in which the ship 91 where the player is on board is surrounded by the pirate ship 90A, the pirate ship 90B, and the pirate ship 90C. The image taking direction of the first virtual camera is fixed, and the gazing point of the first virtual camera is fixed to the pirate 92. It should be noted that the image taking direction of the first virtual camera is not necessarily fixed, and for example, the image taking direction may be changed in accordance with an operation performed onto the operation button of the terminal device 7 by the user or in accordance with the state of the game. When the player holds the terminal device 7 in the first attitude, the position of the first virtual camera is moved in the image taking direction of the first virtual camera and a zoom setting of the first virtual camera (the angle of view is reduced) is changed, whereby the pirate 92 is displayed in a zoomed-in manner. On the other hand, when the player changes the attitude of the terminal device 7 to the second attitude, the position of the first virtual camera is moved in a direction opposite to the image taking direction of the first virtual camera and the first virtual camera zooms out, whereby the pirate 92 is displayed in a zoomed-out manner. It should be noted that in the exemplary embodiment, the pirate ship 90B and the pirate ship 90C are arranged to the right and the left of the ship 91, respectively. However, the pirate ship 90B and the pirate ship 90C may be arranged at any positions. That is, the pirate ship 90B and the pirate ship 90C are arranged at positions at 90 degrees relative to the front of the ship 91 in the in the exemplary embodiment. However, these may be arranged at positions at, for example, 60 degrees relative to the front of the ship 91.

Figure 15A:
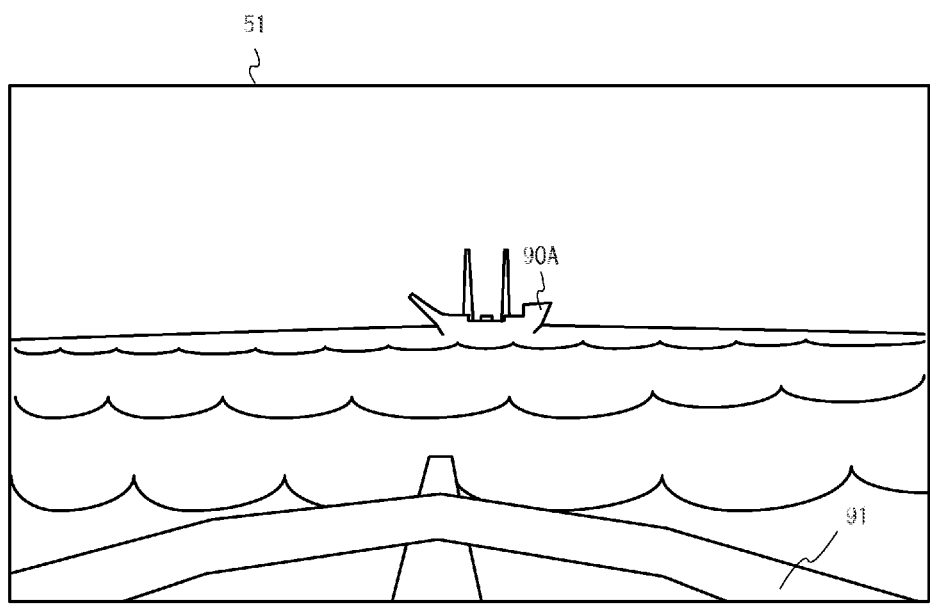
FIG. 15A shows a non-limiting example of a terminal game image displayed on the LCD 51 of the terminal device 7 at the time when the player is facing the front of the television 2 while holding the terminal device 7 in front of his or her face.
Figure 15B:
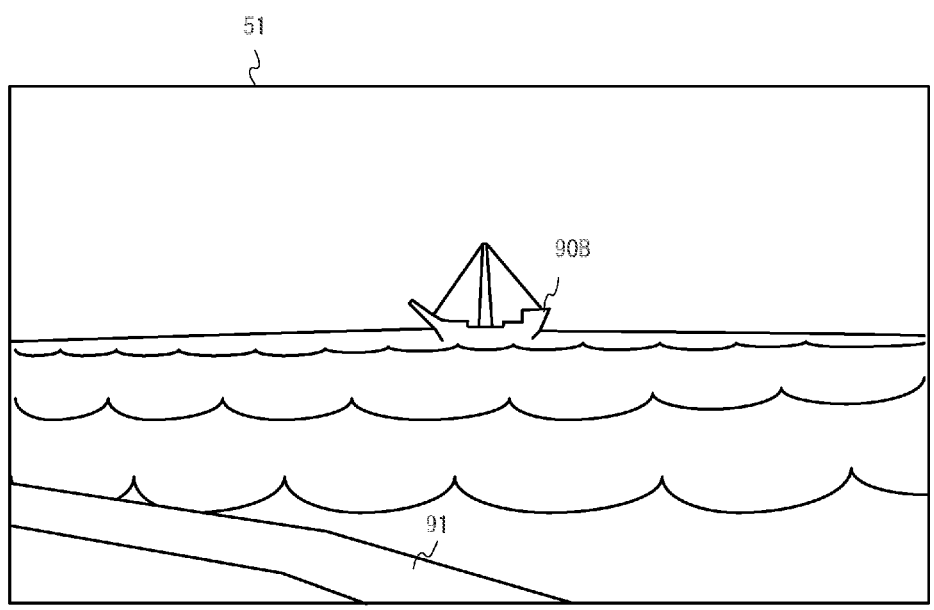
FIG. 15B shows a non-limiting example of a terminal game image displayed on the LCD 51 of the terminal device 7 at the time when the player is facing to the right relative to the television 2 while holding the terminal device 7 in front of his or her face.

FIG. 15A shows an example of a terminal game image displayed on the LCD 51 of the terminal device 7 at the time when the player is facing the front of the television 2 while holding the terminal device 7 in front of his or her face. FIG. 15B shows an example of a terminal game image displayed on the LCD 51 of the terminal device 7 at the time when the player is facing to the right relative to the television 2 while holding the terminal device 7 in front of his or her face.

As shown in FIG. 15A, when the player faces the front of the television 2, the pirate ship 90A and a part of the ship 91 are displayed on the LCD 51, but the pirate 92, the bow 93, and the arrow 94 are not displayed on the LCD 51. A terminal game image is an image that is obtained by a second virtual camera set on the ship 91 taking an image of the virtual space. The position of the second virtual camera is set to substantially the same as that of the first virtual camera when the pirate 92 is displayed in a zoomed-out manner. The angle of view of the second virtual camera is set to substantially the same as that of the first virtual camera when the pirate 92 is displayed in a zoomed-out manner. Therefore, the imaging range of the second virtual camera is substantially the same as that of the first virtual camera when the pirate 92 is displayed in a zoomed-out manner. When the player faces the front of the television 2 while holding the terminal device 7 in front of his or her face as shown in FIG. 12B, the surface opposite to the surface on which the screen of the LCD 51 of the terminal device 7 is provided faces the television 2. In such an attitude of the terminal device 7 (herein, this attitude may be referred to as "reference attitude"), the pirate ship 90A which is located to the front of the ship 91 is displayed on the LCD 51 of the terminal device 7. The "reference attitude" is an attitude in which the surface opposite to the surface on which the LCD 51 of the terminal device 7 is provided faces the television 2 and in which a straight line extended from the terminal device 7 in the Z-axis negative direction is substantially perpendicular to the screen of the television 2. When the terminal device 7 is in the reference attitude, the image taking direction of the second virtual camera coincides with the image taking direction of the first virtual camera, and the positions of the first virtual camera and the second virtual camera substantially coincide with each other.

The first attitude is an attitude in which the screen of the LCD 51 of the terminal device 7 is perpendicular to the direction of gravity. Therefore, no matter where the top surface of the terminal device 7 is directed as long as the screen of the LCD 51 of the terminal device 7 is perpendicular to the direction of gravity, the terminal device 7 is assumed to be in the first attitude. That is, independent of the degree of rotation of the terminal device 7 about the Z-axis, when the Z-axis negative direction of the terminal device 7 almost coincides with the direction of gravity, the terminal device 7 is assumed to be in the first attitude. Similarly, the second attitude is an attitude in which the screen of the LCD 51 of the terminal device 7 is parallel to the direction of gravity. Therefore, no matter where the surface opposite to the surface on which the screen of the LCD 51 of the terminal device 7 is provided is directed as long as the screen of the LCD 51 of the terminal device 7 is parallel to the direction of gravity, the terminal device 7 is assumed to be in the second attitude. That is, independent of the degree of rotation of the terminal device 7 about the Y-axis, when the Y-axis negative direction of the terminal device 7 almost coincides with the direction of gravity, the terminal device 7 is assumed to be in the second attitude. In contrast, the reference attitude is an attitude in which the Y-axis negative direction of the terminal device 7 coincides with the direction of gravity and in which the surface opposite to the surface on which the screen of the LCD 51 of the terminal device 7 is provided is directed to the television 2. That is, the reference attitude is an attitude of the terminal device 7 at the time when the player stands to the front of the television 2, holding the terminal device 7 with both hands, with his or her arms extended straight forward.

As shown in FIG. 15B, when the player faces to the right relative to the television 2 (see FIG. 20), the pirate ship 90B and a part of the ship 91 are displayed on the LCD 51 of the terminal device 7. When the player faces to the right relative to the television while holding the terminal device 7 in front of his or her face, the left side surface of the terminal device 7 faces the television 2. In such an attitude of the terminal device 7, the pirate ship 90B which is located to the right of the ship 91 is displayed on the LCD 51 of the terminal device 7.

As described above, when the player faces to the right relative to the television 2, the second virtual camera also faces to the right, and thus, the pirate ship 90B is displayed on the LCD 51. That is, the attitude of the second virtual camera is changed in accordance with the attitude of the terminal device 7, and the attitude of the second virtual camera is determined so as to coincide with the attitude of the terminal device 7. Specifically, the attitude of the second virtual camera is set in accordance with rotation angles about the respective axes (X, Y, and Z-axes), which are obtained by integrating by time angular velocities about the respective axes detected by the gyro sensor 64. It should be noted that the zoom setting of and the position in the image taking direction of the second virtual camera are not changed in accordance with the attitude of the terminal device 7.

On the other hand, even when the player faces to the right relative to the television 2, the image displayed on the television 2 is not changed. That is, the attitude of the first virtual camera is not changed in accordance with the attitude of the terminal device 7. However, as described above, the position and the zoom setting of the first virtual camera are changed in accordance with the attitude of the terminal device 7. Specifically, the position of the first virtual camera is moved from the ship 91 toward the pirate ship 90A in accordance with the rotation angle of the terminal device 7 about the X-axis, and concurrently the angle of view of the first virtual camera is reduced, whereby the pirate 92 is displayed in a zoomed-in manner as shown in FIG. 13A.

It should be noted that, in the exemplary embodiment, two virtual spaces are defined in the game apparatus 3, and the first virtual camera is set in one virtual space and the second virtual camera is set in the other virtual space. The same objects (the pirate ship 90A, background objects, etc.) are arranged in each of the two virtual spaces, and the same objects are displayed on each screen. Therefore, the television 2 and the terminal device 7 display respective images as if they had been obtained by different virtual cameras imaging the same virtual space. Meanwhile, when FIG. 13B is compared with FIG. 15A, FIG. 13B shows the pirate 92 but FIG. 15A does not show the pirate 92, although they are basically similar images. The pirate 92 and the like are not arranged in the other virtual space for which the second virtual camera is provided. Since the terminal device 7 is a portable display device, the dimensions of the screen are limited, and thus, even if a small image of the pirate 92 is displayed on the LCD 51 of the terminal device 7, the player cannot recognize the image. Therefore, the pirate 92 is not displayed on the LCD 51 of the terminal device 7. It should be noted that, in another exemplary embodiment, one virtual space may be defined, and two virtual cameras may be arranged in one virtual space. Alternatively, two virtual spaces may be defined, and identical objects (the pirate ship 90A, etc.) may not be necessarily arranged in each of the virtual spaces. The objects may have different appearances as long as they represent the same object. For example, a first object representing the pirate ship 90A is arranged in one virtual space, and a second object representing a pirate ship having the same as or a similar appearance to that of the pirate ship 90A may be arranged in the other virtual space. Then, images of these objects are taken by the virtual cameras arranged in respective virtual spaces, and the taken images may be displayed on the television 2 and the terminal device 7, respectively.

Figure 16A:
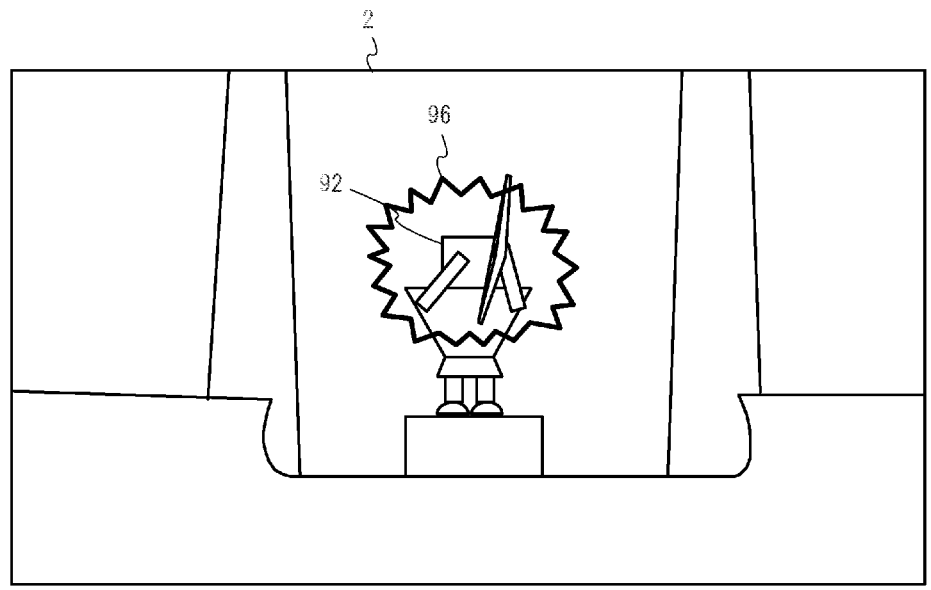
FIG. 16A shows a non-limiting example of a television game image displayed on the television 2 at a first timing after the game of the exemplary embodiment has been executed.
Figure 16B:
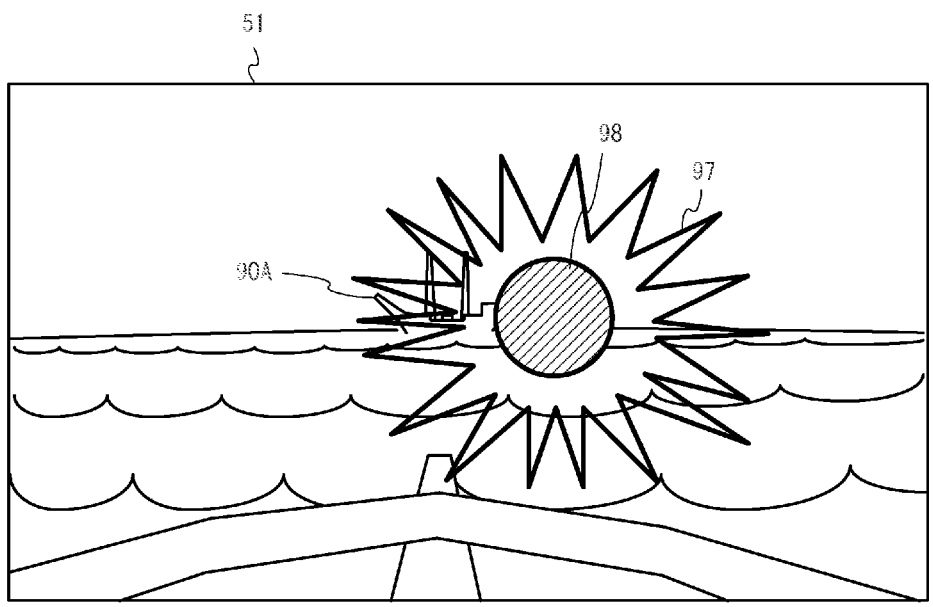
FIG. 16B shows a non-limiting example of a terminal game image displayed on the LCD 51 of the terminal device 7 at a second timing after a predetermined time period has elapsed from the first timing.
Figure 17:
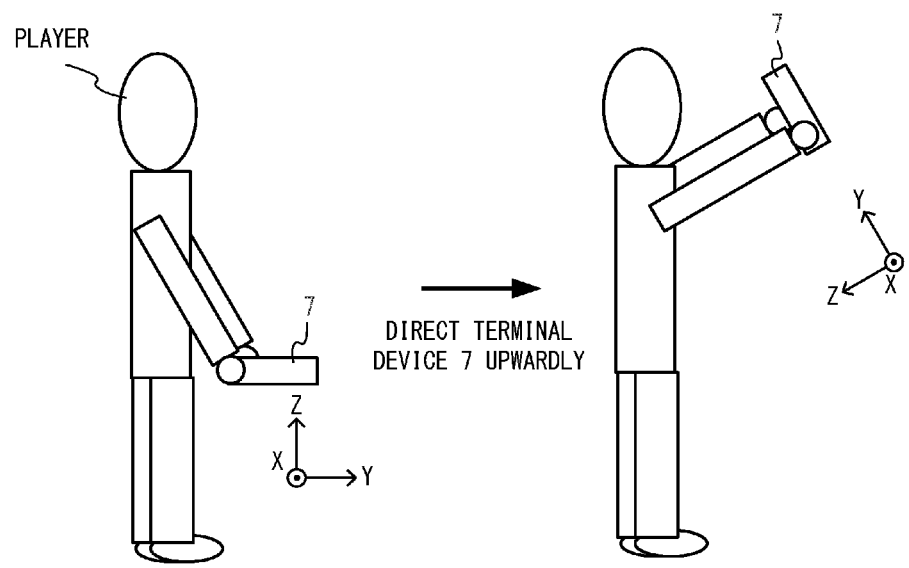
FIG. 17 shows a non-limiting example of how the player changes the attitude of the terminal device 7, from a state where the player is holding the terminal device 7 in a lower position (first attitude) to a state where the player is directing the terminal device 7 upwardly.

Next, the rhythm game of the exemplary embodiment will be described in detail. FIG. 16A shows an example of a television game image displayed on the television 2 at a first timing after the game of the exemplary embodiment has been executed. FIG. 16B shows an example of a terminal game image displayed on the LCD 51 of the terminal device 7 at a second timing after a predetermined time period has elapsed from the first timing. FIG. 17 shows how the player changes the attitude of the terminal device 7, from a state where the player is holding the terminal device 7 in a lower position (first attitude) to a state where the player is directing the terminal device 7 upwardly.

When the game is started, an image shown in FIG. 13A or FIG. 13B is displayed on the television 2 in accordance with the attitude of the terminal device 7, and predetermined music is outputted from the speaker 2a of the television 2. Then, as shown in FIG. 16A, at a predetermined timing (first timing), an instruction image 96 indicating that the arrow 94 has been shot is displayed on the television 2. The instruction image 96 is an image for notifying the player that an arrow has been shot. Moreover, at the first timing, a voice indicating that the arrow 94 has been shot and from which direction the arrow 94 will come (from which position the arrow 94 has been shot), and sound effects indicating that the arrow 94 has been shot are outputted from the speaker 2a of the television 2. For example, as shown in FIG. 16A, an instruction image 96 showing that the pirate 92 has shot the arrow 94 is displayed at the first timing, and concurrently, the pirate 92 issues a voice instruction "Up" to the player (the voice of the pirate 92 is outputted from the speaker 2a of the television 2). In response to the instruction image 96 and the voice instruction, the player changes the attitude of the terminal device 7 so as to direct the terminal device 7 upward. It should be noted that a pirate who shoots the arrow 94, who is different from the pirate 92, may be displayed. Alternatively, when the pirate 92 shoots the arrow 94, letter information indicating from which direction the arrow 94 will come may be displayed on the television 2, in addition to the instruction image 96 and the voice.

As shown in FIG. 17, in order to receive the arrow with the surface opposite to the surface on which the screen of the LCD 51 of the terminal device 7 is provided, the player directs that surface upwardly in the real space. Then, in the case where the attitude of the terminal device 7 is being maintained at the second timing after the predetermined time period has elapsed from the first timing, the image shown in FIG. 16B is displayed on the LCD 51 of the terminal device 7. Specifically, an image 97 indicating that the arrow 94 has been received with the terminal device 7 and a circular image 98 indicating the position at which the arrow has been received are displayed on the LCD 51 of the terminal device 7. In the exemplary embodiment, conceptually, the terminal device 7 is used as a target for receiving the arrow 94 shot by the pirate 92.

As shown in FIG. 16A and FIG. 16B, a scene in which the arrow 94 is shot is displayed on the television 2 at the first timing, and a scene in which the arrow 94 has reached the player is displayed on the LCD 51 of the terminal device 7 at the second timing. The scene in which the arrow 94 is flying toward the player during the time period from the first timing to the second timing is not displayed on either the television 2 or the LCD 51 of the terminal device 7. Therefore, the player changes the attitude of the terminal device 7 in time with the sound outputted from the speaker 2a of the television 2 and the loudspeakers 67 of the terminal device 7. Specifically, the player estimates a timing at which the arrow 94 reaches the player based on the music outputted from the speaker 2a of the television 2, changes the attitude of the terminal device 7 before the arrow 94 reaches the player, and maintains the attitude of the terminal device 7 until that timing. Moreover, the player estimates the timing at which the arrow 94 reaches the player based on sound effects outputted from the speaker 2a of the television 2 and the loudspeakers 67 of the terminal device 7. The sound effects are such sounds that would be generated due to the friction between the arrow 94 and air when the arrow 94 flies through the space. The sound effects are started to be outputted from the television 2 at the first timing at which the arrow 94 is shot, and the sound effects outputted from the television 2 become less loud in accordance with the elapsed time from the first timing. Meanwhile, the sound effects from the terminal device 7 become gradually loud in accordance with the elapsed time from the first timing, which allows the player to imagine that the arrow 94 is approaching.

Figure 18:
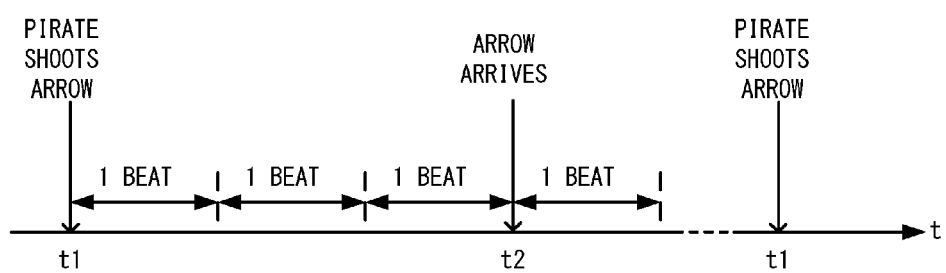
FIG. 18 shows a non-limiting example of an elapsed time from a first timing t1 at which a pirate 92 shot an arrow 94 till a second timing t2 at which the arrow 94 reaches the player.

FIG. 18 shows an elapsed time from a first timing t1 at which the pirate 92 shot the arrow 94 till a second timing t2 at which the arrow 94 reaches the player. As described above, concurrently when the game is started, predetermined music is started to be outputted from the speaker 2a of the television 2. At a first timing t1 while the music is being outputted, the arrow 94 is shot. Then, at a second timing t2 when a predetermined time period has elapsed from the first timing t1 (for example, three beats), the arrow 94 reaches the player. At the second timing t2, in the case where the attitude of the terminal device 7 is the attitude instructed at the first timing t1, an image 97 indicating that the arrow 94 has been received with the terminal device 7 and a circular image 98 are displayed. Further, a sound indicating that the arrow 94 has been received with the terminal device 7 (sound effect) is outputted from the loudspeakers 67 of the terminal device 7. It should be noted that at the second timing t2, in the case where the attitude of the terminal device 7 is not the attitude instructed at the first timing t1, the image 97 indicating that the arrow 94 has been received with the terminal device 7 and the circular image 98 are not displayed. For example, a sound, a vibration, or the like outputted from the terminal device 7 (vibration of the vibrator 79) notifies the player that the player has failed to receive the arrow with the terminal device 7. Further, when another first timing t1 has come after some time elapsed, the pirate 92 issues a next sound instruction.

During a time period from the second timing t2 to the next first timing t1, the player performs a predetermined operation onto the terminal device 7 so as to perform an operation of shaking off the arrow 94 received with the terminal device 7. When the operation is performed, the arrow 94 is shaken off, and the image 97 and the circular image 98 are not displayed on the LCD 51 of the terminal device 7 any more. The predetermined operation may be, for example, an operation that generates an acceleration of a predetermined magnitude in the Z-axis negative direction of the terminal device 7, or an operation of pressing a predetermined operation button of the terminal device 7.

The first timings t1 and the second timings t2 are stored associated with the predetermined music in advance. The first timings and the second timings are set, synchronized with the rhythm of the predetermined music. For example, the first timings t1 are stored in the game apparatus 3, being associated with the predetermined music in advance such that they correspond to the timings of the 8th beat, the 16th beat, the 24th beat, and the like after the predetermined music is started to be reproduced. Second timings t2 are stored in the game apparatus 3 in advance such that they correspond to the timing of the 3rd beat from each first timing t1. Then, at the time when the predetermined music is started to be reproduced, the first timings and the second timings are set. The reproduction speed of the predetermined music may be adjusted by the player. When the reproduction speed of the predetermined music is adjusted, the time period from the start of the reproduction of the music to the first timing and the time period from the start of the reproduction of the music to the second timing are also adjusted, in accordance with the adjusted reproduction speed. That is, for example, when the predetermined music is reproduced at a faster tempo than usual, the time period from the start of the reproduction of the music to the first timing that comes first is shortened, and the time period from the first timing to the second timing is also shortened.

Figure 19A:
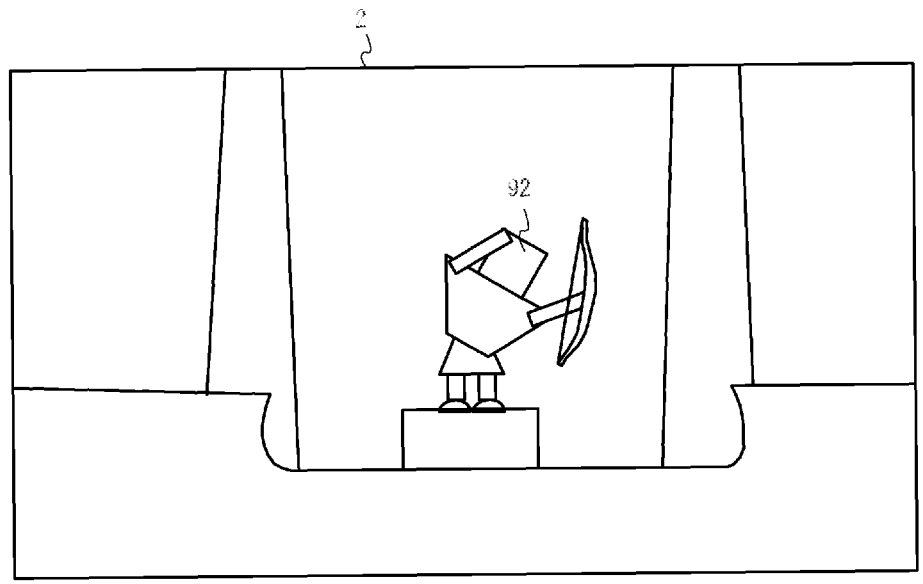
FIG. 19A shows another non-limiting example of a television game image displayed on the television 2 at a first timing t1 after the game of the exemplary embodiment has been executed.
Figure 19B:
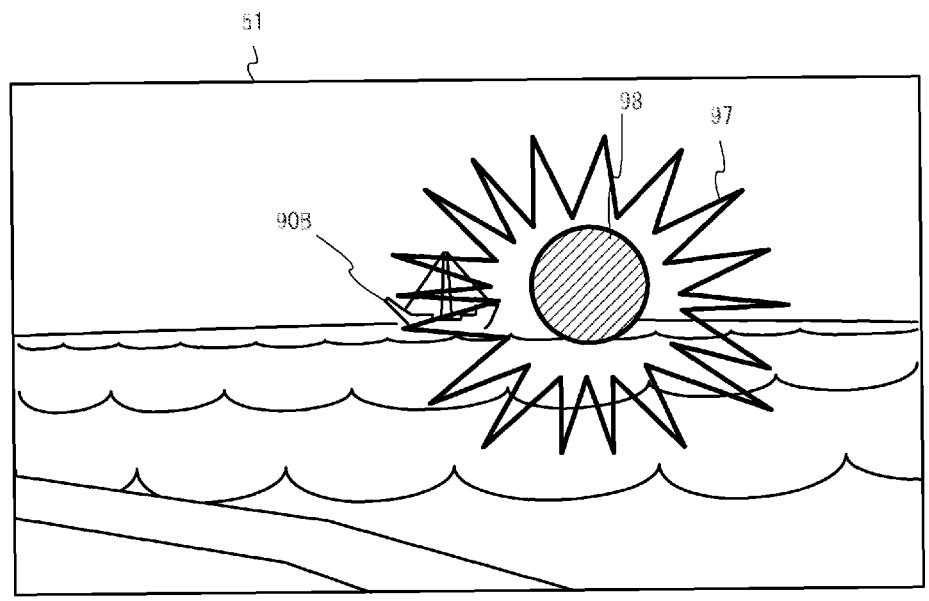
FIG. 19B shows another non-limiting example of a terminal game image displayed on the LCD 51 of the terminal device 7 at a second timing t2 after a predetermined time period has elapsed from the first timing t1.

FIG. 19A shows another example of a television game image displayed on the television 2 at a first timing t1 after the game of the exemplary embodiment has been executed. FIG. 19B shows another example of a terminal game image displayed on the LCD 51 of the terminal device 7 at a second timing t2 after a predetermined time period has elapsed from the first timing t1.

As shown in FIG. 19A, at a first timing t1, a scene in which the pirate 92 is indicating right is displayed on the television 2, and concurrently, the pirate 92 issues a voice instruction "Right" to the player (the voice of the pirate 92 is outputted from the speaker 2a of the television 2). In this case, the arrow 94 is not shot from the pirate ship 90A which is located to the front of the ship 91 and the arrow 94 is shot from the pirate ship 90B which is located to the right of the ship 91. Therefore, FIG. 19A does not show the instruction image 96 indicating that the pirate 92 has shot the arrow 94.

Here, in response to the instruction issued by the pirate 92, the player changes his or her posture (and the attitude of the terminal device 7) so as to turn to the right relative to the television 2. FIG. 20 is a view of the player turning to the right relative to the television 2 in response to an instruction from the game apparatus 3, viewed from above in the real space. Usually, the player waits for an instruction from the game apparatus 3, facing to the front of the television 2. At a first timing t1, the player receives an instruction from the game apparatus 3, in the form of an action of the pirate 92 indicating right and the voice from the speaker 2a of the television 2. Then, as shown in FIG. 20, the player changes his or her posture so as to turn to the right relative to the television 2 in accordance with the instruction (the whole body is turned to the right by 90 degrees). Then, as shown in FIG. 19B, at a second timing t2, the image 97 and the circular image 98 indicating that the arrow 94 has reached the terminal device 7 are displayed.

Instructions by the pirate 92 as described above are repeatedly issued, to the rhythm of the music. In the game of the exemplary embodiment, based on an instruction by an image displayed on the television 2 and an instruction by a voice from the television 2, the player operates the terminal device 7 to the rhythm at a right timing. When the player has performed the operation in accordance with the instruction, the player can obtain a high score.

[6. Details of Game Processing]

Figure 21:
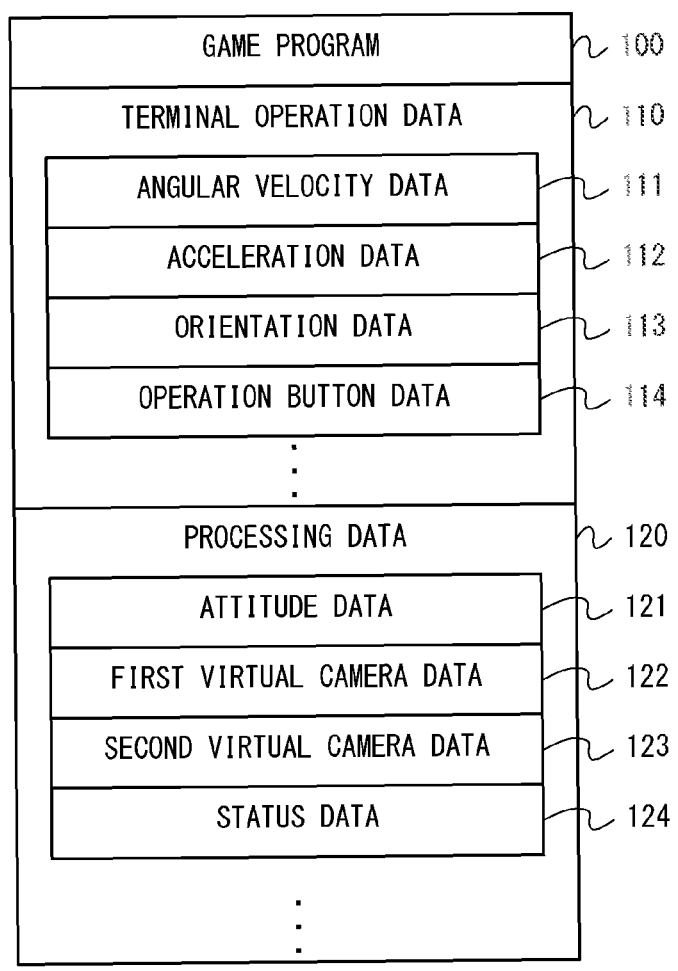
FIG. 21 shows a non-limiting example of various data used in game processing.

Next, the game processing performed in the game system will be described in detail. First, various data used in the game processing will be described. FIG. 21 shows various data used in the game processing. Specifically, FIG. 21 shows main data stored in the main memory (the external main memory 12 or the internal main memory 11e) of the game apparatus 3. As shown in FIG. 21, a game program 100, terminal operation data 110, and processing data 120 are stored in the main memory of the game apparatus 3. It should be noted that data used to play the game, such as image data of various objects that appear in the game and sound data used in the game, are stored in the main memory, in addition to the data shown in FIG. 21.

A part or the whole of the game program 100 is read from the optical disc 4, at an appropriate timing after the game apparatus 3 is powered on, and is stored in the main memory. It should be noted that, the game program 100 may be obtained from the flash memory 17 or an external device of the game apparatus 3 (for example, via the Internet), instead of the optical disc 4. A part of the game program 100 (for example, a program for calculating an attitude of the terminal device 7) may be stored in the game apparatus 3 in advance.

The terminal operation data 110 is data indicating an operation performed by the player onto the terminal device 7, and is outputted (transmitted) from the terminal device 7 based on the operation performed onto the terminal device 7. The terminal operation data 110 is transmitted from the terminal device 7, obtained by the game apparatus 3, and stored in the main memory. The terminal operation data 110 includes angular velocity data 111, acceleration data 112, orientation data 113, and operation button data 114. In addition to these types of data, the terminal operation data 110 further includes data indicating the position at which the touch panel 52 of the terminal device 7 is touched (touch position), and the like. When the game apparatus 3 obtains terminal operation data from a plurality of terminal devices 7, the game apparatus 3 may cause the terminal operation data 110 transmitted from each terminal device 7 to be stored separately in the main memory.

The angular velocity data 111 is data indicating an angular velocity detected by the gyro sensor 64 in the terminal device. Here, the angular velocity data 111 indicates angular velocities about the respective axes of the fixed XYZ coordinate system in the terminal device 7 (see FIG. 9). However, in another exemplary embodiment, the angular velocity data 111 may indicate one or more angular velocities about any one or more axes, respectively.

The acceleration data 112 is data indicating an acceleration detected by the acceleration sensor 63 of the terminal device 7. Here, the acceleration data 112 indicates accelerations about the respective axes of the fixed XYZ coordinate system in the terminal device 7 (see FIG. 9).

The orientation data 113 is data indicating an orientation detected by the magnetic sensor 62 of the terminal device 7.

The operation button data 114 is data indicating whether the operation buttons 54A to 54L provided in the terminal device 7 are pressed.

The processing data 120 is data used in the game processing (FIG. 22) described below. The processing data 120 includes attitude data 121, first virtual camera data 122, second virtual camera data 123, and status data 124. In addition to the data shown in FIG. 21, the processing data 120 further includes various data used in the game processing, such as data regarding scores.

The attitude data 121 is data indicating an attitude of the terminal device 7. The attitude of the terminal device 7 is expressed, for example, in a rotation matrix representing a rotation from the reference attitude to the current attitude. The attitude of the terminal device 7 may be expressed by three angles (rotation angles about the respective XYZ axes). The attitude data 121 is calculated based on the angular velocity data 111 included in the terminal operation data 110 from the terminal device 7. Specifically, the attitude data 121 is calculated by integrating by time angular velocities about the X-axis, the Y-axis, and the Z-axis, respectively, detected by the gyro sensor 64. It should be noted that the attitude of the terminal device 7 may not be necessarily calculated based on the angular velocity data 111 indicating the angular velocity detected by the gyro sensor 64, and may be calculated based on the acceleration data 112 indicating the acceleration detected by the acceleration sensor 63 and the orientation data 113 indicating the orientation detected by the magnetic sensor 62. Further, the attitude may be calculated by correcting, based on the acceleration data and the orientation data, an attitude which has been calculated based on the angular velocity. Moreover, pieces of attitude data 121 indicating attitudes of the terminal device 7 in a predetermined number of past frames are chronologically stored in the main memory.

The first virtual camera data 122 includes data indicating a position and an attitude of the first virtual camera in the virtual space where the first virtual camera is set, and data indicating a zoom setting of the first virtual camera (setting of the angle of view). As described above, the first virtual camera is a virtual camera for generating a television game image. Although the image taking direction (attitude) of the first virtual camera is fixed, the position and the zoom setting of the first virtual camera are changed in accordance with the attitude of the terminal device 7.

The second virtual camera data 123 is data indicating a position and an attitude of the second virtual camera in the virtual space where the second virtual camera is set. As described above, the second virtual camera is a virtual camera for generating a terminal game image. Although the position of the second virtual camera is fixed, the attitude of the second virtual camera is changed in accordance with the attitude of the terminal device 7.

The status data 124 is data indicating which of the first attitude and the second attitude the attitude of the terminal device 7 is.

Figure 22:
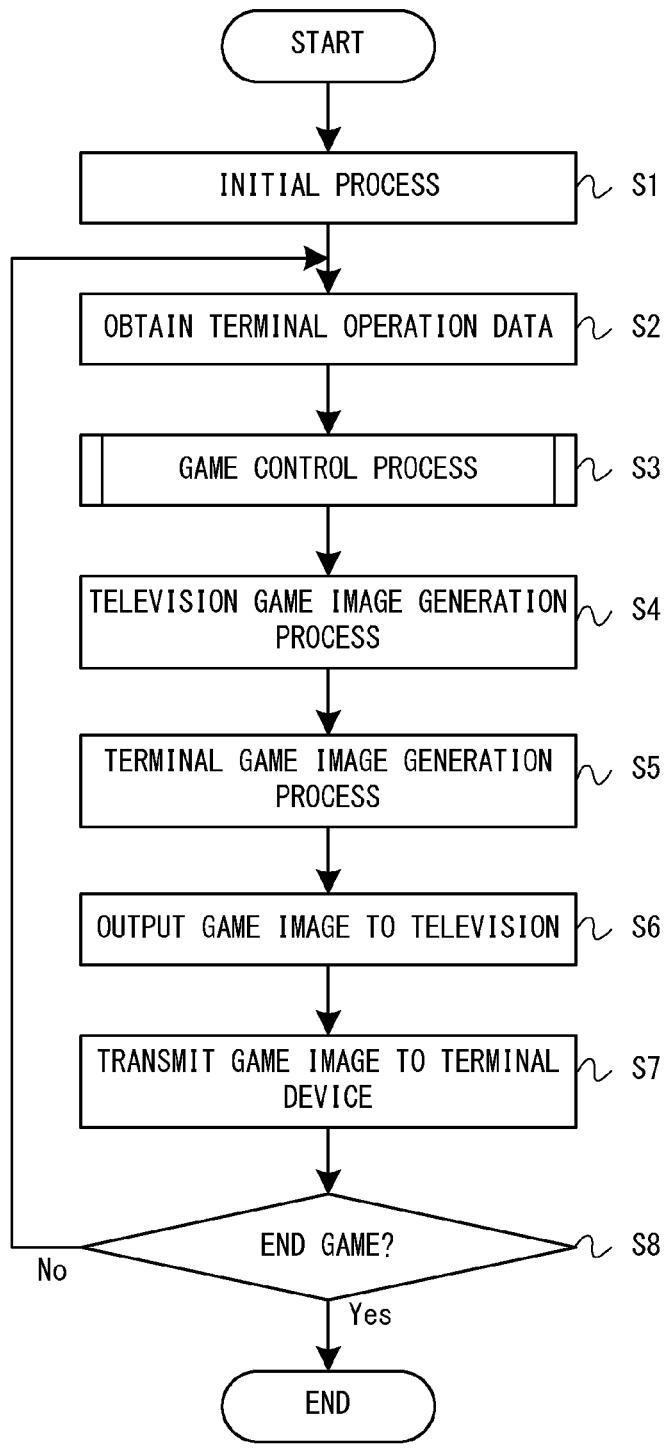
FIG. 22 is a non-limiting example of a main flowchart showing the flow of the game processing performed in the game apparatus 3.

Next, the game processing performed in the game apparatus 3 will be described in detail with reference to FIG. 22 and FIG. 23. FIG. 22 is a main flowchart showing the flow of the game processing performed in the game apparatus 3. When the game apparatus 3 is powered on, the CPU 10 of the game apparatus 3 executes the boot program stored in the boot ROM not shown, to initialize units such as the main memory. Then, the game program stored in the optical disc 4 is loaded onto the main memory and the game program is started to be performed by the CPU 10. The flowchart shown in FIG. 22 shows processing performed after the above process is completed. It should be noted that, the game apparatus 3 may be configured such that the game program is executed immediately after the power is turned on. Alternatively, the following configuration may be employed: a built-in program that causes a predetermined menu screen to be displayed is firstly executed immediately after the power is turned on, and then, for example, the user performs a selection operation on the menu screen to issue an instruction of starting the game, whereby the game program is executed.

Figure 23:
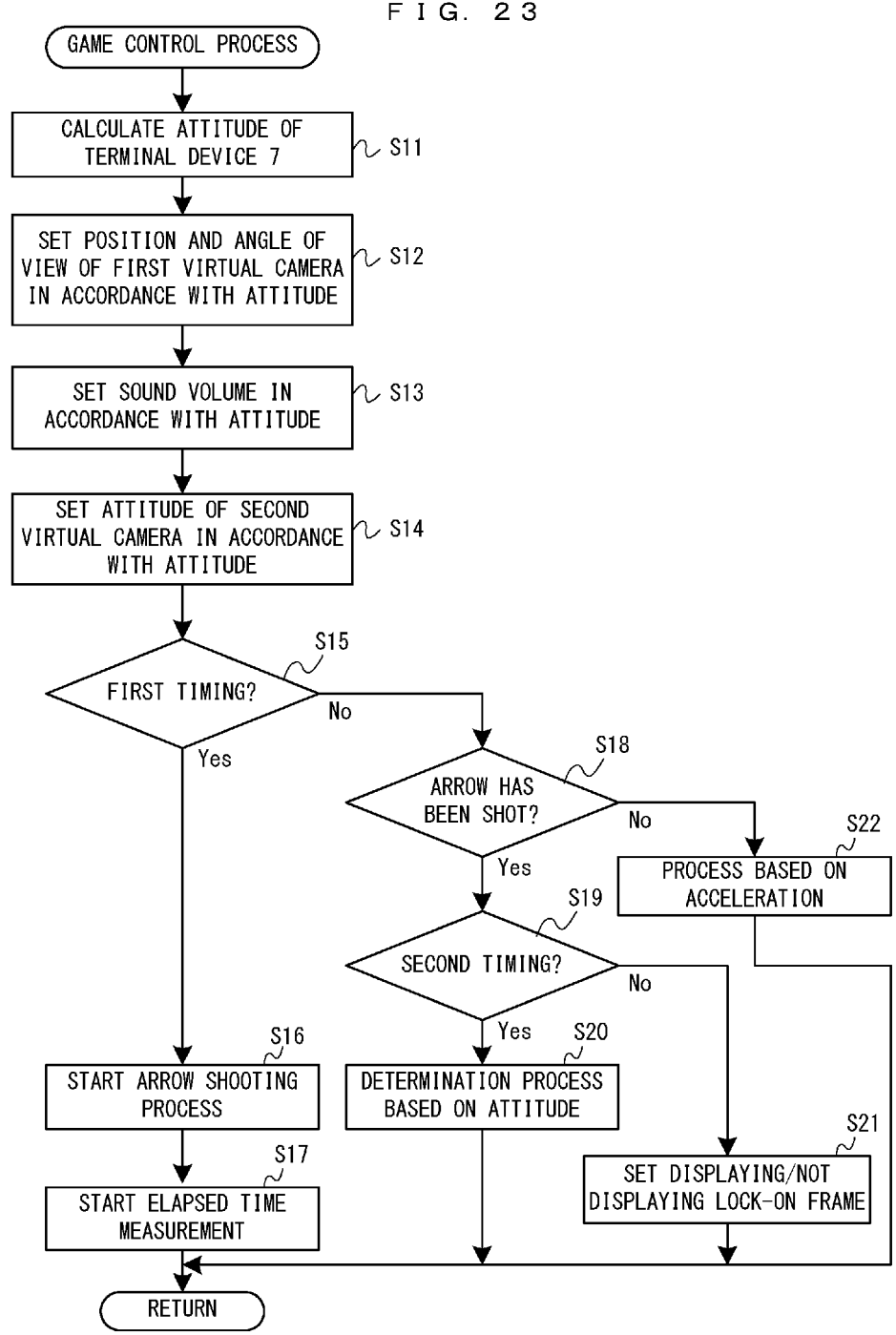
FIG. 23 is a non-limiting example of a flowchart showing in detail the flow of the game control process (step S3) shown in FIG. 22.

It should be noted that the processes of the steps in the flowcharts of FIG. 22 and FIG. 23 are merely an example, and the sequence of the processes of the steps may be changed as long as the same result is obtained. Also, the values and the like of variables and constants are merely an example, and other values may be employed as appropriate. In the exemplary embodiment, description will be given under an assumption that all the processes of the steps in the flowcharts are performed by the CPU 10. However, processes of some of the steps in the flowcharts may be performed by a processor or a dedicated circuit other than the CPU 10.

First, in step S1, the CPU 10 performs an initial process. The initial process is a process of constructing virtual spaces, arranging objects (the ship 91, the pirate ship 90A, the pirate 92, the arrow 94, the first virtual camera, the second virtual camera, etc.) that will appear in the virtual spaces at initial positions, and setting initial values of various parameters used in the game processing.

Moreover, in step S1, an initial process for the terminal device 7 is performed. For example, an image for causing the player to hold the terminal device 7 in the reference attitude and to press a predetermined operation button of the terminal device 7 while maintaining the attitude is displayed on the television 2. As a result of the initial process of the terminal device 7, rotation angles about the respective XYZ axes in the terminal device 7 are set to 0. It should be noted that, in the initial process, only the rotation angle about the Z-axis (rotation angle about the axis perpendicular to the LCD 51 of the terminal device 7) may be set to 0 and rotation angles about the X-axis and the Y-axis may be set based on the acceleration detected by the acceleration sensor 63. The game apparatus 3 can calculate how much the terminal device 7 is tilted relative to the direction of gravity, based on the direction of gravity detected by the acceleration sensor 63 of the terminal device 7. However, the game apparatus 3 cannot know which direction the terminal device 7 is directed (how much the terminal device 7 is rotated about the vertically downward axis direction) only based on the direction of gravity detected by the acceleration sensor 63. Therefore, in step S1, the player is caused to hold the terminal device 7 such that a predetermined surface of the terminal device 7 (for example, the surface opposite to the surface on which the LCD 51 is provided) faces the television 2, and the rotation angle of the terminal device 7 about the Z-axis is set to 0, thereby initializing the attitude of the terminal device 7. Accordingly, using the attitude of the terminal device 7 at the time of the initialization as a reference attitude, the game apparatus 3 can calculate a change of the attitude of the terminal device 7 from the reference attitude, based on the angular velocity detected by the gyro sensor 64.

When a predetermined operation button of the terminal device 7 is pressed and the initial process of the terminal device 7 is completed, the CPU 10 starts reproduction of predetermined music, and then performs the process of step S2. Thereafter, a processing loop composed of the processes of step S2 to S8 is repeatedly performed once in a predetermined time period (one frame time; for example, 1/60 second).

In step S2, the CPU 10 obtains the terminal operation data 110 which has been transmitted from the terminal device 7 and stored in the main memory. The terminal device 7 repeatedly transmits the terminal operation data 110 to the game apparatus 3. In the game apparatus 3, the terminal communication module 28 sequentially receives terminal operation data, and the I/O processor 11a sequentially stores the received terminal operation data in the main memory. It is preferable that the interval between a transmission and a reception performed between the terminal device 7 and the game apparatus 3 is shorter than the game processing period, and for example, it is 1/200 sec. In step S2, the CPU 10 reads the latest terminal operation data 110 from the main memory. After step S2, the process of step S3 is performed.

In step S3, the CPU 10 performs a game control process. The game control process is a process of advancing the game in accordance with a game operation performed by the player. Hereinafter, with reference to FIG. 23, the game control process will be described in detail.

FIG. 23 is a flowchart showing in detail the flow of the game control process (step S3) shown in FIG. 22.

In step S11, the CPU 10 calculates an attitude of the terminal device 7 based on the angular velocity data 111. Specifically, the CPU 10 calculates the attitude of the terminal device 7, based on the angular velocity data 111 obtained in step S2 and the attitude data 121 stored in the main memory. More specifically, the CPU 10 calculates rotation angles about the respective axes (X-axis, Y-axis, and Z-axis) obtained by multiplying, by one frame time, angular velocities about the respective axes indicated by the angular velocity data 111 obtained in step S2. The rotation angles about the respective axes calculated in this manner are rotation angles of the terminal device 7 about the respective axes (rotation angles in one frame time) during a time period from the time when an immediately preceding processing loop was performed to the time when the current processing loop is performed. Next, the CPU 10 adds the calculated rotation angles about the respective axes (rotation angles in one frame time) to the rotation angles of the terminal device 7 about the respective axes indicated by the attitude data 121, and thereby calculates the latest rotation angles of the terminal device 7 about the respective axes (the latest attitude of the terminal device 7). Further, the calculated attitude may be corrected based on the acceleration. Specifically, when the amount of motion of the terminal device 7 is little, the direction of the acceleration detected by the acceleration sensor 63 can be considered as the direction of gravity. Therefore, when the amount of motion of the terminal device 7 is little, the attitude may be corrected such that the direction of gravity calculated based on the attitude calculated based on the angular velocity approximates to the direction of the acceleration detected by the acceleration sensor 63. Moreover, the calculated attitude may further be corrected based on the orientation data 113. Specifically, how much the terminal device 7 is rotated about the axis in the vertically downward direction can be determined based on the orientation detected by the magnetic sensor 62 at the time when the initial process was performed in step S1 and based on the orientation currently detected by the magnetic sensor 62. Thus, the attitude of the terminal device 7 may be corrected based on the orientation data 113. Then, the CPU 10 stores the calculated, latest attitude of the terminal device 7 as the attitude data 121, in the main memory. The latest attitude of the terminal device 7 calculated in this manner indicates, using the attitude at the time of the initialization process (the time when the initialization was performed in step S1) as a reference attitude, rotation angles of the terminal device 7 about the respective axes from the reference attitude. Specifically, the attitude data 121 indicating the attitude of the terminal device 7 is data representing a rotation matrix. After the process in step S11, the CPU 10 performs the process of step S12.

In step S12, the CPU 10 sets a position and an angle of view of the first virtual camera in accordance with the attitude of the terminal device 7. Specifically, the CPU 10 determines whether the attitude of the terminal device 7 calculated in step S11 is the first attitude or the second attitude, and performs setting of the first virtual camera based on the determination result. More specifically, the CPU 10 first determines whether the rotation angle of the terminal device 7 about the X-axis is greater than or equal to a predetermined threshold value (for example, 45 degrees).

FIG. 24 is a side view of the terminal device 7 rotating a predetermined angle about an X-axis. As shown in FIG. 24, when the rotation angle of the terminal device 7 about the X-axis is greater than or equal to the predetermined threshold value, the CPU 10 determines that the attitude of the terminal device 7 is the second attitude. On the other hand, when the rotation angle of the terminal device 7 about the X-axis is less than the predetermined threshold value, the CPU 10 determines that the attitude of the terminal device 7 is the first attitude. The CPU 10 stores the determination result in the main memory, as the status data 124. It should be noted that the CPU 10 changes the predetermined threshold value depending on whether the current attitude of the terminal device 7 is the first attitude or the second attitude. For example, when the current attitude is the first attitude, the CPU 10 may use 45 degrees as the predetermined threshold value, and when the current attitude is the second attitude, the CPU 10 may use 30 degrees as the predetermined threshold value.

Next, the CPU 10 sets the position and the angle of view of the first virtual camera. Specifically, when the attitude of the terminal device 7 is the first attitude, the CPU 10 sets the position of the first virtual camera to a predetermined position (a position nearer to the pirate ship 90A) between the position of the ship 91 and the position of the pirate ship 90A, and sets the angle of view of the first virtual camera to a minimum value. Accordingly, when an image of the virtual space is taken by the first virtual camera, the pirate ship 90A (the pirate 92) is zoomed in and thus displayed in a zoomed-in manner. On the other hand, when the attitude of the terminal device 7 is the second attitude, the CPU 10 sets the position of the first virtual camera to the position of the ship 91 and sets the angle of view of the first virtual camera to a maximum value. Accordingly, when an image of the virtual space is taken by the first virtual camera, the pirate ship 90A is zoomed out, and thus, is displayed in a zoomed-out manner. It should be noted that the CPU 10 moves the first virtual camera and changes the angle of view of the first virtual camera over a predetermined time period. Therefore, a scene in which the pirate 92 is gradually zoomed in or zoomed out is displayed on the television 2. After the process of step S12 is completed, the CPU 10 performs the process of step S13 next.

In step S13, the CPU 10 sets the volume of the sound outputted from the television 2, in accordance with the attitude of the terminal device 7. Specifically, when the attitude of the terminal device 7 calculated in step S11 is the second attitude, the CPU 10 lowers the volume of the sound (the voice of the pirate 92 and the music) outputted form the television 2, compared with that in the case of the first attitude. Then, the CPU 10 performs the process of step S14.

In step S14, the CPU 10 sets the attitude of the second virtual camera in accordance with the attitude of the terminal device 7. Specifically, the CPU 10 sets the attitude of the second virtual camera so as to coincide with the attitude of the terminal device 7 calculated in step S11, and stores it as the second virtual camera data 123 in the main memory. Accordingly, for example, when the surface opposite to the surface on which the LCD 51 of the terminal device 7 is provided faces the television 2 (when the player faces the television 2), the attitude of the second virtual camera is set such that the second virtual camera faces the pirate ship 90A. On the other hand, for example, when the surface on which the LCD 51 of the terminal device 7 is provided faces the television 2 (when the player faces opposite to the television 2), the attitude of the second virtual camera is set such that the second virtual camera faces opposite to the pirate ship 90A. Then, the CPU 10 performs the process of step S15.

In step S15, the CPU 10 determines whether the time is a first timing t1. Specifically, the CPU 10 determines whether the time is a first timing t1, based on an elapsed time from the start of the reproduction of the predetermined music in step S1. When the determination result is affirmative, the CPU 10 performs the process of step S16 next. On the other hand, when the determination result is negative, the CPU 10 performs the process of step S18 next.

In step S16, the CPU 10 starts a process of shooting the arrow 94. Specifically, the CPU 10 determines, based on a predetermined algorithm, from which direction to shoot the arrow 94 (front, up, right, left, etc.), and starts the process for shooting the arrow 94 from the determined direction. Accordingly, when an image of the pirate 92 is taken by the first virtual camera, a scene in which the pirate 92 shoots the arrow 94 (FIG. 16A) is displayed on the television 2, and a scene in which the pirate 92 indicates the direction from which the arrow 94 will come (FIG. 19A) is displayed on the television 2. Moreover, as a process of shooting the arrow, the CPU 10 reproduces a voice indicating from which direction the arrow 94 will come and sound effects indicating that the arrow 94 has been shot. A plurality of pieces of sound data are stored in the main memory, and the CPU 10 selects a piece of sound data corresponding to the determined direction. Thus, a voice indicating from which direction the arrow 94 will come (for example, "Right") is outputted from the speaker 2a of the television 2. Then, the CPU 10 performs the process of step S17.

In step S17, the CPU 10 starts measuring an elapsed time from the first timing t1. After performing the process of step S17, the CPU 10 ends the game control process shown in FIG. 23.

Meanwhile, in step S18, the CPU 10 determines whether the arrow 94 has currently been shot. The process here, as shown in FIG. 18, is a process of determining whether the current time is in a time period from the first timing t1 to the second timing t2. Specifically, based on the elapsed time from the time when the measurement was started in step S17, the CPU 10 determines whether the arrow 94 has currently been shot. When the determination result is affirmative, the CPU 10 performs the process of step S19 next. On the other hand, when the determination result is negative, the CPU 10 performs the process of step S22 next.

In step S19, the CPU 10 determines whether the current time is a second timing t2. Specifically, based on an elapsed time from the time when the measurement was started in step S17, the CPU 10 determines whether the current time is a second timing t2. When the determination result is affirmative, the CPU 10 performs the process of step S20 next. On the other hand, when the determination result is negative, the CPU 10 performs the process of step S21 next.

In step S20, the CPU 10 performs a determination process based on the attitude of the terminal device 7. In step S20, the CPU 10 performs a process in accordance with the attitude of the terminal device 7 at the second timing t2. Specifically, the CPU 10 determines whether the attitude of the terminal device 7 calculated in step S11 is an attitude that corresponds to the direction determined in step S16 (the direction instructed by the pirate 92). For example, when it is determined in step S16 that the arrow 94 is to be shot from the right (that is, the arrow 94 is to be shot to the player from the pirate ship 90B), the CPU 10 determines whether the attitude of the terminal device 7 is an attitude as shown in FIG. 20. For example, the CPU 10 determines, based on the attitude data 121, whether a coordinate value for each axis of a unit vector along the Z-axis negative direction of the terminal device 7 is within a predetermined range in accordance with the determination in step S16, and thereby determines whether the attitude of the terminal device 7 is an attitude in accordance with the instruction by the pirate 92.

Further, the CPU 10 determines, in accordance with the determination result, an image to be displayed on the LCD 51 of the terminal device 7, and sound to be outputted from the loudspeakers 67 of the terminal device 7. Accordingly, for example, when the determination result is affirmative (when the attitude of the terminal device 7 is the attitude corresponding to the direction determined in step S16), the processes of step S5 and step S7 described below are performed, whereby the image 97 and the circular image 98 shown in FIG. 16B are displayed on the LCD 51. Moreover, when the determination result is affirmative, the CPU 10 adds points.

It should be noted that, in step S20, the CPU 10 determines whether the terminal device 7 is moving, based on the attitude of the terminal device 7 calculated using the predetermined number of past frames. Attitudes of the terminal device 7 in the predetermined number of past frames are stored in the main memory. Therefore, the CPU 10 can calculate how much the attitude of the terminal device 7 has changed, based on the attitudes of the terminal device 7 in the predetermined number of past frames. In the case where the CPU 10 has determined that the terminal device 7 is moving, even when the attitude of the terminal device 7 is the attitude corresponding to the direction determined in step S16, the CPU 10 generates an image different from that in the case where the terminal device 7 is stationary, and displays it on the terminal device 7. FIG. 25 shows an example of an image displayed on the LCD 51 of the terminal device 7 at a second timing t2 when the terminal device 7 is moving. As shown in FIG. 25, when the terminal device 7 is moving, even if the player is holding the terminal device 7 in a proper attitude (the attitude in accordance with the instruction by the pirate 92), the circular image 98 indicating the position at which the arrow has been received is displayed at a position shifted from the center of the screen. In this case, the player obtains less points than those at a time when the terminal device 7 is determined not to be moving. In this manner, the game processing is performed in accordance with the attitude of the terminal device 7 at the second timing t2, and the result of the game processing differs depending on whether the terminal device 7 is stationary at that timing. It should be noted that, whether the terminal device 7 is moving may be determined based on the acceleration detected by the acceleration sensor 63.

Further, depending on whether the arrow 94 remains without having been shaken off, the CPU 10 determines, in step S20, positions at which the image 97 and the circular image 98 are to be displayed. In step S22 described below, when a process of shaking off the arrow 94 that has been received with the terminal device 7 is not performed, the arrow 94 is not shaken off and remains to be displayed on the LCD 51 of the terminal device 7. Information indicating whether the arrow 94 received with the terminal device 7 is remaining is stored in the main memory. When the arrow 94 is remaining, the image 97 and the circular image 98 are not displayed near the center of the screen of the terminal device 7 and displayed at positions shifted from the center of the screen as shown in FIG. 25. Also in this case, the user obtains less points than those when the arrow 94 is not remaining. Then, the CPU 10 resets the elapsed time which has been measured since step S17, and ends the game control process shown in FIG. 23.

In step S21, the CPU 10 sets a setting of displaying/not displaying a lock-on frame. FIG. 26 is an example of a lock-on frame 99 displayed on the LCD 51 of the terminal device 7. The process of step S21 is performed when the arrow 94 has been shot and the current time is not a second timing t2 (that is, it in a time period from a first timing t1 to a second timing t2). The process of step S21 is a process of determining whether the attitude of the terminal device 7 during that time period is a proper attitude (an attitude in accordance with the instruction by the pirate 92) and of displaying the lock-on frame 99 when the attitude is the proper attitude. The lock-on frame 99 notifies the player that the current attitude of the terminal device 7 is a proper attitude. That is, the CPU 10 determines whether the current attitude of the terminal device 7 is the attitude corresponding to the direction instructed by the pirate 92 when the arrow 94 was shot. When the determination result is affirmative, the CPU 10 turns on the setting of displaying the lock-on frame 99. When the determination result is negative, the CPU 10 turns off the setting of displaying the lock-on frame 99. After performing the process of step S21, the CPU 10 ends the game control process shown in FIG. 23.

On the other hand, in step S22, the CPU 10 performs the process based on accelerations. In step S22, a predetermined game processing is performed based on the acceleration detected by the acceleration sensor 63 of the terminal device 7. Specifically, the CPU 10 determines whether the value of the acceleration of the terminal device 7 in the Z-axis negative direction is greater than or equal to a predetermined threshold value. When the determination result is affirmative, the CPU 10 performs the process of shaking off the arrow 94 received with the terminal device 7, and ends the game control process shown in FIG. 23. Accordingly, the image 97 and the circular image 98 having been displayed on the LCD 51 of the terminal device 7 are not displayed any more. When the determination result is negative, or when the arrow 94 has been shaken off, the CPU 10 directly ends the game control process shown in FIG. 23.

With reference back to FIG. 22, after performing the process of step S3, the CPU 10 performs the process of step S4 next.

In step S4, the CPU 10 performs a process of generating a television game image. Specifically, the CPU 10 obtains a television game image by causing the first virtual camera to take an image of the virtual space. When an image of the virtual space is taken by the first virtual camera set at the position and having the angle of view which were set in the process of step S12, the pirate 92 is displayed in a zoomed-in manner or zoomed-out manner in accordance with the attitude of the terminal device 7. Through these processes, television game images corresponding to the states of the game, such as a zoomed-in image of the pirate 92 and an image of a scene in which the pirate 92 is shooting the arrow 94, are obtained. Then, the CPU 10 performs the process of step S5.

In step S5, the CPU 10 performs a process of generating a terminal game image. Specifically, the CPU 10 generates a terminal game image by causing the second virtual camera, for which the attitude in the virtual space has been set in step S14, to take an image of the virtual space. Further, in accordance with the result of the processes of step S20 and step S22, the CPU 10 superimposes the image 97 and the circular image 98 on the generated terminal game image. Moreover, when the setting of displaying the lock-on frame 99 is turned on in step S21, the CPU 10 superimposes the image of the lock-on frame 99 on the terminal game image obtained by causing the second virtual camera to take an image of the virtual space. Thereby, terminal game images corresponding to the states of the game, such as an image of the virtual space seen from the second virtual camera having the attitude in accordance with the attitude of the terminal device 7, an image showing that the arrow 94 has hit the screen of the terminal device 7 at the second timing t2 (the circular image 98, etc.), are obtained. Then, the CPU 10 performs the process of step S6.

In step S6, the CPU 10 outputs, to the television 2, the television game image generated in step S4. Accordingly, for example, an image such as that shown in FIG. 13A or FIG. 13B is displayed on the television 2. Moreover, in step S6, sound data is outputted to the television 2, along with the television game image, and game sound is outputted at the volume set in the process of step S13 from the speaker 2a of the television 2. Specifically, when the attitude of the terminal device 7 is the first attitude, the sound volume of the voice of the pirate 92 is increased than that in the case of the second attitude. That is, when the pirate 92 is being displayed in a zoomed-in manner, the sound volume of the voice of the pirate 92 is increased, and when the pirate 92 is being displayed in a zoomed-out manner, the sound volume is decreased. It should be noted that the sound volume of the predetermined music may vary in accordance with the attitude of the terminal device 7 (in the case of the first attitude, the sound volume of the predetermined music may be increased as in the case of the voice of the pirate 92), or alternatively, may be constant irrespective of the attitude of the terminal device 7. Then, the CPU 10 performs the process of step S7.

In step S7, the CPU 10 transmits the terminal game image to the terminal device 7. Specifically, the CPU 10 sends the terminal game image generated in step S5 to the codec LSI 27, and the codec LSI 27 performs a predetermined compression process onto the terminal game image. The compressed image data is transmitted to the terminal device 7 via the antenna 29 by the terminal communication module 28. The terminal device 7 receives the data of the image transmitted from the game apparatus 3 via the wireless module 70. The codec LSI 66 performs a predetermined decompression process onto the received image data. The decompressed image data is outputted to the LCD 51. Accordingly, the terminal game image is displayed on the LCD 51. Moreover, in step S7, the sound data is transmitted to the terminal device 7, along with the terminal game image, and the game sound is outputted form the loudspeakers 67 of the terminal device 7. Then, the CPU 10 performs the process of step S8.

In step S8, the CPU 10 determines whether to end the game. The determination in step S8 is performed, for example, depending on whether a predetermined time period has elapsed from the start of the game, or on whether the user has issued an instruction to end the game. When the determination result in step S8 is negative, the process of step S2 is performed again. On the other hand, when the determination result in step S8 is affirmative, the CPU 10 ends the game processing shown in FIG. 22.

As described above, the player can cause the pirate ship 90A and the like (including the pirate 92 and the arrow 94) to be displayed in a zoomed-in or zoomed-out manner, by changing the attitude of the terminal device 7. Specifically, when the player holds the terminal device 7 in an attitude in which the player does not view the LCD 51 of the terminal device 7 (the first attitude), the pirate ship 90A and the like are displayed in a zoomed-in manner, and concurrently, the volume of the sound outputted form the speaker 2a of the television 2 is increased. On the other hand, when the attitude of the terminal device 7 is changed into the second attitude, the pirate ship 90A and the like are displayed in a zoomed-out manner, and concurrently, the volume of the sound outputted from the speaker 2a of the television 2 is reduced. Further, the pirate 92 and the arrow 94 are displayed on the television 2, but the pirate 92 and the arrow 94 are not displayed on the terminal device 7. Further, since the terminal device 7 is a portable display device, the dimensions of the screen of the LCD 51 are relatively small, and thus, the pirate ship 90A displayed on the terminal device 7 is difficult to be viewed, as in the case of the pirate ship 90A displayed in a zoomed-out manner when the attitude of the terminal device 7 is the second attitude. Therefore, the player cannot view the instruction from the pirate 92 merely by looking at the LCD 51 of the terminal device 7. In other words, the pirate ship 90A displayed on the terminal device 7 is always so small that it is difficult to be viewed by the player, whereas the pirate ship 90A displayed on the television 2 becomes easy to be viewed or difficult to be viewed depending on the attitude of the terminal device 7. Therefore, the player needs to look at the television 2 in order to view and listen to the instruction from the pirate 92 (the instruction given in the form of an image and a voice). Further, in order to easily view and listen to the instructions from the pirate 92, the player views and listens to the television 2 while changing the attitude of the terminal device 7 into the first attitude. After the instruction has been issued from the pirate 92, the player changes the attitude of the terminal device 7 so as to receive the arrow 94 with the terminal device 7 at the second timing t2. A result indicating whether the arrow 94 has been received is displayed on the LCD 51 of the terminal device 7.

As described above, in the game of the exemplary embodiment, it is possible to cause the player to look at the screen of the television 2 and the screen of the terminal device 7 alternately, and to cause the player to enjoy the game using the terminal device 7, which is a portable display device.

The television 2 is a stationary display device and the terminal device 7 is a portable display device. The portable display device is held by the player and these two display devices are distanced from each other to some extent. When performing the rhythm game as described above in such a game environment, the player can enjoy the rhythm game which utilizes the distance between these two display devices and thus allows the user to feel the broadness of the space.

[7. Modifications]

It should be noted that the above exemplary embodiment is merely an example, and in another exemplary embodiment, for example, the following configuration may be employed.

In the exemplary embodiment, for example, the pirate ship 90A and the pirate 92 displayed on the television 2 are zoomed in or zoomed out depending on the attitude of the terminal device 7. Accordingly, the player is caused to view and listen to the television 2 and the terminal device 7 alternately, to play the game using the two display devices. In another exemplary embodiment, for example, fog may be caused to appear/disappear in the virtual space so as to make the pirate ship 90A and the pirate 92 difficult/easy to be viewed, accordingly. Further, for example, by blacking out the screen of the television 2, by blurring the entire screen or a predetermined region including the pirate ship 90A and the like, or by making the pirate ship 90A and the like transparent or translucent, the pirate ship 90A and the like may be made difficult to be viewed (or cannot be viewed). Further, for example, by displaying the pirate ship 90A and the like in a pixelized manner, the pirate ship 90A and the pirate 92 may be made difficult to be viewed (or cannot be viewed). Still further, for example, by displaying another object to the front of the pirate ship 90A, the pirate ship 90A may be made difficult to be viewed (or cannot be viewed). That is, in the exemplary embodiment, when the attitude of the terminal device 7 is the first attitude, the pirate ship 90A and the like are zoomed in so as to be made easy to be viewed by the player, and when the attitude of the terminal device 7 is the second attitude, the pirate ship 90A and the like are zoomed out so as to be made difficult to be viewed by the player. Thus, by making it difficult for the player to view the pirate ship 90A and the like, the exemplary embodiment causes the player to look at the screen of the terminal device 7. However, in another exemplary embodiment, instead of changing the settings of the first virtual camera in order to display the pirate ship 90A and the like in a zoomed-in/zoomed-out manner, the pirate ship 90A and the like may be made easy/difficult to be viewed by employing the above described methods. In order to make the pirate ship 90A and the like difficult to be viewed, a process of displaying the pirate ship 90A and the like in a zoomed-out manner, and a process of displaying a predetermined image (a white image representing fog, a black image for blacking out the screen, an image of another object located to the front of the pirate ship 90A, and the like) over a part or the whole of a range including the pirate ship 90A and the like may be performed. Further, in order to make the pirate ship 90A and the like difficult to be viewed, a process of blurring the pirate ship 90A and the like, and a process of displaying the pirate ship 90A and the like in a pixelized manner may be performed. Accordingly, it is possible to cause the player to look at the screen of the television 2 and the screen of the terminal device 7 alternately to play the game.

Moreover, in the exemplary embodiment, it is determined whether the attitude of the terminal device 7 is the first attitude or the second attitude. Specifically, it is assumed that the first attitude is an attitude in which the screen of the terminal device 7 is parallel to the ground surface (an attitude in which the screen of the terminal device 7 is substantially perpendicular to the direction of gravity), and that, in this attitude, the player is looking at the television 2 without looking at the screen of the terminal device 7. Further, it is assumed that the second attitude is an attitude in which the screen of the terminal device 7 is perpendicular to the ground surface (an attitude in which the screen of the terminal device 7 is substantially parallel to the direction of gravity), and that, in this attitude, the player is looking at the screen of the terminal device 7. That is, in the exemplary embodiment, whether the player is viewing the screen of the terminal device 7 (in other words, whether the player is viewing the television 2) is determined based on the attitude of the terminal device 7. In another exemplary embodiment, whether the player is viewing the television 2 (or the terminal device 7) may be determined by another method. For example, an image of the face of the player may be taken by the camera 56 included in the terminal device 7, and the taken image may be subjected to a face recognition process. Thus, by determining whether the line of sight of the player is directed to the LCD 51 of the terminal device 7, it may be determined whether the player is viewing the terminal device 7 (whether the player is viewing the television 2). Still further, for example, a camera different from the camera 56 may be provided in the real space (for example, around the television 2), and the game apparatus 3 may obtain an image taken by this camera and may determine whether the player is viewing the television 2. For example, whether the player is viewing the television 2 can be determined by using a face recognition technology that determines whether the face of the player is included in the image taken by the camera. Still another exemplary embodiment, whether the player is viewing the television 2 may be determined based on whether the player has pressed a predetermined operation button of the terminal device 7.

For example, the attitude of the terminal device 7 may be calculated by the terminal device 7 taking an image of the markers of the marker device 6, and based on the calculated attitude of the terminal device 7, whether the player is viewing the terminal device 7 (or the television 2) may be determined In this case, a camera for taking an image of the markers may be provided on the surface opposite to the surface on which the LCD 51 of the terminal device is provided. Alternatively, the attitude of the terminal device 7 may be calculated by a camera provided in the real space taking an image of the marker section 55 of the terminal device 7. For example, in the case where a camera provided in the terminal device 7 takes an image of the two markers of the marker device 6, the game apparatus 3 can calculate, based on the positions and the attitudes of the two markers included in the taken image, which direction the terminal device 7 is directed (whether the terminal device 7 is facing the television 2), and how much the terminal device 7 is inclined in the lateral direction. Alternatively, in the case where a camera provided in the real space takes an image of the terminal device 7, if the terminal device 7 included in the taken image is detected by means of image recognition technology such as pattern matching, the attitude of the terminal device 7 can be calculated.

In the exemplary embodiment, the attitude of the terminal device 7 is calculated based on the angular velocity detected by the gyro sensor, and the attitude of the terminal device 7 is corrected based on the acceleration detected by acceleration sensor. That is, the attitude of the terminal device 7 is calculated by using physical amounts detected by the two types of inertial sensors (the acceleration sensor and the gyro sensor). In another exemplary embodiment, the attitude of the terminal device 7 may be calculated based on the orientation detected by the magnetic sensor (the direction indicated by the geomagnetism detected by the magnetic sensor). By use of the magnetic sensor, which direction the terminal device 7 is facing (a direction parallel to the ground surface) can be detected. In this case, further by use of the acceleration sensor, the inclination relative to the direction of gravity can be detected, and the attitude of the terminal device 7 in the three-dimensional space can be calculated.

Further, in another exemplary embodiment, the attitude of the terminal device 7 may be calculated based on the physical amounts detected by the gyro sensor 64 and the like in the terminal device 7 and the data regarding the attitudes may be transmitted to the game apparatus 3. Then, the game apparatus 3 may receive the data from the terminal device 7, obtain the attitude of the terminal device 7, and perform the game processing as described above, based on the attitude of the terminal device 7. That is, the game apparatus 3 may obtain the attitude of the terminal device 7, by calculating the attitude of the terminal device 7, based on the data corresponding to the physical amounts detected by the gyro sensor 64 and the like from the terminal device 7. Alternatively, the game apparatus 3 may obtain the attitude of the terminal device 7, based on the data regarding the attitude calculated in the terminal device 7.

In the exemplary embodiment, when the attitude of the terminal device 7 is the first attitude, the pirate ship 90A and the like are displayed in a zoomed-in manner, by moving the position of the first virtual camera in its image taking direction and concurrently reducing the angle of view of the first virtual camera. In another exemplary embodiment, the pirate ship 90A and the like may be displayed in a zoomed-in/ zoomed-out manner, by changing at least one of the position and the angle of view of the first virtual. In the exemplary embodiment, when the attitude of the terminal device 7 is the second attitude, the position and the angle of view of the first virtual camera are set to substantially the same as those of the second virtual camera, whereby the imaging ranges of the two virtual cameras are made substantially the same with each other. In another exemplary embodiment, the position and the angle of view of the first virtual camera may not be necessarily substantially the same as those of the second virtual camera, and as long as the imaging ranges of the two virtual cameras are substantially the same with each other, the positions and the angles of view of the two virtual cameras may be adjusted as appropriate.

In the exemplary embodiment, during a time period from a first timing to a second timing, when the attitude of the terminal device 7 is a predetermined attitude (the attitude in accordance with the instruction), the lock-on frame 99 is displayed on the terminal device 7. In another exemplary embodiment, in addition to the lock-on frame 99 (or instead of the lock-on frame 99), a stationary image of the virtual space taken by the second virtual camera may be displayed on the terminal device 7. For example, when the attitude of the terminal device 7 is a predetermined attitude in the above time period, the attitude of the second virtual camera may not be changed in accordance with the attitude of the terminal device 7, or the change amount of attitude of the second virtual camera may be reduced relative to the change amount of the attitude of the terminal device 7, and then an image of the virtual space taken by the second virtual camera may be displayed on the terminal device 7. In another exemplary embodiment, in the above time period, the vibrator 79 may be operated in a predetermined pattern in accordance with a determination result of the attitude. That is, during the above time period, whether the attitude of the terminal device 7 is a predetermined attitude may be determined, and a notification in accordance with the determination result (displaying a frame or a stationary image, notifying the user of the determination result by sound, vibration, and the like) may be issued on the terminal device 7.

In the exemplary embodiment, the pirate ship 90A and the like are displayed in a zoomed-in or zoomed-out manner in accordance with the attitude of the terminal device 7, and concurrently the volume of the sound outputted from the television 2 is adjusted. Specifically, when the attitude of the terminal device 7 is the first attitude (when the attitude in which the player is not viewing the terminal device 7, in other words, the player is viewing the television 2), the pirate ship 90A and the like are displayed in a zoomed-in manner and the volume of the sound outputted from the television 2 is increased. In another exemplary embodiment, when the attitude of the terminal device 7 is the first attitude, the volume of the sound outputted from the terminal device 7 may be increased or may not be adjusted.

In the exemplary embodiment, the pirate 92 is displayed on the television 2 and the pirate 92 is caused to perform a predetermined action at a first timing (an action of shooting the arrow 94, or an action of pointing a predetermined direction), thereby giving an instruction to the player. In another exemplary embodiment, the instruction to be given to the player may take any form, and the object to be displayed on the television 2 may be any object. In the exemplary embodiment, it is assumed that the arrow 94 is shot and the shot arrow 94 is received with the terminal device 7. However, in another exemplary embodiment, the game may assume that another object is moved from the television 2 to the terminal device 7, or from the terminal device 7 to the television 2.

In the exemplary embodiment, an instruction to the user is issued by means of an action of the pirate 92 displayed on the television 2 and of sound outputted from the television 2. However, in another exemplary embodiment, an instruction by means of either one of an image or sound may be issued from the television 2.

In the exemplary embodiment, a predetermined instruction is issued to the player at a first timing, and a game processing is performed based on the attitude of the terminal device 7 at a second timing which is a timing after a predetermined time period has elapsed from the first timing. In another exemplary embodiment, for example, the controller 5 may be used as an input device, or the terminal device 7 may be used as an input device. That is, in another exemplary embodiment, the game processing may be performed based on whether a predetermined operation button of the controller 5 is being pressed, for example, at the second timing, or the game processing may be performed based on whether a predetermined operation button of the terminal device 7 is being pressed. Moreover, for example, the game processing may be performed in accordance with the attitude of the controller 5 or the attitude of the terminal device 7, at the second timing.

In another exemplary embodiment, an input by the player may be performed in the form of a gesture (action) of the player himself or herself. For example, a camera that takes an image of the player is connected to the game apparatus 3, and based on the image from the camera, the action of the player is determined, whereby an input from the player may be performed. For example, an instruction is given to the player at a first timing, and the player performs an action in accordance with the instruction at a second timing. Then, based on the image from the camera, the game apparatus 3 analyzes the action of the player and determines whether the action of the player is in accordance with the instruction.

That is, the game processing may be performed based on the state of an input to the input device at a second timing. The input state of the input device may be the state whether a predetermined operation button provided on the controller 5 or the terminal device 7 is being pressed, or may be the attitude of the controller 5 or the terminal device 7 itself. The input state of the input device may be a state based on the gesture (action) of the player himself or herself, and the action of the player may be determined by the camera taking an image of the player.

Moreover, for example, the game processing may be performed based on a second timing and a timing at which an input to the input device (for example, the terminal device 7) is performed. For example, the game processing may be performed based on a difference between a second timing and a timing at which a predetermined operation button of the input device is pressed. Specifically, when the difference is less than or equal to a predetermined threshold value, a scene in which the arrow 94 has reached the terminal device 7 may be displayed on the LCD 51 of the terminal device 7, assuming that the player has performed an input in accordance with the instruction. Moreover, for example, the game processing may be performed based on a difference between a second timing and a timing of a predetermined operation performed onto the input device (an operation that changes the attitude of the input device itself, or an operation that accelerates the motion of the input device, such as an operation of shaking the input device). That is, the game processing may be performed based on the difference between the second timing and the timing of the input performed onto the input device.

In the exemplary embodiment, a scene in which the arrow 94 is shot from the television 2 toward the player is displayed at a first timing, and a scene in which the arrow 94 has reached the terminal device 7 is displayed at a second timing. In another exemplary embodiment, a scene in which a predetermined object is moved from the terminal device 7 toward the television 2 may be displayed at a first timing, and a scene in which the object reaches the television 2 may be displayed at a second timing. In this case, the game processing is performed based on the input state of the input device (the terminal device 7 or another input device) at the second timing. That is, in another exemplary embodiment, the game as described above may be performed, with the television 2 being a stationary display device switched with the terminal device 7 being a portable display device.

Further, in another exemplary embodiment, a part of the game processing performed in the game apparatus 3 may be performed in the terminal device 7. For example, a virtual space is defined in the terminal device 7 and an image of the virtual space is taken by a virtual camera, whereby an image to be displayed on the LCD 51 of the terminal device 7 may be generated in the terminal device 7.

Further, in another exemplary embodiment, in a game system including a plurality of information processing apparatuses that can communicate with each other, the plurality of information processing apparatuses may share the game processing performed by the game apparatus 3. For example, a game system as described above may be configured by a plurality of information processing apparatuses connected to a network such as the Internet. For example, a game system as described above may be constructed by an information processing apparatus to which the terminal device 7 and a monitor are connected, and a server connected to the information processing apparatus via the Internet. In this case, the terminal device 7 and the information processing apparatus are arranged to the player side. Then, for example, operation information based on a game operation performed on the terminal device 7 is transmitted to the server via the network, and the server performs the game processing based on the received operation information, and transmits a result of the game processing to the information processing apparatus.

Further, in another exemplary embodiment, data may be transmitted and received between the game apparatus 3 and the terminal device 7 which are connected with each other not in a wireless manner but in a wired manner. The above described program may be executed in an information processing apparatus, other than the game apparatus 3, for performing various information processes, such as a personal computer.

Further, the above game program may not be stored in an optical disc but may be stored in a storage medium such as a magnetic disc, a nonvolatile memory, and the like. The above game program may be stored in a computer-readable storage medium such as a RAM or a magnetic disc on a server connected to a network, and may be provided via the network. The game program may be loaded into an information processing apparatus as a source code and may be compiled at the execution of the program.

In the exemplary embodiment, the CPU 10 of the game apparatus 3 executes the game program, whereby the processes of the flowchart are performed. In another exemplary embodiment, a part or the whole of the processes may be performed by a dedicated circuit included in the game apparatus 3, or by a general-purpose processer. At least one processor may operate as a "programmed logic circuit" for performing the processes.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above. The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art. Similarly, program instructions, data and other information for implementing the systems and methods described herein may be stored in one or more on-board and/or removable memory devices. Multiple memory devices may be part of the same device or different devices, which are co-located or remotely located with respect to each other.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium having stored therein a game program executed by a computer of an information processing apparatus capable of displaying game processes on first and second display devices, the program causing the computer to perform:

issuing a predetermined notification or instruction to a player of the executed game program via the first display device at a first timing, wherein the predetermined notification or instruction is a game operation or object movement which is displayed on a display of the first display device;

receiving one or more inputs indicative of an attitude state of an input device operated by a player of the executed game program;

determining whether a second timing has occurred, the second timing being a timing which occurs after a predetermined time period has elapsed from the first timing, and determining an attitude state of the input device at a time when the second timing has occurred;

determining whether a predetermined game process should be performed based on a determined attitude state of the input device which exists when the second timing has occurred;

performing the predetermined game process upon determining that the predetermined game process should be performed; and presenting one or more results of the performed predetermined game process on a second display device, wherein at least one result of the performed predetermined game process being said game operation or said object appearing on a display of the second display device.

2. The non-transitory computer-readable storage medium having stored therein the game program according to claim 1, wherein
the second display device is a portable display device integrated with the input device.

3. The non-transitory computer-readable storage medium having stored therein the game program according to claim 2, wherein
the input device includes one or more sensors and produces attitude data based on a value of a sensor that is indicative of an attitude of the input device,
wherein an attitude state of said portable display device is determined based on the attitude data, and
the predetermined game process is performed, based on the attitude of the portable display device at the second timing.

4. The non-transitory computer-readable storage medium having stored therein the game program according to claim 3, wherein
the computer is further caused to perform a determining as to whether the attitude state of the portable display device is in accordance with the predetermined notification, and
the game process is performed at the second timing if it is determined that the attitude state is in accordance with the predetermined notification.

5. The non-transitory computer-readable storage medium having stored therein the game program according to claim 4, wherein
the computer is caused to further perform determining whether the attitude state of the portable display device is in accordance with the predetermined notification during a time period extending from occurrence of the first timing to occurrence of the second timing and providing a notification of a result of such on the portable display device.

6. The non-transitory computer-readable storage medium having stored therein the game program according to claim 4, wherein
the computer is further caused to perform an evaluation of the input by the user, in accordance with a result of the determination at the second timing.

7. The non-transitory computer-readable storage medium having stored therein the game program according to claim 4, wherein
an attitude of a virtual camera in a virtual space is set in accordance with the attitude of the portable display device, and an image of the virtual space is taken by the virtual camera, and thereby a second image in accordance with the attitude of the portable display device is displayed on the portable display device.

8. The non-transitory computer-readable storage medium having stored therein the game program according to claim 3, wherein
the computer is further caused to perform determining whether the portable display device is moving at the second timing, and
a result of a game process performed in accordance with a result of the determination whether the portable display device is moving is presented on the portable display device at the second timing.

9. The non-transitory computer-readable storage medium having stored therein the game program according to claim 2, wherein
image data indicating the result of the game process is outputted to the portable display device,
the portable display device includes:
an image data obtaining unit that obtains the image data outputted from the information processing apparatus; and
a display unit that displays the result of the game process indicated by the image data obtained by the image data obtaining unit.

10. The non-transitory computer-readable storage medium having stored therein the game program according to claim 9, wherein
the computer is further caused to perform generating compressed image data which is obtained by compressing the image data,
the compressed image data is outputted to the portable display device,
the portable display device further includes an image decompression unit that decompresses the compressed image data and obtains the image data, and
the display unit displays the result of the game process indicated by the image data decompressed by the image decompression unit.

11. The non-transitory computer-readable storage medium having stored therein the game program according to claim 1, wherein
the computer is further caused to perform reproducing predetermined music, and
the first timing and the second timing are set, synchronized with the rhythm of the predetermined music.

12. The non-transitory computer-readable storage medium having stored therein the game program according to claim 11, wherein
the first timing and the second timing are set at timings when the predetermined music is reproduced.

13. The non-transitory computer-readable storage medium having stored therein the game program according to claim 1, wherein
- a predetermined sound is outputted at the first timing from a sound outputting unit provided in the first display device, and
- a predetermined sound is outputted at the second timing from a sound outputting unit provided in the second display device.

14. The non-transitory computer-readable storage medium having stored therein the game program according to claim 1, wherein
- a scene in which a predetermined object is started to be moved as the predetermined notification is presented on the first display device, and
- a scene in which the predetermined object has reached the second display device as the result of the game process is displayed on the second display device.

15. The non-transitory computer-readable storage medium having stored therein the game program according to claim 1, wherein performing a predetermined game process may also be based upon a difference between a timing of an input to the input device and the second timing.

16. The non-transitory computer-readable storage medium having stored therein the game program according to claim 1, wherein the predetermined notification is an instruction image for notifying the user of an event occurrence or an operation to be performed by the user.

17. The non-transitory computer-readable storage medium having stored therein the game program according to claim 1, wherein the first display includes an audio output device and the predetermined notification is an audio instruction for notifying the user of an event occurrence or an operation to be performed by the user.

18. The non-transitory computer-readable storage medium having stored therein the game program according to claim 1, wherein the predetermined game processing is not performed at a timing different from the second timing.

19. An information processing apparatus associated with a first display device and having one or more computer processors configured to:
- issue a predetermined notification or instruction to user via a first display device at a first timing, wherein the predetermined notification or instruction is a game operation or object movement which is displayed on a display of the first display device;
- receive one or more inputs indicative of an attitude state of an input device operated by the user;
- determine an occurrence of a second timing, the second timing occurring at a predetermined elapse of time after the first timing, and determine an attitude state of the input device at a time when the second timing has occurred;
- determine whether a predetermined game process should be performed based on a determined attitude state of the input device which exists at occurrence of the second timing;
- perform the predetermined game process device upon determining that the predetermined game process should be performed; and
- present one or more results of the performed predetermined game process on a second display device, wherein at least one result of the performed predetermined game process being said game operation or said object appearing on a display of the second display device.

20. The information processing apparatus of claim 19, wherein performing a predetermined game process may also be based upon a difference between a timing of an input to the input device and the second timing.

21. The information processing apparatus of claim 19, wherein the predetermined notification is an instruction image for notifying the user of an event occurrence or an operation to be performed by the user.

22. The information processing apparatus of claim 19, wherein the first display includes an audio output device and the predetermined notification is an audio instruction for notifying the user of an event occurrence or an operation to be performed by the user.

23. The information processing apparatus of claim 19, wherein the predetermined game processing is not performed at a timing different from the second timing.

24. A game system having one or more processing unit and including a game operation input device and first and second display devices to display game images, the game system comprising:
- a first presentation processing unit that issues a predetermined notification or instruction to a user via the first display device at a first timing, wherein the predetermined notification or instruction is a game operation or object movement which is displayed on a display of the first display device;
- an input processing unit that receives an input indicative of an attitude state of the operation input device;
- a game process performing processing unit that determines an occurrence of a second timing, the second timing occurring at a predetermined elapse of time after the first timing, and determines an attitude state of the operation input device that exists at a time when the second timing has occurred, and further determines whether a predetermined game process should be performed based on a determined attitude state of the input device which exists when the second timing has occurred; and
- a second presentation processing unit that performs the predetermined game process upon a determination that the predetermined game process should be performed and presents one or more results of the performed predetermined game process on a second display device, wherein at least one result of the performed predetermined game process being said game operation or said object appearing on a display of the second display device.

25. The game system of claim 24, wherein performing a predetermined game process may also be based upon a difference between a timing of an input to the input device and the second timing.

26. The game system of claim 24, wherein the predetermined notification is an instruction image for notifying the user of an event occurrence or an operation to be performed by the user.

27. The game system of claim 24, wherein the first display includes an audio output device and the predetermined notification is an audio instruction for notifying the user of an event occurrence or an operation to be performed by the user.

28. The game system of claim 24, wherein the predetermined game processing is not performed at a timing different from the second timing.

29. A processing method implemented using a game operation input device and one or more computer processor of an information processing apparatus capable of providing images to be displayed on first or second display devices, the method comprising:

using said one or more processor for issuing a predetermined notification or instruction to a user via the first display device at a first timing, wherein the predetermined notification or instruction is a game operation or object movement which is displayed on a display of the first display device;

determining an occurrence of a second timing using said one or more computer processor, the second timing occurring at a predetermined elapse of time after the first timing;

providing one or more inputs indicative of an attitude of the operation input device to said one or more processor;

using said one or more processor for determining an attitude state of the operation input device that exists at a time when the second timing has occurred;

using said one or more computer processor for determining whether a predetermined game process should be performed based on a determined attitude state of the operation input device which exists when the second timing has occurred;

performing the predetermined game process upon a determination that the predetermined game process should be performed; and presenting one or more results of the performed predetermined game process on a second display device, wherein at least one result of the performed predetermined game process being said game operation or said object appearing on a display of the second display device.

30. The processing method of claim 29, wherein performing a predetermined game process may also be based upon a difference between a timing of an input to the input device and the second timing.

31. The processing method of claim 29, wherein the predetermined notification is an instruction image for notifying the user of an event occurrence or an operation to be performed by the user.

32. The processing method of claim 29, wherein the first display includes an audio output device and the predetermined notification is an audio instruction for notifying the user of an event occurrence or an operation to be performed by the user.

33. The processing method of claim 29, wherein the predetermined game processing is not performed at a timing different from the second timing.

* * * * *